(12) United States Patent
Neil et al.

(10) Patent No.: US 7,913,234 B2
(45) Date of Patent: Mar. 22, 2011

(54) EXECUTION OF TEXTUALLY-DEFINED INSTRUCTIONS AT A WIRELESS COMMUNICATION DEVICE

(75) Inventors: Tim Neil, Mississauga (CA); Steve Grenier, Georgetown (CA); Paul Chalmers, LaSalle (CA)

(73) Assignee: Research In Motion Limited, Waterloo, Ontario (CA)

( * ) Notice: Subject to any disclaimer, the term of this patent is extended or adjusted under 35 U.S.C. 154(b) by 966 days.

(21) Appl. No.: 11/352,318

(22) Filed: Feb. 13, 2006

(65) Prior Publication Data

US 2007/0240133 A1 Oct. 11, 2007

(51) Int. Cl.
*G06F 9/45* (2006.01)
(52) U.S. Cl. ........................................... 717/136
(58) Field of Classification Search .......... 717/123–131, 717/136–137
See application file for complete search history.

(56) References Cited

U.S. PATENT DOCUMENTS

| | | | |
|---|---|---|---|
| 6,292,186 B1 | 9/2001 | Lehman et al. | |
| 6,757,819 B1* | 6/2004 | Hoyle et al. | 712/300 |
| 7,444,332 B2* | 10/2008 | Dettinger et al. | 1/1 |
| 2002/0082912 A1* | 6/2002 | Batachia et al. | 705/14 |
| 2002/0107891 A1* | 8/2002 | Leamon et al. | 707/513 |
| 2002/0112078 A1* | 8/2002 | Yach | 709/246 |
| 2002/0174345 A1* | 11/2002 | Patel | 713/186 |
| 2003/0050931 A1* | 3/2003 | Harman et al. | 707/100 |
| 2003/0060896 A9* | 3/2003 | Hulai et al. | 700/1 |
| 2003/0237050 A1 | 12/2003 | Davidov et al. | |
| 2004/0103373 A1* | 5/2004 | Wei | 715/513 |
| 2004/0117776 A1 | 6/2004 | Pazandak et al. | |
| 2004/0210828 A1* | 10/2004 | Langer | 715/501.1 |
| 2005/0019740 A1* | 1/2005 | Cunningham et al. | 434/350 |
| 2005/0203747 A1* | 9/2005 | Lecoeuche | 704/270.1 |
| 2006/0100984 A1* | 5/2006 | Fogg et al. | 707/1 |
| 2006/0200772 A1* | 9/2006 | Dhanapal et al. | 715/760 |
| 2007/0053367 A1* | 3/2007 | Tyebji | 370/401 |
| 2007/0234223 A1* | 10/2007 | Leavitt et al. | 715/762 |

FOREIGN PATENT DOCUMENTS

| | | |
|---|---|---|
| WO | WO 01/77822 A2 | 10/2001 |
| WO | WO 03/005337 A | 1/2003 |

OTHER PUBLICATIONS

"Utilizing XML and XSLT in ColdFushion MX" Nate Weiss, Apr. 2002. Weiss.PDF.*
Alfred Ho, Ravi Sethi and Jeffrey Ullman: "Compiler, Principles Techniques and Tools" 1986, pp. 1, 6-7 nd 257-266 XP00217592.
Walczak K. et al: "X-VRML-XML Based Modeling of Virtual Reality" Applications and the Internet, 2002, IEEE Comput. Soc. Jan. 28, 2002.

* cited by examiner

*Primary Examiner* — Anna Deng

(57) ABSTRACT

Software, methods and devices for executing textually-defined instructions at a wireless communication device are disclosed. The instructions may be for performing a mathematical operation upon specified integer or floating-point operands, for performing one or more specified actions for each pass through a loop, for performing one of two sets of actions based on a user selection of one of two user interface controls, or for triggering a timer for delaying a subsequent action by a specified time interval. The instructions may be defined in a markup language such as Extensible Markup Language (XML). The software, methods and devices may form part of a system for allowing varied wireless communication devices to interact with server-side software applications.

12 Claims, 72 Drawing Sheets

1500

IF Condition
Enter the condition that you would like to evaluate on the action. The values used for the condition can be SCRATCHPAD or QUERY values.

| [Editpart.newname] | Equals ▼ | query12.partnames | ☐ Negate |

Condition: IF [Editpart.newname]=[query12.partnames] THEN

1504

APPENDIX "A": ARML Specification

Contents

| | | |
|---|---|---|
| 1 | Introduction | 61 |
| 1.1 | Purpose of document | 61 |
| 1.2 | Audience | 61 |
| 1.3 | Definitions & Acronyms | 61 |
| 2 | ARML Overview | 62 |
| 2.1 | ARML design considerations | 62 |
| 2.2 | ARML usage | 63 |
| 2.3 | The scratchpad area | 63 |
| 2.4 | System Variables and Functions | 63 |
| 2.4.1 | Variables: | 63 |
| 2.4.2 | Functions: | 64 |
| 2.5 | Single-Field Lookup | 64 |
| 3 | ARML application definition | 65 |
| 3.1 | General | 65 |
| 3.1.1 | Description | 65 |
| 3.1.2 | Structure | 65 |
| 3.1.3 | Tags | 65 |
| 3.2 | Table Definitions Section | 67 |
| 3.2.1 | Description | 67 |
| 3.2.2 | Structure | 67 |
| 3.2.3 | Tags | 67 |
| 3.2.4 | Example | 68 |
| 3.3 | Package Definitions Section | 69 |
| 3.3.1 | Description | 69 |
| 3.3.2 | Structure | 69 |
| 3.3.3 | Tags | 69 |
| 3.3.4 | Example | 71 |
| 3.4 | Device Interface Definitions Section | 72 |
| 3.4.1 | Description | 72 |
| 3.4.2 | Structure | 72 |
| 3.4.3 | Tags | 72 |
| 3.4.4 | Example | 73 |
| 4 | Application-defined packages | 73 |
| 4.1 | General | 73 |
| 4.1.1 | Description | 73 |
| 4.1.2 | Structure | 73 |
| 4.1.3 | Tags | 74 |
| 4.2 | Package information | 75 |
| 4.2.1 | Example | 75 |
| 5 | User interface Definitions | 78 |
| 5.1 | General | 78 |
| 5.1.1 | Description | 78 |
| 5.1.2 | Structure | 78 |
| 5.1.3 | Tags | 78 |
| 5.2 | Queries definition section | 80 |
| 5.2.1 | Description | 80 |

FIG. 21A

APPENDIX "A": ARML Specification

| | | |
|---|---|---|
| 5.2.2 | Structure | 80 |
| 5.2.3 | Tags | 80 |
| 5.3 | Menu definition section | 81 |
| 5.3.1 | Description | 81 |
| 5.3.2 | Structure | 81 |
| 5.3.3 | Tags | 81 |
| 5.4 | Buttons definition section | 82 |
| 5.4.1 | Description | 82 |
| 5.4.2 | Structure | 82 |
| 5.4.3 | Tags | 82 |
| 5.5 | Text Items definition section | 83 |
| 5.5.1 | Description | 83 |
| 5.5.2 | Structure | 83 |
| 5.5.3 | Tags | 83 |
| 5.6 | Edit boxes definition section | 84 |
| 5.6.1 | Description | 84 |
| 5.6.2 | Structure | 84 |
| 5.6.3 | Tags | 84 |
| 5.7 | Choice items definition section | 85 |
| 5.7.1 | Description | 85 |
| 5.7.2 | Structure | 85 |
| 5.7.3 | Tags | 86 |
| 5.8 | Checkboxes definition section | 87 |
| 5.8.1 | Description | 87 |
| 5.8.2 | Structure | 87 |
| 5.8.3 | Tags | 87 |
| 5.9 | Listboxes definition section | 88 |
| 5.9.1 | Description | 88 |
| 5.9.2 | Structure | 88 |
| 5.9.3 | Tags | 88 |
| 5.10 | Grids | 89 |
| 5.10.1 | Description | 90 |
| 5.10.2 | Structure | 90 |
| 5.10.3 | Tags | 90 |
| 5.10.4 | Example | 91 |
| 6 | The Smart Client event model | 91 |
| 6.1 | The EVENTS tag | 92 |
| 6.2 | The EVENT tag | 92 |
| 6.2.1 | The BUTTONCLICK event | 92 |
| 6.2.2 | The MENUITEMSELECTED event | 92 |
| 6.2.3 | The DATA event | 92 |
| 6.3 | The ACTION tag | 93 |
| 6.3.1 | The OPEN action | 93 |
| 6.3.2 | The ARML action | 93 |
| 6.3.3 | The SAVE action | 93 |
| 6.3.4 | The PURGE action | 94 |
| 6.3.5 | The NOTIFY action | 94 |
| 6.3.6 | The CLOSE action | 94 |
| 6.3.7 | The ALERT action | 94 |

FIG. 21B

APPENDIX "A": ARML Specification

| | | |
|---|---|---|
| 6.3.8 | The INTEGRATION action | 94 |
| 6.3.9 | The CLOSESCREEN action | 94 |
| 6.3.10 | The REFRESH action | 94 |
| 6.3.11 | The SAVEITEM action | 95 |
| 6.3.12 | The IF Action | 95 |
| | Example of airix event model | 97 |
| 7 | AVM-server system interactions | 98 |
| 7.1 | General | 99 |
| 7.1.1 | Description | 99 |
| 7.1.2 | Structure | 99 |
| 7.1.3 | Tags | 99 |
| 7.2 | Device Registration & deregistration package | 100 |
| 7.2.1 | Description | 100 |
| 7.2.2 | Structure | 100 |
| 7.2.3 | Tags | 100 |
| 7.2.4 | Example | 100 |
| 7.3 | Registration confirmation package | 101 |
| 7.3.1 | Description | 101 |
| 7.3.2 | Structure | 101 |
| 7.3.3 | Tags | 101 |
| 7.3.4 | Example | 101 |
| 7.4 | Find applications package | 103 |
| 7.4.1 | Description | 103 |
| 7.4.2 | Structure | 103 |
| 7.4.3 | Tags | 103 |
| 7.5 | Find applications confirmation package | 104 |
| 7.5.1 | Description | 104 |
| 7.5.2 | Structure | 104 |
| 7.5.3 | Tags | 104 |
| 7.6 | Application Registration & deregistration package | 105 |
| 7.6.1 | Description | 105 |
| 7.6.2 | Structure | 105 |
| 7.6.3 | Tags | 105 |
| 7.7 | Application registration & deregistration confirmation package | 106 |
| 7.7.1 | Description | 106 |
| 7.7.2 | Structure | 106 |
| 7.7.3 | Tags | 106 |
| 7.7.4 | Example | 106 |
| 7.8 | Setting the active device package | 108 |
| 7.8.1 | Description | 108 |
| 7.8.2 | Structure | 108 |
| 7.8.3 | Tags | 108 |
| 7.8.4 | Example | 108 |
| 7.9 | Set active device response | 108 |
| 7.9.1 | Description | 108 |
| 7.9.2 | Structure | 108 |
| 7.9.3 | Tags | 108 |
| 7.9.4 | Example | 109 |
| 7.10 | Invalid Application package | 109 |

FIG. 21C

APPENDIX "A": ARML Specification

| | | |
|---|---|---|
| 7.10.1 | Description | 109 |
| 7.10.2 | Structure | 109 |
| 7.10.3 | Tags | 109 |
| 7.10.4 | Example | 109 |
| 8 | Application-server system interactions | 109 |
| 9 | ARML future developments | 110 |

FIG. 21D

APPENDIX "A": ARML Specification

1. Introduction

1.1 Purpose of document
This document describes the structure and syntax of the ARML language.

1.2 Audience
The document is intended to be read by AIRIX developers and users of ARML.

1.3 Definitions & Acronyms

| | |
|---|---|
| ARML | AIRIX Markup Language |
| XML | Extensible Markup Language |

FIG. 21E

APPENDIX "A": ARML Specification

2 ARML Overview

ARML is an XML markup language used by the AIRIX platform. It performs three tasks;

- Data is passed back and forth between the mobile server, AIRIX platform and enterprise application using ARML.
- The AIRIX Smart Client uses ARML to define the user interface for an AIRIX-enabled application on the mobile device
- The AIRIX server uses ARML to define that data that it stores for the application in its database.

2.1 ARML design considerations
ARML has been designed with the following goals in mind;

- Transactions and screen definitions should be as independent as possible
- AIRIX should be unaware of internals of the enterprise application
- Strict conformance to the XML specification will be enforced
- Operation should be transparent to the end user
- ARML packages should be readable as is
- The minimum number of characters needed should be used

FIG. 21F

APPENDIX "A": ARML Specification

2.2 ARML usage

The diagram below illustrates how ARML is used.

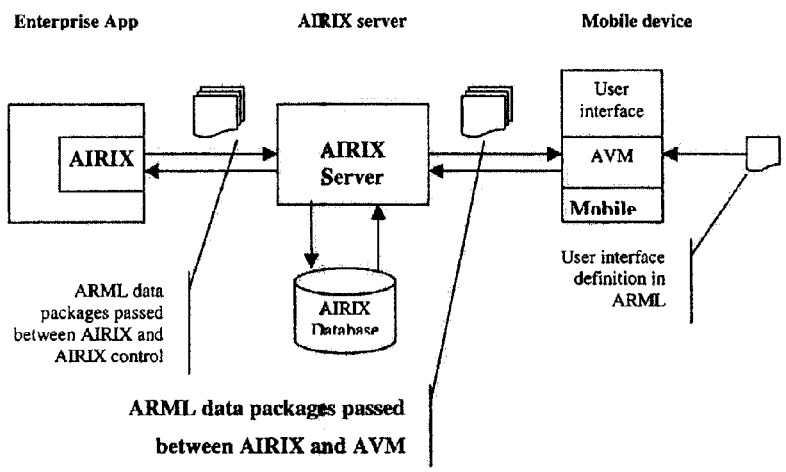

Figure 1 - The ARML environment

The key to ARML usage is the application definition file held on the AIRIX server. This file defines the AIRIX tables for the application, the allowed message set and the user interface definitions for the application on a given device.

2.3 The scratchpad area
The scratchpad is used as a temporary storage area where a global value or a value associated to a screen can be saved for future use. The syntax for a scratchpad value is as follows:
    screen scratchpad value: [SP.*screen.savename*]
    global scratchpad value: [SP.*.*savename*]

The syntax for retrieving a global scratchpad value can also be used to retrieve screen scratchpad values.

2.4 System Variables and Functions
There are several variables that are available that will retrieve application and system values to be used throughout the application. The syntax for these variables are as follows:

2.4.1 Variables:
[DATE] – returns the current system date, formatted as dd mmm yy

FIG. 21G

APPENDIX "A": ARML Specification

[TIME] – returns the current system time, formatted as hh:mm:ss am/pm.
[SYS.VAR.DATE] - returns the current system date, formatted as dd mmm yy
[SYS.VAR.MOBILEID] - retrieves the device's Mobile ID
[SYS.VAR.APPNAME] - retrieves the name of the application.
 [SYS.VAR.APPVERSION] - retrieves the version number of the application.

[SYS.VAR.SCVERSION] - retrieves the version number of the Smart Client.
[SYS.VAR.ARMLMAJOR] - retrieves the ARML major version of the application.
[SYS.VAR.ARMLMINOR] - retrieves the ARML minor version of the application.

2.4.2 Functions:
[SYS.FUNC.DATEADD([SYS.VAR.DATE],+-$x$)] - The Date Arithmetic tag is used to add or subtract days from the current date. In the tag, $x$ represents the number of days added or subtracted. Developers can also choose to substitute a hard-coded date value in the Date Arithmetic tag, in the place of the [SYS.VAR.DATE] tag.

[SYS.FUNC.DATETOSTR([SYS.VAR.DATE],d mmm yyyy h:nn:ss tz)] - The Date To String tag is used to convert date data to a string value.

[SYS.FUNC.STRTODATE([SYS.VAR.DATE],d mmm yyyy h:nn:ss tz)] - The String to Date tag is used to convert string data to a date value, in the RFC 1123 format.

2.5 Single-Field Lookup
The single-field lookup will run a simple SELECT query with one where-clause to retrieve specific data. The syntax is as follows:

[DB.DOLOOKUP(*table, field,wherefield,wherevalue*)]

FIG. 21H

APPENDIX "A": ARML Specification

3 ARML Application Definition

3.1 General

3.1.1 Description
The application definition section defines the AIRIX tables and ARML data packages that are used for transactions involved with a specific application.

3.1.2 Structure
The ARML application definition has the following structure;

```
<ARML>
    <AXSCHDEF>
                                <EVENTS>
                                    <EVENT>
                        (action definitions)
                                    </EVENT>
                                </EVENTS>
            <AXTDEFS>
                (table definitions)
            </AXTDEFS>
            <DPACKETS>
                (data package definitions)
            </DPACKETS>
            <DEVICES>
                (device interface definitions)
            </DEVICES>
    </AXSCHDEF>
</ARML>
```

3.1.3 Tags

3.1.3.1 The <AXSCHDEF> tag
These tags (<AXSCHDEF>...</AXSCHDEF>) mark the start and end of the application definition. THE AXSCHDEF tag has two attributes;

| Attribute | Optional? | Description |
|---|---|---|
| APPNAME | No | The name of the application |
| VERSION | No | Which version of the application the file describes |
| DESC | No | A text description of the application for display purposes |
| ARMLMAJOR | No | The major version of the ARML language this application definition was created with. |
| ARMLMINOR | No | The minor version of the ARML language this application definition was created with. |

3.1.3.2 The <EVENTS> tag
The <EVENT>...</EVENT> pair marks the start and end of a user-interface level event definition. See section 6 for a detailed discussion of the Smart Client event model.

3.1.3.3 The <EVENT> tag
The <EVENT>...</EVENT> pair marks the start and end of a user-interface level event definition. See section 6 for a detailed discussion of the Smart Client event model.

FIG. 21I

APPENDIX "A": ARML Specification

3.1.3.4 The <AXTDEFS> tag
The <AXTDEFS>...</AXTDEFS> pair marks the start and end of the table definitions section. It has no attributes.

3.1.3.5 The <DPACKETS> tag
The <DPACKETS>...</DPACKETS> pair marks the start and end of the data package definitions section. It has no attributes.

3.1.3.6 The <DEVICES> tag
The <DEVICES>...</DEVICES> pair marks the start and end of the device interface definitions section. It has no attributes.

FIG. 21J

APPENDIX "A": ARML Specification

3.2 Table Definitions Section

3.2.1 Description
The table definitions section defines the tables on the mobile device for the application

3.2.2 Structure
The table definitions section has the following structure;

```
{wrapper tags}
<TDEF>
       <FIELDS>
              <FLD>...</FLD>
       <FIELDS>
</TDEF>
 (etc.)
{wrapper tags}
```

3.2.3 Tags

3.2.3.1 The <TDEF> tag
Each table definition is enclosed within the <TDEF>...</TDEF> pair. The TDEF tag has the following attributes;

| Attribute | Optional? | Description |
|---|---|---|
| NAME | No | The number of table definitions in the section |
| PK | No | Which of the table fields is the primary key for the table |
| DELINDEX | No | The index of this table with respect to all the tables for specifying the delete order. This value is 1 based. |

3.2.3.2 The <FIELDS> tag
The <FIELDS>...</FIELDS> tag pair marks where the fields in a given table are defined. The FIELDS tag has a no attributes.

3.2.3.3 The <FLD> tag
The <FLD>...</FLD> tag pair defines a single field in a table. Enclosed between the tags is the field name. The <FLD> tag has the following structure;

| Attribute | Optional? | Description |
|---|---|---|
| TYPE | No | The data type contained in the field. Permitted values are:<br>INT – integer value<br>STRING – a fixed-length string of n characters (see SIZE field)<br>MEMO – a string of max 65535 characters<br>AUTOINC – an integer value, automatically incremented by the database. This field will be read-only to the applications.<br>DATETIME – a datetime value |
| SIZE | No | If the TYPE is set to STRING, this field specifies the number of characters in the field |
| INDEXED | No | Specifies if the field needs to be indexed in the AIRIX database |
| REFERENCEFIELD | Yes | If this attribute is present, it defines that this field is a foreign key. The foreign table/field is given in the format "table(field)" |
| ALLOWNULL | No | Specifies if the field is allowed to have a null value |

FIG. 21K

APPENDIX "A": ARML Specification

3.2.4 Example
An email application would use 2 tables for storing sent emails.

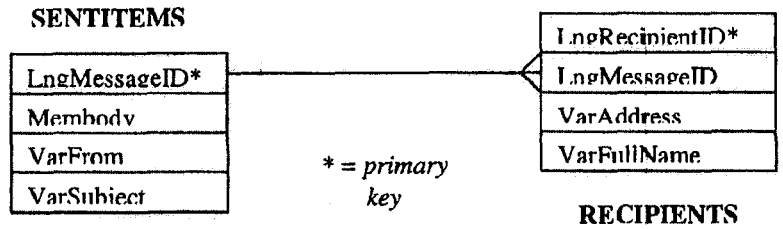

Figure 2 - sample email schema

This translates into the following ARML fragment;

```
<TDEF NAME="SENTITEMS" UPDATETYPE=NEW PK=LNGMESSAGEID DELINDEX=2>
    <FIELDS>
        <FLD TYPE="INT" SIZE="0" INDEXED="NO" REFERENCEFIELD=""
            ALLOWNULL="NO">LNGMESSAGEID</FLD>
        <FLD TYPE="STRING" SIZE="200" INDEXED="NO" REFERENCEFIELD=""
            ALLOWNULL="YES">VARFROM</FLD>
        <FLD TYPE="MEMO" SIZE="0" INDEXED="NO" REFERENCEFIELD=""
            ALLOWNULL="YES">MEMBODY</FLD>
        <FLD TYPE="STRING" SIZE="200" INDEXED="NO" REFERENCEFIELD=""
            ALLOWNULL="YES">VARSUBJECT</FLD>
    </FIELDS>
</TDEF>
<TDEF NAME="RECIPIENTS" UPDATETYPE=NEW PK=LNGRECIPIENTID DELINDEX=1>
    <FIELDS>
        <FLD TYPE="INT" SIZE="AUTOINC" INDEXED="NO" REFERENCEFIELD=""
            ALLOWNULL="NO">LNGMESSAGEID</FLD>
        <FLD TYPE="INT" SIZE="0" INDEXED="YES"
            REFERENCEFIELD="SENTITEMS(MESSAGEID)"
            ALLOWNULL="NO">LNGMESSAGEID</FLD>
        <FLD TYPE="STRING" SIZE="200" INDEXED="NO" REFERENCEFIELD=""
            ALLOWNULL="YES">VARFULLNAME</FLD>
        <FLD TYPE="STRING" SIZE="200" INDEXED="NO" REFERENCEFIELD=""
            ALLOWNULL="YES">VARADDRESS</FLD>
    </FIELDS>
</TDEF>
```

Figure 3 - a sample table definition section

FIG. 21L

APPENDIX "A": ARML Specification

3.3 Package Definitions Section

3.3.1 Description
The package definitions section defines the structure of the application packages and the data that they carry.

3.3.2 Structure
The package definitions section has the following structure;

```
(wrapper tags)
<AXDATAPACKET>
        <TABLEUPDATES>
                <TUPDATE>
                        <PKGFIELDS>
                                <PKGFLD>...</PKGFLD>
                                <PKGFLD>...</PKGFLD>
                        </PKGFIELDS>
                </TUPDATE>
        </TABLEUPDATES>
        <TABLEUPDATES>
                <TUPDATE>
                        <PKGFIELDS>
                                <PKGFLD>...</PKGFLD>
                                <PKGFLD>...</PKGFLD>
                                (etc.)
                        </PKGFIELDS>
                </TUPDATE>
        </TABLEUPDATES>
        (etc.)
</AXDATAPACKET>
(wrapper tags)
```

3.3.3 Tags

3.3.3.1 The <AXDATAPACKET> tag
The <AXDATAPACKET>...</AXDATAPACKET> pair delimits a package definition. The tag has the following attributes;

| Attribute | Optional? | Description |
|---|---|---|
| BODY | No | This field gives the name by which the data package is known |
| UPDATELOCALDATA | No | Specifies whether the package is to update the local database. |
| SENDTOAPP | No | Specifies whether the package is sent to the application server |

3.3.3.2 The <TABLEUPDATES> tag
The <TABLEUPDATES>...</TABLEUPDATES> pair marks the start and end of the table definitions section. It has no attributes.

3.3.3.3 The <TUPDATE> tag
Each table update is enclosed within the <TUPDATE>...</TUPDATE> pair. The TUPDATE tag has the following attributes;

| Attribute | Optional? | Description |
|---|---|---|
| TABLE | No | The table in the database that is updated |
| UPDATETYPE | No | The type of update that is being made to the database. Possible |

FIG. 21M

APPENDIX "A": ARML Specification

| | | values are;<br>ADD – adds a new record into the table<br>DELETE – removes a record into the table<br>UPDATE – modifies a record in the table |
|---|---|---|
| WHEREFIELD | Yes | For a conditional update of a table, specifies the field and table to match on. This is in the format "table(field)". |
| WHEREPARAM | Yes | Text string specifying the value. This tag has no meaning and will be skipped unless the WHEREFIELD attribute has been specified. |
| SECTION | No | An identifier for the section in the data package |
| MULTIROW | No | Boolean field specifying whether multiple rows can be updated by the tag |
| MULTIROWIDENT | Yes | If the MULTIROW attribute is set to 'YES', this field is required and specifies the |

3.3.3.4 The <PKGFIELDS> tag

The <PKGFIELDS>...</PKGFIELDS> tag pair marks where the fields in a given data package are defined. The PKGFIELDS tag has no attributes.

3.3.3.5 <The PKGFLD> tag

The <PKGFLD>...</PKGFLD> tag pair defines a single parameter in a given data package. Enclosed between the <PKGFLD>...</PKGFLD> tags is the field name. The <PKGFLD> tag has the following attributes;

| Attribute | Optional? | Description |
|---|---|---|
| NAME | No | This is the field in the AIRIX database that maps to the user interface field |
| PARAMTYPE | No | This defines the type of parameter. It can take two values;<br>PROP – this means that the parameter appears as part of the tag definition<br>VALUE – this means that the parameter is contained between the two tags. Only one parameter in a given data package can be of this type |

FIG. 21N

APPENDIX "A": ARML Specification

3.3.4 Example

Using the table definitions example in section 3.2.4, when the user sends an email, a data package to transport the data would update the 'SENTITEMS' table and the 'RECIPIENTS' table. The following ARML fragment defines such a data package;

```
<AXDATAPACKET BODY="ME" SENDTOMOBILE="NO" SENDTOAPP="YES">
    <TABLEUPDATES>
        <TUPDATE TABLE="SENTITEMS" UPDATETYPE="ADD" WHEREFIELD="" WHEREPARAM=""
            WHERETYPE="PROP" SECTION="MAIL" MULTIROW="NO" MULTIROWIDENT="">
            <FIELDS>
                <PKGFLD NAME="LNGMESSAGEID" PARAMTYPE="PROP">MSGID</PKGFLD>
                <PKGFLD NAME="VARFROM" PARAMTYPE="PROP">FROM</PKGFLD>
                <PKGFLD NAME="VARSUBJECT" PARAMTYPE="PROP">SUBJECT</PKGFLD>
                <PKGFLD NAME="MEMBODY" PARAMTYPE="VALUE">DATA</PKGFLD>
            </FIELDS>
        </TUPDATE>
        <TUPDATE TABLE="RECIPIENTS" UPDATETYPE="ADD" WHEREFIELD="" WHEREPARAM=""
            WHERETYPE="PROP" SECTION="RECIPS" MULTIROW="YES"
            MULTIROWIDENT="RCP">
            <FIELDS>
                <PKGFLD NAME="LNGMESSAGEID" PARAMTYPE="PROP">MSGID</PKGFLD>
                <PKGFLD NAME="VARFULLNAME" PARAMTYPE="PROP">TO</PKGFLD>
                <PKGFLD NAME="VARADDRESS" PARAMTYPE="PROP">ADDRESS</PKGFLD>
            </FIELDS>
        </TUPDATE>
    </TABLEUPDATES>
</AXDATAPACKET>
```

Figure 4 - a sample package definition

FIG. 21O

APPENDIX "A": ARML Specification

3.4 Device Interface Definitions Section

3.4.1 Description
The display definitions section contains the user interface definitions for the various mobile devices that an application supports.

3.4.2 Structure
The device display definitions section has the following structure;

```
{wrapper tags}
<DEV>
        <SCREENS>
                <SCREEN>
                        {screen definitions}
                </SCREEN>
        </SCREENS>
</DEV>
{other devices}
{wrapper tags}
```

3.4.3 Tags

3.4.3.1 The <DEV> tag
The <DEV>...</DEV> pair delimits an interface definition for a specific device. The tag has the following attributes;

| Attribute | Optional? | Description |
|---|---|---|
| TYPE | No | The type of device. Allowed values are:<br>RIM – a Research in Motion Blackberry pager<br>WAP – a WAP phone<br>CE – Pocket PC |

3.4.3.2 The <SCREENS> tag
The <SCREENS>...</SCREENS> pair delimits the screens definition for a specific device. The tag has one attribute;

| Attribute | Optional? | Description |
|---|---|---|
| STSCRN | No | The first screen that is displayed when the application starts |

3.4.3.3 The <SCREEN> tag
The <SCREEN>...</SCREEN> pair, and its contents are described in section 5.1.3.1

FIG. 21P

APPENDIX "A": ARML Specification

3.4.4 Example
The following example shows the screen definitions section for an application that allows a user to view their inbox and the mails in it.

```
{wrapper tags}
<DEV TYPE="RIM">
      <SCREENS>
            <SCREEN NAME="INBOX ">
                  {screen definition}
            </SCREEN>
            <SCREEN NAME="VIEWNEWMAIL">
                  {screen definition}
            </SCREEN>
      </SCREENS>
</DEV>
<DEV TYPE="PALM">
      <SCREENS>
            <SCREEN NAME="INBOX">
                  {screen definition}
            </SCREEN>
            <SCREEN NAME="VIEWNEWMAIL">
                  {screen definition}
            </SCREEN>
      </SCREENS>
</DEV>
{wrapper tags}
```

4 Application-Defined Packages

This section describes the format of application defined packages.

4.1 General
This section describes the general structure of an application-specific data package. As described in section , ;

4.1.1 Description
System level packages are sent between AIRIX and the application server, and between AIRIX and the AVM

4.1.2 Structure
An application defined package has the following structure;

```
<ARML>
      <HEAD>
            {header information}
      </HEAD>
      <PKG>
            {package information}
      </PKG>
</ARML>
```

FIG. 21Q

APPENDIX "A": ARML Specification

4.1.3 Tags

4.1.3.1 The <HEAD> tag
The <HEAD> tag is as described in section 7.1.3.1

4.1.3.2 The <PKG> tag
The <PKG>...</PKG> tags delimit the package data. The PKG tag has the following attributes;

| Attribute | Optional? | Description |
|---|---|---|
| TYPE | No | A text string identifying the type of package being sent |

FIG. 21R

APPENDIX "A": ARML Specification

4.2 Package information
The format and rules for application-defined data packages depend on the package definitions for that application.

4.2.1 Example
A sample data package following the rules in section 3.3.4 would have a body section like this;

```
{wrapper tags}
<PKG TYPE="ME">
    <MAIL MSGID="1" FROM="Tim Neil" FROMADDRESS="timn@nextair.com"
        SUBJECT="Hello Back">
    <DATA>I am responding to your message</DATA>
    </MAIL>
    <RECIPS>
        <RCP MSGID="1" TO="Jeff Jones"
            ADDRESS="jeff@nextair.com"></RCP>
        <RCP MSGID="1" TO="Scott Neil"
            ADDRESS="scottn@nextair.com"></RCP>
        <RCP MSGID="1" TO="Steve Hulaj"
            ADDRESS="steveh@nextair.com"></RCP>
    </RECIPS>
</PKG>
{wrapper tags}
```

Figure 5 - a sample package

We will use this sample package to illustrate how packages are derived from the package definition file. The first tag in the package is the BODY tag. This tag defines which type of package it is;

Package Definition
```
<AXDATAPACKET BODY="ME" UPDATELOCALDATA="NO"
Package
<BODY TYPE="ME">
```

The package has two sections, which correspond to the two table update sections in the package definition;

FIG. 21S

APPENDIX "A": ARML Specification

Package Definition

```
<TUPDATE TABLE="SENTITEMS" UPDATETYPE="ADD" WHEREFIELD="" WHEREPARAM=""
    WHERETYPE="PROP" SECTION="MAIL" MULTIROW="NO" MULTIROWIDENT="">

<TUPDATE TABLE="RECIPIENTS" UPDATETYPE="ADD" WHEREFIELD="" WHEREPARAM=""
    WHERETYPE="PROP" SECTION="RECIPS" MULTIROW="YES"
    MULTIROWIDENT="RCP">
```

Package

```
<MAIL MSGID="1" FROM="Tim Neil"
<RECIPS>
  <RCP>
  <RCP>
  <RCP>
</RECIPS>
```

FIG. 21T

APPENDIX "A": ARML Specification

The 'MAIL' section updates the 'SENTITEMS' table in the database. It does not update multiple rows. The 'RECIPS' section updates the 'RECIPIENTS' table in the database; it does update multiple rows, and each row is contained within a pair of <RCP> tags.

Each of the MAIL and RCP tags have fields which are used to update the field in the database tables;

Package Definition
```
<FIELDS>
    <PKGFLD NAME="LNGMESSAGEID" PARAMTYPE="PROP">MSGID</PKGFLD>

<PKGFLD NAME="VARFULLNAME" PARAMTYPE="PROP">TO</PKGFLD>

<PKGFLD NAME="VARADDRESS" PARAMTYPE="PROP">ADDRESS</PKGFLD>
</FIELDS>
```
Package
```
<RCP MSGID="1" TO="Jeff Jones" ADDRESS="jeff@nextair.com"></RCP>
```

FIG. 21U

APPENDIX "A": ARML Specification

5 User Interface Definitions

5.1 General

5.1.1 Description
A screen definition file defines a single screen for a specific device.

5.1.2 Structure
A screen definition file has the following structure;

```
<ARML>
    <SCREEN>
        <EVENTS>
            <EVENT>
                <ACTION>...</ACTION>
            </EVENT>
        </EVENTS>
        <QUERIES>
            (menu definition)
        </QUERIES>
        <MENUS>
            (menu definition)
        </MENUS>
        <BUTTONS>
            (button definitions)
        </BUTTONS>
        <TEXTITEMS>
            (textitem definitions)
        </TEXTITEMS>
        <EDITBOXES>
            (edit box definitions)
        </EDITBOXES>
        <CHOICEITEMS>
            (choice item definitions)
        </CHOICEITEMS>
        <IMAGES>
            (image definitions)
        </IMAGES>
        <LISTBOXES>
            (list box definitions)
        </LISTBOXES>
        <CHECKBOXES>
            (check box definitions)
        </CHECKBOXES>
        <GRIDS>
            (check grid definition)
        </GRIDS>
    </SCREEN>
</ARML>
```

5.1.3 Tags

5.1.3.1 The SCREEN tag
The <SCREEN>...</SCREEN> pair marks the start and end of the screen definitions section. It has attribute –

| Attribute | Optional? | Description |
|---|---|---|

FIG. 21V

APPENDIX "A": ARML Specification

| NAME | No | An identifier for the screen. This is used to qualify variables and navigate between screens |
|---|---|---|
| TITLE | No | The title that appears for the screen. |
| BACKGROUND | Yes | If used, an image that appears behind the interface elements |
| ORDERED | Yes, only applicable on WAP | If yes, WML is created with ORDERED property set to true, if NO, WML is created with ORDERED property set to false. Only applicable on WAP. See WML standard for definition of ORDERED. |

5.1.3.2 The <EVENTS> tag
The <EVENT>...</EVENT> pair marks the start and end of a user-interface level event definition. See section 6 for a detailed discussion of the Smart Client event model.

5.1.3.3 The <EVENT> tag
The <EVENT>...</EVENT> pair marks the start and end of a user-interface level event definition. See section 6 for a detailed discussion of the Smart Client event model.

5.1.3.4 The <ACTION> tag
The <ACTION>...</ACTION> pair marks the start and end of an action definition. See section 6 for a detailed discussion of the Smart Client event model.

5.1.3.5 The QUERIES tag
The <QUERIES>...</QUERIES> pair marks the start and end of the queries definitions section. It has no attributes.

5.1.3.6 The MENUS tag
The <MENUS>...</MENUS> pair marks the start and end of the menu definition section. It has no attributes.

5.1.3.7 The BUTTONS tag
The <BUTTONS>...</BUTTONS> pair marks the start and end of the button definitions section. It has no attributes.

5.1.3.8 The TEXTITEMS tag
The <TEXTITEMS>...</TEXTITEMS> pair marks the start and end of the text items section. It has no attributes.

5.1.3.9 The EDITBOXES tag
The <EDITBOXES>...</EDITBOXES> pair marks the start and end of the editboxes section. It has no attributes.

5.1.3.10 The CHOICEITEMS tag
The <CHOICEITEMS>...</CHOICEITEMS> pair marks the start and end of the choiceitems section. It has no attributes.

5.1.3.11 The IMAGES tag
The <IMAGES>...</IMAGES> pair marks the start and end of the images section. It has no attributes.

FIG. 21W

APPENDIX "A": ARML Specification

5.1.3.12 The CHECKBOXES tag
The <CHECKBOXES>...</CHECKBOXES> pair marks the start and end of the checkboxes section. It has no attributes.

5.1.3.13 The LISTBOXES tag
The <LISTBOXES>...</LISTBOXES> pair marks the start and end of the listboxes section. It has no attributes.

5.1.3.14 The GRIDS tag
The <GRIDS>...</GRIDS> pair marks the start and end of the grids section. It has no attributes.

5.2 Queries definition section
5.2.1 Description
The queries definition section describes any queries that need to be run to populate a screen.

5.2.2 Structure
The queries definition section has the following structure;

```
(wrapper tags)
<QUERIES>
        <QUERY>
                <W>_</W>
        </QUERY>
</QUERIES>
(wrapper tags)
```

5.2.3 Tags

5.2.3.1 The <QUERIES> tag
The <QUERIES> ... </QUERIES> pair marks the start and end of query definition section. It has no attributes.

5.2.3.2 The <QUERY> tag
The <QUERY>...</QUERY> pair marks the start and end of a given query. It has the following attributes;

| Attribute | Optional? | Description |
|---|---|---|
| NAME | No | Name of the query. |
| TABLE | No | The table in the database that is updated |
| ORDERBY | Yes | Specifies the name of the field in the table that the results are to be ordered on. |
| ORDERDIR | Yes | ASC or DESC, sort ascending or descending respectively. If ORDERBY is present and ORDERDIR is not, ASC is assumed. |

5.2.3.3 The <W> tag
The <W>...</W> pair marks the start and end of a given where-clause. The value of the parameter is contained within the <W>...</W> tags. This value can be a specific value or a

FIG. 21X

APPENDIX "A": ARML Specification reference to a user interface field in the format "[SP.screen.savename] or [QU.query.field]"
It has the following attributes;

| Attribute | Optional? | Description |
|---|---|---|
| F | No | Specifies the field to match on. |
| E | No | Specifies the expression type. Available expression types include:<br>EQ<br>NE<br>LT<br>GT<br>BW (applicable only to fields of type STRING) |

5.3 Menu definition section
5.3.1 Description
The menu definition section describes the menu for a given screen.

5.3.2 Structure
The menu definition section has the following structure;

```
{wrapper tags}

<MENUS>
   <MENU>
       <MENUITEM>
            <EVENTS>
                 <EVENT>
                      <ACTION>...</ACTION>
                 </EVENT>
            </EVENTS>
       </MENUITEM>
   </MENU>
</MENUS>
{wrapper tags}
```

5.3.3 Tags

5.3.3.1 The <MENUS> tag
The <MENUS> ... </MENUS> pair marks the start and end of menu definition section. It has no attributes.

5.3.3.2 The <MENU> tag
The <MENU> ... </MENU> pair marks the start and end of a menu definition. It has the following attributes.

| Attribute | Optional? | Description |
|---|---|---|
| NAME | No | An internal identifier for the menu |
| CAPTION | No | The text that appears for this item in the menu |

5.3.3.3 The <MENUITEM> tag
The <MENUITEM>...</MENUITEM> pair marks the start and end of a menuitem definition. It has the following tags;

FIG. 21Y

APPENDIX "A": ARML Specification

| Attribute | Optional? | Description |
|---|---|---|
| NAME | No | An internal identifier for the menu |
| CAPTION | No | The text that appears for this item in the menu |
| INDEX | Yes | The index of this menu item with respect to all of the menu items on this menu. |
| READONLY | Yes | If True, the menu item is inactive. False is the default. |

5.3.3.4 The <EVENTS> tag

The <EVENT>...</EVENT> pair marks the start and end of a user-interface level event definition. See section 6 for a detailed discussion of the Smart Client event model.

5.3.3.5 The <EVENT> tag

The <EVENT>...</EVENT> pair marks the start and end of a user-interface level event definition. See section 6 for a detailed discussion of the Smart Client event model.

5.3.3.6 The <ACTION> tag

The <ACTION>...</ACTION> pair marks the start and end of an action definition. See section 6 for a detailed discussion of the Smart Client event model.

5.4 Buttons definition section

5.4.1 Description

The buttons definition section describes the buttons that appear on a given screen.

5.4.2 Structure

The buttons definition section has the following structure;

```
{wrapper tags}
<BTN>
        <EVENTS>
                <EVENT>
                        <ACTION>...</ACTION>
                </EVENT>
        </EVENTS>
</BTN>
{wrapper tags}
```

5.4.3 Tags

5.4.3.1 The BTN tag

The <BTN>...</BTN> pair marks the start and end of a button definition. It has one attribute –

| Attribute | Optional? | Description |
|---|---|---|
| NAME | No | An identifier for the button. |
| INDEX | No | The order in which the button appears |
| CAPTION | No | The caption that appears on a given button |
| X | Yes | The X-coordinate of the button on the screen. This attribute may not be meaningful in some display environments, in which case it would be skipped without processing by the parser |
| Y | Yes | The Y-coordinate of the button on the screen. This attribute may not be meaningful in some display environments, in which case it would be skipped without processing by the parser |
| HT | Yes | This is the Height of the button. This attribute may not be meaningful in some display environments, in which case it would be skipped without |

FIG. 21Z

APPENDIX "A": ARML Specification

| | | processing by the parser |
|---|---|---|
| WT | Yes | This is the Width of the Button. This attribute may not be meaningful in some display environments, in which case it would be skipped without processing by the parser |
| READONLY | Yes | If True, the button is not enabled. False is the default. |

5.4.3.2 The <EVENTS> tag
The <EVENT>...</EVENT> pair marks the start and end of a user-interface level event definition. See section 6 for a detailed discussion of the Smart Client event model.

5.4.3.3 The <EVENT> tag
The <EVENT>...</EVENT> pair marks the start and end of a user-interface level event definition. See section 6 for a detailed discussion of the Smart Client event model.

5.4.3.4 The <ACTION> tag
The <ACTION>...</ACTION> pair marks the start and end of an action definition. See section 6 for a detailed discussion of the Smart Client event model.

5.5 Text Items definition section
5.5.1 Description
The text items definition

5.5.2 Structure
The text items section has the following structure;

```
{wrapper tags}
<TI>
      <EVENTS>
            <EVENT>
                  <ACTION>...</ACTION>
            </EVENT>
      </EVENTS>
</TI>
{wrapper tags}
```

5.5.3 Tags

5.5.3.1 The TI tag
The <TI>...</TI> pair marks the start and end of the screen definitions section. It has attribute –

| Attribute | Optional? | Description |
|---|---|---|
| INDEX | No | The order in which the text item appears |
| NAME | No | An Identifier for the Text Item |
| CAPTION | No | Text to appear on the Text Item |
| X | Yes | The X-coordinate of the text item on the screen. This attribute may not be meaningful in some display environments, in which case it would be skipped without processing by the parser |
| Y | Yes | The Y-coordinate of the text item on the screen. This attribute may not be meaningful in some display environments, in which case it would be skipped without processing by the parser |
| HT | Yes | This is the Height of the Text Item. This attribute may not be meaningful in some display environments, in which case it would be skipped without processing by the parser |

FIG. 21AA

APPENDIX "A": ARML Specification

| WT | Yes | This is the Width of the Text Item. This attribute may not be meaningful in some display environments, in which case it would be skipped without processing by the parser |

5.5.3.2 The <EVENTS> tag

The <EVENT>...</EVENT> pair marks the start and end of a user-interface level event definitio-n. See section 6 for a detailed discussion of the Smart Client event model.

5.5.3.3 The <EVENT> tag

The <EVENT>...</EVENT> pair marks the start and end of a user-interface level event definition. See section 6 for a detailed discussion of the Smart Client event model.

5.5.3.4 The <ACTION> tag

The <ACTION>...</ACTION> pair marks the start and end of an action definition. See section 6 for a detailed discussion of the Smart Client event model.

5.6 Edit boxes definition section

5.6.1 Description

The edit boxes definition section describes what edit boxes exist for the screen.

5.6.2 Structure

The edit boxes section has the following structure;

```
{wrapper tags}
<EB>
        <EVENTS>
                <EVENT>
                        <ACTION>...</ACTION>
                </EVENT>
        </EVENTS>
</EB>
{wrapper tags}
```

5.6.3 Tags

5.6.3.1 The EB tag

The <EB>...</EB> pair marks an edit box definition. It has the following attributes –

| Attribute | Optional? | Description |
|---|---|---|
| NAME | No | An identifier for the edit box. |
| TEXT | No | The text to display in the edit box before any entry has been made. Only used if the DATASRC attribute is invalid or omitted. Can be a scratchpad or query value of the form [SP.screen.savename] or [QU.query.field]. |
| INDEX | No | The order in which the edit box appears |
| CAPTION | No | The caption for on a given edit box. |
| MULTILINE | No | Boolean field that indicates whether the edit box is a multiline field. |
| SAVE | No | Boolean value indicating whether or not to save the value in this field to temporary storage for use by other screens later on. Saving the value to the scratchpad is triggered by either exiting the screen or by an explicit 'SAVE' action on a user interface control. |

FIG. 21AB

APPENDIX "A": ARML Specification

| SAVENAME | Yes | If present, the name to save the field under in the scratchpad. This attribute has no meaning unless the SAVE attribute is set to 'Yes' |
|---|---|---|
| X | Yes | The X-coordinate of the edit box on the screen. This attribute may not be meaningful in some display environments, in which case it would be skipped without processing by the parser |
| Y | Yes | The Y-coordinate of the edit box on the screen. This attribute may not be meaningful in some display environments, in which case it would be skipped without processing by the parser |
| HT | Yes | The Height of the Edit Box. This attribute may not be meaningful in some display environments, in which case it would be skipped without processing by the parser |
| WT | Yes | The Width of the Edit Box. This attribute may not be meaningful in some display environments, in which case it would be skipped without processing by the parser |
| FT | Yes | Specifies the type of value expected (INT, STRING, MEMO, DATETIME) for the VM to validate prior to continuing a Save. If omitted, STRING is the default data type. |
| DATASRC | Yes | If present, the query and field in the query that populates this edit box. This is given in the format "query.field". |
| READONLY | Yes | If "TRUE" the edit box will be read only, otherwise it is editable. "FALSE is the default value. |

5.6.3.2 The <EVENTS> tag

The <EVENT>...</EVENT> pair marks the start and end of a user-interface level event definition. See section 6 for a detailed discussion of the Smart Client event model.

5.6.3.3 The <EVENT> tag

The <EVENT>...</EVENT> pair marks the start and end of a user-interface level event definition. See section 6 for a detailed discussion of the Smart Client event model.

5.6.3.4 The <ACTION> tag

The <ACTION>...</ACTION> pair marks the start and end of an action definition. See section 6 for a detailed discussion of the Smart Client event model.

5.7 Choice items definition section
5.7.1 Description
The choice item definitions section describes the choice items that exist on a given screen. A choice item is an interface item that requires the user to make a selection from a list of options. It can be represented in different ways on different devices; on a RIM pager, it is a choice box, while on a WinCE device, it is a drop-down list.

5.7.2 Structure
The choice items section has the following structure;

```
{wrapper tags}
<CHOICE>
    <EVENTS>
        <EVENT>
            <ACTION>...</ACTION>
        </EVENT>
    </EVENTS>
    <ITEMS>
        <I>...</I>
    </ITEMS>
</CHOICE>
```

FIG. 21AC

APPENDIX "A": ARML Specification (wrapper tags)

5.7.3 Tags

5.7.3.1 The <CHOICE> tag

The <CHOICE>...</CHOICE> pair marks the start and end of a choice item definition. It has these attributes –

| Attribute | Optional? | Description |
|---|---|---|
| NAME | No | An identifier for the choice item. |
| TEXT | No | The text to display in the choice item before any selection has been made. |
| INDEX | No | The order in which the choice item appears |
| CAPTION | No | The caption that appears for a given choice item |
| SAVE | No | Boolean value indicating whether or not to save the value in this field to temporary storage for use by other screens later on. Saving the value to the scratchpad is triggered by either exiting the screen or by an explicit 'SAVE' action on a user interface control. |
| SAVENAME | Yes | If present, the name to save the field under in the scratchpad. This attribute has no meaning unless the SAVE attribute is set to 'Yes' |
| X | Yes | The X-coordinate of the choice item on the screen. This attribute may not be meaningful in some display environments, in which case it would be skipped without processing by the parser |
| Y | Yes | The Y-coordinate of the choice item on the screen. This attribute may not be meaningful in some display environments, in which case it would be skipped without processing by the parser |
| DATASRC | Yes | If present, the query and field in the query that populates this choice item. This is given in the format "query.field". |
| IDDATASRC | Yes | If present, the query and field in the query that populates the Ids for this choice item. This is given in the format "query.field". The ID values created by the attributes should correspond directly to the choice item values. I.e. they should create a value, id pair. |
| READONLY | Yes | If "True", the control cannot be modified. "False" is the default. |
| SI | Yes | The value to indicate which item of the choice item is to be selected when loaded. This value will be compared with the ID property (hard-coded items) or the IDDATASRC property (database items). |

5.7.3.2 The <ITEMS> tag

The <ITEMS>...</ITEMS> pair marks the start and end of a list of items to be included in the in the choice item. If a datasrc is specified, the <ITEMS> section is ignored.

5.7.3.3 The <I> tag

The <I>...</I> pair marks the start and end of an individual item in the choice items list. It has the following attributes:

| Attribute | Optional? | Description |
|---|---|---|
| ID | Yes | An id used to identify this item in the list. |

The value between the pair is the text value that is to be displayed in the choice item.

5.7.3.4 The <EVENTS> tag

The <EVENT>...</EVENT> pair marks the start and end of a user-interface level event definition. See section 6 for a detailed discussion of the Smart Client event model.

FIG. 21AD

APPENDIX "A": ARML Specification

5.7.3.5 The <EVENT> tag

The <EVENT>...</EVENT> pair marks the start and end of a user-interface level event definition. See section 6 for a detailed discussion of the Smart Client event model.

5.7.3.6 The <ACTION> tag

The <ACTION>...</ACTION> pair marks the start and end of an action definition. See section 6 for a detailed discussion of the Smart Client event model.

5.8 Checkboxes definition section

5.8.1 Description

The checkboxes section describes a check box that appears on a given screen.

5.8.2 Structure

The checkboxes section has the following structure;

```
{wrapper tags}
    <CHK>
        <EVENTS>
            <EVENT>
                <ACTION>...</ACTION>
            </EVENT>
        </EVENTS>
    </CHK>
{wrapper tags}
```

5.8.3 Tags

5.8.3.1 The CHK tag

The <CHK>...</CHK> pair marks a check box definition

| Attribute | Optional? | Description |
|---|---|---|
| NAME | No | An identifier for the check box. |
| INDEX | No | The index of this control with respect to the list of all controls on the screen. |
| CAPTION | No | The text to be displayed for this check box if the DATASRC is not available or is not specified. |
| Save | No | Boolean value indicating whether or not to save the value in this field to temporary storage for use by other screens later on. Saving the value to the scratchpad is triggered by either exiting the screen or by an explicit 'SAVE' action on a user interface control. |
| SAVENAME | Yes | If present, the name to save the field under in the scratchpad. This attribute has no meaning unless the SAVE attribute is set to 'Yes' |
| X | Yes | The X-coordinate of the check box on the screen. This attribute may not be meaningful in some display environments, in which case it would be skipped without processing by the parser |
| Y | Yes | The Y-coordinate of the check box on the screen. This attribute may not be meaningful in some display environments, in which case it would be skipped without processing by the parser |
| HT | Yes | The Height of the Checkbox. This attribute may not be meaningful in some display environments, in which case it would be skipped without processing by the parser |
| WT | Yes | The Width of the Checkbox. This attribute may not be meaningful in some display environments, in which case it would be skipped without processing by the parser |
| DATASRC | Yes | If present, the query and field in the query that populates this check box. This is given in the format "query.field". |

FIG. 21AE

APPENDIX "A": ARML Specification

| VALUE | Yes | If present, specifies the initial state of the check box ('TRUE' = checked, 'FALSE' = Unchecked. If unspecified, FALSE is the default value. |
|---|---|---|
| READONLY | Yes | If "TRUE" the check box cannot be modified. "FALSE" is the default value. |

5.8.3.2 The <EVENTS> tag

The <EVENT>...</EVENT> pair marks the start and end of a user-interface level event definition. See section 6 for a detailed discussion of the Smart Client event model.

5.8.3.3 The <EVENT> tag

The <EVENT>...</EVENT> pair marks the start and end of a user-interface level event definition. See section 6 for a detailed discussion of the Smart Client event model.

5.8.3.4 The <ACTION> tag

The <ACTION>...</ACTION> pair marks the start and end of an action definition. See section 6 for a detailed discussion of the Smart Client event model.

5.9 Listboxes definition section

5.9.1 Description

The listboxes section describes a list box that appears on a given screen.

5.9.2 Structure

The listboxes section has the following structure;

```
{wrapper tags}
    <LB>
        <EVENTS>
            <EVENT>
                <ACTION> ... </ACTION>
            </EVENT>
        </EVENTS>
        <ITEMS>
            <I> ... </I>
        </ITEMS>
    </LB>
{wrapper tags}
```

5.9.3 Tags

5.9.3.1 The LB tag

The <LB>...</LB> pair marks a list box definition

| Attribute | Optional? | Description |
|---|---|---|
| NAME | No | An identifier for the list box. |
| INDEX | No | The index of this control with respect to all of the controls on the screen. |
| CAPTION | No | The text to be displayed as the title of this list box, where applicable. |
| SAVE | No | Boolean value indicating whether or not to save the value in this field to temporary storage for use by other screens later on. Saving the value to the scratchpad is triggered by either exiting the screen or by an explicit 'SAVE' action on a user interface control. |
| SAVENAME | Yes | If present, the name to save the field under in the scratchpad. This attribute has no meaning unless the SAVE attribute is set to 'Yes' |
| X | Yes | The X-coordinate of the list box on the screen. This attribute may not be meaningful in some display environments, in which case it would be skipped without processing by the parser |

FIG. 21AF

APPENDIX "A": ARML Specification

| | | |
|---|---|---|
| Y | Yes | The Y-coordinate of the list box on the screen. This attribute may not be meaningful in some display environments, in which case it would be skipped without processing by the parser |
| HT | Yes | The Height of the Listbox. This attribute may not be meaningful in some display environments, in which case it would be skipped without processing by the parser |
| WT | Yes | The Width of the Listbox. This attribute may not be meaningful in some display environments, in which case it would be skipped without processing by the parser |
| DATASRC | Yes | If present, the query and field in the query that populates this list box. This is given in the format "query.field". |
| IDDATASRC | Yes | If present, the query and field in the query that populates the list box Ids. This is given in the format "query.field". This value will create a list of ID values that correspond to the list box values in DATASRC. I.e. they should create a value, id pair. |
| READONLY | Yes | If "TRUE" the list box cannot be modified. "FALSE" is the default. |
| SI | Yes | The value to indicate which item of the choice item is to be selected when loaded. This value will be compared with the ID property (hard-coded items) or the IDDATASRC property (database items). |

5.9.3.2 The <ITEMS> tag

The <ITEMS>...</ITEMS> pair marks the start and end of a list of items to be included in the in the list box. If a datasrc is specified, the <ITEMS> section is ignored.

5.9.3.3 The <I> tag

The <I>...</I> pair marks the start and end of an individual item in the list box items list. It has the following attributes:

| Attribute | Optional? | Description |
|---|---|---|
| ID | Yes | An id used to identify this item in the list. |

The value between the pair is the text value that is to be displayed in the list box. Can be a scratchpad or query value of the form [SP.screen.savename] or [QU.query.field].

5.9.3.4 The <EVENTS> tag

The <EVENT>...</EVENT> pair marks the start and end of a user-interface level event definition. See section 6 for a detailed discussion of the Smart Client event model.

5.9.3.5 The <EVENT> tag

The <EVENT>...</EVENT> pair marks the start and end of a user-interface level event definition. See section 6 for a detailed discussion of the Smart Client event model.

5.9.3.6 The <ACTION> tag

The <ACTION>...</ACTION> pair marks the start and end of an action definition. See section 6 for a detailed discussion of the Smart Client event model.

5.10 Grids

FIG. 21AG

APPENDIX "A": ARML Specification

5.10.1 Description
Grids allow data to be displayed in row-column format. Grids can display data from a data source (query) or they can contain hard coded values. Each column in a grid can be visible or hidden. Hidden values are maintained, but not visible to the user.

5.10.2 Structure
The grids section has the following structure;

```
(wrapper tags)
      <GRID>
            <COLS>
                  <COL> ... </COL>
            </COLS>
            <ROWS>
                  <R>
                        <V> ... </V>
                  </R>
            </ROWS>
      </GRID>
(wrapper tags)
```

5.10.3 Tags

5.10.3.1 GRID Tag

<GRID>...</GRID> The grid item itself will have the following attributes

| Attribute | Optional? | Description |
|---|---|---|
| NAME | No | An identifier for the edit box. |
| INDEX | No | The order in which the edit box appears |
| X | Yes | The X-coordinate of the edit box on the screen. This attribute may not be meaningful in some display environments, in which case it would be skipped without processing by the parser |
| Y | Yes | The Y-coordinate of the edit box on the screen. This attribute may not be meaningful in some display environments, in which case it would be skipped without processing by the parser |
| HT | Yes | The Height of the Edit Box. This attribute may not be meaningful in some display environments, in which case it would be skipped without processing by the parser |
| WT | Yes | The Width of the Edit Box. This attribute may not be meaningful in some display environments, in which case it would be skipped without processing by the parser |
| GRDSRC | Yes | This is the Query on the screen that will provide the data to the grid. No field name will be specified in this value |

5.10.3.2 COLS Tag
<COLS>...</COLS> This tag contains no attributes. But instead contains all the columns that are associated with the grid in the order in which they appear from left to right.

5.10.3.3 COL Tag
<COL>...</COL> This tag will determine the column specification for the grid. The attributes for this item are the following:

| Attribute | Optional? | Description |
|---|---|---|

FIG. 21AH

APPENDIX "A": ARML Specification

| CAPTION | Yes | This is the caption that appears at the top of the grid where applicable. |
|---|---|---|
| FIELDNAME | Yes | This field name represents the Field to pull information from out of the GRDSRC of the grid control. |
| SAVE | No | This true false value will be checked when the SAVE action is called to save values to the scratchpad |
| SAVENAME | Yes | This is the name in which the data will be saved when the SAVE action is called and the column is marked for Saving |
| WT | Yes | The Width of the Edit Box. This attribute may not be meaningful in some display environments, in which case it would be skipped without processing by the parser |

5.10.3.4 ROWS Tag

<ROWS>...</ROWS> This will Indicate any hard coded rows that would be created in the design studio. It does not contain any attributes but instead contains all the row definitions.

5.10.3.5 R Tag

<R>...</R> This is the row declaration that contains all the values for the row that has been hard coded. It has no attributes itself, but contains the value definitions for the row.

5.10.3.6 V Tag

<V>...</V> This definition contains the data that is related to the ROW and to the column.

5.10.4 Example

An example of a grid declaration is as follows:

```
<GRID INDEX="2" NAME="mygrid" X="10" Y="50" HT="100" WT="100" GRDSRC="QUERY1">
<COLS>
<COL CAPTION="Id" FIELDNAME="IngID" SAVE="TRUE" SAVENAME="IngID" WT="20"></COL>
<COL CAPTION="Subject" FIELDNAME="strSubject" SAVE="TRUE" SAVENAME="Sub" WT="80"></COL>
</COLS>
<ROWS>
  <R>
    <V>343432</V>
    <V>This is a subject</V>
  </R>
  <R>
    <V>5456</V>
    <V>This is another subject</V>
  </R>
</ROWS>
</GRID>
```

6 The Smart Client Event Model

The Smart Client has a set of actions that it ties to events. Events can occur at the application level, the screen level or the user interface item level; an application level event is listened for throughout the operation of the application, a screen level event is listened for while the screen is displayed, and so on. If an action for an event is defined at multiple levels, the lowest level has precedence; i.e., user interface actions override screen level actions, which override application level actions. An attempt to list an event multiple times at the same level (application, screen, item) is invalid and will generate an error message. The following ARML fragment illustrates this schema (tags and attributes not relevant to the event model have been omitted);

FIG. 21AI

APPENDIX "A": ARML Specification

```
<AXTSCHDEF>
    <EVENTS>
        <EVENT>
            <ACTION>...</ACTION>
            <ACTION>...</ACTION>
        <EVENTS>
        <EVENT>
            <ACTION>...</ACTION>
        </EVENT>
    </EVENTS>
    <INTERFACE>
        <SCREEN>
            <EVENT>
                <ACTION>...</ACTION>
            </EVENT>
            <EVENT>
                <ACTION>...</ACTION>
            </EVENT>
            <BUTTON>
                <EVENT>
                    <ACTION>...</ACTION>
                </EVENT>
                <EVENT>
                    <ACTION>...</ACTION>
                </EVENT>
            </BUTTON>
        </SCREEN>
    </INTERFACE>
</AXTSCHDEF>
```

6.1 The EVENTS tag
The <EVENTS>...</EVENTS> pair marks the start and end of the events section. It has no attributes.

6.2 The EVENT tag
The <EVENT>...</EVENT> pair marks the start and end of an event definition. It has the following attributes;

| Attribute | Optional? | Description |
|-----------|-----------|-------------|
| TYPE | No | The type of event that should be performed when the button is pushed. Allowed values are;<br>BUTTONCLICK<br>MENUITEMSELECTED<br>DATA |

6.2.1 The BUTTONCLICK event
The button click event occurs when the user selects a button. It has no attributes.

6.2.2 The MENUITEMSELECTED event
The menu items selected event occurs when the user selects a menu item. It has no attributes.

6.2.3 The DATA event
The data event occurs when ARML data is received from the wireless interface. It has the following attributes;

FIG. 21AJ

APPENDIX "A": ARML Specification

| Attribute | Optional? | Description |
|---|---|---|
| NAME | No | The identifier of the specific package |

6.3 The ACTION tag

The <ACTION>...</ACTION> pair marks the start and end of an event definition. It has one fixed attribute, and a number of attributes that may or may not appear depending on the type of action required. The fixed attribute is;

| Attribute | Optional? | Description |
|---|---|---|
| TYPE | No | The type of action that should be performed when the button is pushed. Allowed values are; <br> OPEN <br> ARML <br> SAVE <br> PURGE <br> NOTIFY <br> CLOSE <br> ALERT <br> IF...Then...Else <br> CLOSESCREEN <br> REFRESH <br> SAVEITEM |

6.3.1 The OPEN action

The open action tells the Smart Client to open a new screen. It adds one extra attribute to the ACTION tag;

| Attribute | Optional? | Description |
|---|---|---|
| NAME | No | The name of the screen to open |
| NEWINST | Yes | If true, a new instance of the screen is created. If false, the least recently used instance of the screen is opened and the data is not refreshed. True is the default. |

6.3.2 The ARML action

The arml action tells the Smart Client to compose and send an arml package. It does not add any attributes to the ACTION tag, but has the following subtag;

<ARMLTEXT>

Contained between the <ARMLTEXT>...</ARMLTEXT> pair is one of the application-defined data packages. Individual data items are marked with the user interface item that their value should be taken from, in the format "[SP.*screen.savename*]", or [QU.*query.field*]. If *screen* is not the current screen, then the Smart Client will look for the data in its scratchpad. See section 0 for an example of the ARML action.

6.3.3 The SAVE action

The save action tells the Smart Client to save all fields marked as persistent (i.e., they are defined with SAVE="Yes") to be saved to the scratchpad area. It has no attributes.

FIG. 21AK

APPENDIX "A": ARML Specification

6.3.4 The PURGE action
The purge action tells the Smart Client to clear all fields that have been saved to the scratchpad. It has no attributes.

6.3.5 The NOTIFY action
The notify action tells the Smart Client to activate the configured notification on a device. For devices where this has no meaning, it will cause a beep to be played. It has no attributes.

6.3.6 The CLOSE action
The close action tells the Smart Client to close the application. It has no attributes.

6.3.7 The ALERT action
The alert action tells the Smart Client to display an alert item (e.g., a message box on Windows, an alert box on the RIM pager, an alert card on WAP). It has the following attributes;

| Attribute | Optional? | Description |
| --- | --- | --- |
| CAPTION | Yes | The caption to display in the title bar of the message box |
| TEXT | Yes | The text to display in the message box |

6.3.8 The INTEGRATION action
The integration action tells the Smart Client to pass data to an interface exposed on a device. For example a COM interface on Pocket PC. This action will allow the developer to pass a parameter into an exposed method and then also save the result of that method in a global scratchpad value. The contents of the integration action's element are the input values to be passed to the interface. It has the following attributes;

| Attribute | Optional? | Description |
| --- | --- | --- |
| CLSID | No | This is the class identifier of the component that is to be called. |
| SAVE | No | This tells the smart client if it should save the result into a global scratchpad value or not. |
| SAVENAME | Yes | This is the name of the global scratchpad value |

Example ARML:

<ACTION TYPE="*INTEGRATION*" CLSID="*AirixSignature.AirixSignatureCtrl*" SAVENAME="" SAVE="*FALSE*">*[SP.*.SIGNATURE]*</ACTION>

6.3.9 The CLOSESCREEN action
The close screen action tells the Smart Client to close all open instances of the screen specified by name in the NAME attribute. This action has the following attributes:

| Attribute | Optional? | Description |
| --- | --- | --- |
| NAME | No | Name of the screen to close. |

6.3.10 The REFRESH action
The refresh action tells the Smart Client to re-run any queries and re-initialize all UI elements on the screen with the name specified by the NAME attribute. If there are multiple

FIG. 21AL

APPENDIX "A": ARML Specification open instances of the screen, all open instances will be refreshed. The refresh action has the following attributes:

| Attribute | Optional? | Description |
|---|---|---|
| NAME | No | Name of the screen to refresh. |

6.3.11 The SAVEITEM action

The saveitem action tells the Smart Client to create a new scratchpad item or to edit an existing scratchpad item. The value of the scratchpad item is defined within the <ACTION>...</ACTION> tags. The saveitem action has the following attributes:

| Attribute | Optional? | Description |
|---|---|---|
| SPN | No | Name of the scratchpad item to create or modify. |

6.3.12 The IF Action

This action will contain two lists of actions. One a list of actions to perform if the condition evaluates to TRUE (IFLIST), and another list of actions to perform if the condition evaluates to FALSE (ELSEIFLIST).

The structure of the action is as follows:
```
<ACTION TYPE="IF">
    <COND EVAL="parameter" TYPE="condition type" VALUE="literal">
    </COND>
    <IFLIST>
        <ACTION></ACTION>
    </IFLIST>
    <ELSEIFLIST>
        <ACTION></ACTION>
    </ELSEIFLIST>
</ACTION>
```

6.3.12.1 Conditions (COND)

Conditions are used in conjunction with the IF Action. Conditions are specified as follows:

| Attribute | Optional? | Description |
|---|---|---|
| EVAL | NO | Specifies the parameter to be evaluated. Can be hard coded, scratchpad, or query values. It is the "input" to the function. |
| TYPE | NO | Specifies the type of the condition. Possible values are:<br>LESSTHAN<br>MORETHAN<br>EQUALS<br>ISNUMERIC<br>ISALPHA<br>ISEMAIL<br>ISFORMAT<br>MAXCHARS<br>MINCHARS |
| VALUE | Depends on TYPE | The value that EVAL will be evaluated against. Not relevant for all conditions. |

The following is a description of each of the supported conditions:
- EQUALS, this function will take an input and a value to evaluate the input against. If the two items are determined to be Equal, the condition will return true. If they are

FIG. 21AM

APPENDIX "A": ARML Specification not equal, the condition will return false. The value and the input must be of the same data type, otherwise the condition will return false. Memo values will be treated as a string and auto-increment types will be treated as integers. The following criteria will be used to determine equality:
- o Two strings are equal if each of the characters in the strings is identical and the strings have the same number of characters. The string comparison will not be case sensitive.
- o Two integers are equal if their values are mathematically equal.
- MORETHAN, this function will take an input and a value to evaluate the input against. If the input is determined to be greater in value than the evaluation value, the condition will return true. If the values are equal, false is returned. If the evaluation value is determined to be greater than the input, the function will return false. The evaluation value and the input must be of the same data type, otherwise an error condition will occur. Memo values will be treated as a string and the auto-increment type will be treated as an integer. The following criteria will be used to determine which value is greater:
  - o String A is more in value than String B if String A occurs before String B in alphabetical order.
  - o Integer A is greater than Integer B if A > B, mathematically.
- LESSTHAN, this function will take an input and a value to evaluate the input against. If the input is determined to be lesser in value than the evaluation value, the condition will return true. If the values are equal, false is returned. If the evaluation value is determined to be lesser than the input, the function will return false. The evaluation value and the input must be of the same data type, otherwise an error condition will occur. Memo values will be treated as a string and the auto-increment type will be treated as an integer. The following criteria will be used to determine which value is greater:
  - o String A is lesser in value than String B if String A occurs after String B in alphabetical order.
  - o Integer A is greater than Integer B if A < B, mathematically.
- ISNUMERIC, this function will take an input and evaluate whether or not it is a value number. If the input can be converted successfully to a number, the function will return true. If the input cannot be converted to a number, the function will return false. All input values will be treated as a string data type.
- ISALPHA, this function will take an input and evaluate whether or not it contains only alphabetic characters. Alphabetic characters are defined as all characters from A-Z, a-z,, and spaces. All input values will be treated as a string data type.
- ISEMAIL, this function will take an input and evaluate whether or not it contains a string of the form *something@something*. All input values will be treated as a string data type.
- ISFORMAT, this function will take an input and a value to evaluate the input against. If the input is determined to be formatted as the evaluation value, the condition will return true. If the evaluation value is determined to be formatted differently than the input, the function will return false. The evaluation value must comply with the ARML formatting standards.
- MAXCHARS, this function will take an input and evaluate whether or not the number of characters in the string is less than or equal to the evaluation value passed into the function. If the number of characters in the string is less than or equal to the evaluation value, true is returned. If the number of characters in the string is greater

FIG. 21AN

APPENDIX "A": ARML Specification than the evaluation value, false is returned. All input values will be treated as a
string data type.
- MINCHARS, this function will take an input and evaluate whether or not the
  number of characters in the string is greater than or equal to the evaluation value
  passed into the function. If the number of characters in the string is greater than or
  equal to the evaluation value, true is returned. If the number of characters in the
  string is less than the evaluation value, false is returned. All input values will be
  treated as a string data type.

Example:
```
<ACTION TYPE="IF">
    <COND EVAL="[QUERY1.STRREAD]" TYPE="EQUALS" VALUE="READ"></COND>
    <IFLIST>
        <ACTION TYPE="SAVE"></ACTION>
        <ACTION TYPE="OPEN" NAME="INBOX" NEWINST="FALSE"></ACTION>
    </IFLIST>
    <ELSELIST>
        <ACTION TYPE="OPEN" NAME="MSGREAD" NEWINST="FALSE"></ACTION>
    </ELSELIST>
</ACTION>
```

Example of airix event model

The following example serves to illustrate how a screen is used to compose a data package
to be sent back to the AIRIX server. The example used is a screen giving the bare
functionality for composing a basic email message – to simplify the example, the user
cannot cancel the action, and multiple recipients are not allowed.

```
<ARML>
    <SCREEN NAME="NewMsg">
        <BUTTONS>
            <BTN NAME="OK" CAPTION="Send" INDEX="0">
                <EVENTS>
                    <EVENT TYPE="MODIFY">
                        <ACTION TYPE="ARML">
                            <ARMLTEXT>
                                <BODY TYPE="ME">
                                    <ME MSGID="1" FROM="Tim Neil"
                                        SUBJECT="[SP.NewMsg.Subject]">
                                        <DATA>[SP.NewMsg.Body]</DATA>
                                        <RECIPS>
                                            <RCP MSGID="1"
                                                TO="[SP.NewMsg.To]"></RCP>
                                        </RECIPS>
                                    </ME>
                                </BODY>
                            </ARMLTEXT>
                        </ACTION>
                    </EVENT>
                </EVENTS>
            </BTN>
        </BUTTONS>
        <EDITBOXES>
            <EB NAME="To" INDEX="1"></EB>
            <EB NAME="Subject" INDEX="2"></EB>
            <EB NAME="Body" INDEX="3"></EB>
```

FIG. 21AO

APPENDIX "A": ARML Specification

```
    </EDITBOXES>
  </SCREEN>
</ARML>
```

The Editboxes section at the bottom defines 3 editboxes, with the names of 'To', 'Subject', and 'Body';

```
<EB NAME="To" INDEX="1"></EB>
<EB NAME="Subject" INDEX="2"></EB>
<EB NAME="Body" INDEX="3"></EB>
```

There is one button on the screen, with the name of 'OK';

```
<BTN NAME="OK" CAPTION="Send" INDEX="0">
```

When the user clicks on OK, the button composes an ARML package to be sent to the AIRIX server;

```
<EVENT>
    <ACTION TYPE="ARML">
```

The ARML package sent is an 'ME' package as described in the example in section 4.2.1. It is composed as follows;

```
<BODY TYPE="ME">
    <ME MSGID="1" FROM="Tim Neil"
        SUBJECT="[SP.NewMsg.Subject]">
        <DATA>[SP.NewMsg.Body]</DATA>
        <RECIPS>
            <RCP MSGID="1" TO="[SP.NewMsg.To]"></RCP>
        </RECIPS>
    </ME>
</BODY>
```

The subject field is taken from the edit box named 'Subject';

```
<ME MSGID="1" FROM="Tim Neil" SUBJECT="[SP.NewMsg.Subject]">
```

The recipients field is taken from the edit box named 'Subject';

```
<RECIPS>
    <RCP MSGID="1" TO="[SP.NewMsg.To]"></RCP>
</RECIPS>
```

Finally the text of the message is filled from the 'Body' field;

```
<DATA>[SP.NewMsg.Body]</DATA>
```

7 AVM-server system interactions

This section describes the primitives that are used for system-level interactions that the AIRIX Smart Client has with the AIRIX server.

FIG. 21AP

APPENDIX "A": ARML Specification

7.1 General
7.1.1 Description
System level packages are sent between AIRIX and the AVM (wirelessly).

7.1.2 Structure
System interactions are performed by exchanging ARML data packages with the following structure;

```
<ARML>
<HEAD>...</HEAD>
<SYS>
(data)
</SYS>
</ARML>
```

7.1.3 Tags

7.1.3.1 The <HEAD> tag
The package header is delimited by the <HEAD>...</HEAD> tags. Contained in text between the two tags is the id of the destination mobile. The HEAD tag has the following attributes;

| Attribute | Optional? | Description |
| --- | --- | --- |
| DT | No | The date & time in RFC 1123 format (including time zone) |
| ID | No | A unique ID for the message |
| VERSION | No | The version number of the application (currently "2.0") |
| APPNAME | No | The application name ("0" for System Messages) |
| DEVICE | No | A numeric constant identifying the device |
| PID | Yes | A unique value used to designate a device. |
| AVMV | No | The version number of the Smart Client. |

7.1.3.2 The <SYS> tag
The <SYS>...</SYS> pair contains the actual system package. The tag does not have any attributes.

FIG. 21AQ

APPENDIX "A": ARML Specification

7.2 Device Registration & deregistration package

7.2.1 Description
Device registration packages are sent from the AVM to the AIRIX server when a user registers their device.

7.2.2 Structure
A device registration package has the following structure;

```
{wrapper tags}
<REG>
        <USERNAME> {data} </USERNAME>
        <PASSWORD> {data} </PASSWORD>
</REG>
{wrapper tags}
```

7.2.3 Tags

7.2.3.1 The <REG> tag
The <REG>...</REG> pair delimit the registration request. The tag has no attributes.

7.2.3.2 The <USERNAME> tag
The <USERNAME>...</ USERNAME > pair contain the user name. The tag does not have any attributes.

7.2.3.3 The <PASSWORD> tag
The <PASSWORD>...</PASSWORD> pair contain the password. The tag does not have any attributes.

7.2.4 Example
This package would be sent by a user, to register their device under a given name;

```
{wrapper tags}
<REG>
        <USERNAME>SUNTRESS</USERNAME>
        <PASSWORD>MYPASS</PASSWORD>
</REG>
{wrapper tags}
```

FIG. 21AR

APPENDIX "A": ARML Specification

7.3 Registration confirmation package

7.3.1 Description
This packages is sent back from the AIRIX server to the AVM to confirm that the device has been registered.

7.3.2 Structure
A registration confirmation package has the following structure;

```
{wrapper tags}
<REGCONFIRM>
        <VALUE> (data) </VALUE>
        <APPS>
                <APP></APP>
                <APP></APP>
        </APPS>
</REGCONFIRM>
{wrapper tags}
```

7.3.3 Tags

7.3.3.1 The <REGCONFIRM> tag

The <REGCONFIRM>...</REGCONFIRM> pair delimit the confirmation. The tag has no attributes.

7.3.3.2 The <VALUE> tag

The <VALUE>...</VALUE> pair contains the status of the registration request. The following text strings are allowable;

CONFIRM – this means that the registration request was successful
NOTREGPLATFORM – this means that the registration request failed because the device is not registered for the platform
INVALIDUSERPASS – this means that the registration request failed because the user name or password was not valid
NODEVICE – this means that the registration request failed because the device was not registered previously by an application

7.3.3.3 The <APPS> tag

The <APPS>...</APPS> pair contains a list of applications for the device.

7.3.3.4 The <APP> tag

The <APP>...</APP> pair contains an application header. It has the following attributes;

| Attribute | Optional? | Description |
|---|---|---|
| ID | No | The application ID |
| NAME | No | The name of the application |
| DESCRIPTION | No | A text description of the application |
| REG | No | 'YES' if the user is registered for this application. 'NO' if they are not. |

7.3.4 Example
This package would be sent to confirm the example request in section 7.2.4;
```
{wrapper tags}
<REGCONFIRM>
```

APPENDIX "A": ARML Specification

```
    <VALUE>CONFIRM</VALUE>
    <APPS>
        <APP ID="4" NAME="EMAIL" DESCRIPTION="E-Mail Application" REG="YES">
        <APP ID="22" NAME="STOCKS" DESCRIPTION="Stock Quotes" REG="NO">
    </APPS>
</REGCONFIRM>
(wrapper tags)
```

FIG. 21AT

APPENDIX "A": ARML Specification

7.4 Find applications package
7.4.1 Description
Find applications packages are sent from the AIRIX component to the AIRIX server when a user wishes to refresh their list of applications on a device

7.4.2 Structure
A device registration package has the following structure;

```
(wrapper tags)
<FINDAPPS>
</FINDAPPS>
(wrapper tags)
```

7.4.3 Tags

7.4.3.1 The <FINDAPPS> tag
The <FINDAPPS>...</FINDAPPS> pair delimit the application registration request. It has no attributes.

FIG. 21AU

APPENDIX "A": ARML Specification

7.5 Find applications confirmation package

7.5.1 Description

This package is sent back from the AIRIX server to the AVM to and contains a list of applications available for the user

7.5.2 Structure

A registration confirmation package has the following structure;

```
(wrapper tags)
<FINDAPPSCONFIRM>
        <APPS>
                <APP></APP>
                <APP></APP>
        </APPS>
</FINDAPPSCONFIRM>
(wrapper tags)
```

7.5.3 Tags

7.5.3.1 The <FINDAPPSCONFIRM> tag

The <FINDAPPSCONFIRM>...</FINDAPPSCONFIRM> pair delimit the confirmation. The tag has no attributes.

7.5.3.2 The <APPS> tag

The <APPS>...</APPS> pair contains a list of applications for the device.

7.5.3.3 The <APP> tag

The <APP>...</APP> pair contains an application header. It has the following attributes;

| Attribute | Optional? | Description |
|---|---|---|
| ID | No | The application ID |
| NAME | No | The name of the application |
| DESCRIPTION | No | A text description of the application |
| REG | No | 'YES' if the user is registered for the application. 'NO' if they are not. |

FIG. 21AV

APPENDIX "A": ARML Specification

7.6 Application Registration & deregistration package

7.6.1 Description

Application registration packages are sent from the AIRIX component to the AIRIX server when a user wishes to register or deregister for an application.

7.6.2 Structure

A device registration package has the following structure;

```
{wrapper tags}
<APPREG>
</APPREG>
{wrapper tags}
```

7.6.3 Tags

7.6.3.1 The <APPREG> tag

The <APPREG>...</APPREG> pair delimit the application registration request. The tag has the following attributes;

| Attribute | Optional? | Description |
|---|---|---|
| TYPE | No | This defines the type of parameter. It can take two values;<br>ADD – this means that the application is to be added to the registration database<br>DELETE – this means that the application is to be removed to the registration database |
| ID | No | The ID of the application being registered/deregistered |

FIG. 21AW

APPENDIX "A": ARML Specification

7.7 Application registration & deregistration confirmation package

7.7.1 Description

This packages is sent back from the AIRIX server to the AVM to confirm that the applicaiton has been registered or deregistered.

7.7.2 Structure

A registration confirmation package has the following structure (note that for DELETE types, the <INTERFACE>...</INTERFACE> section will not be included);

```
(wrapper tags)
<APPREGCONFIRM>
        <INTERFACE>
                interface definition
        </INTERFACE>
</APPREGCONFIRM>
(wrapper tags)
```

7.7.3 Tags

7.7.3.1 The <APPREGCONFIRM> tag

The <APPREGCONFIRM>...</APPREGCONFIRM> pair delimit the confirmation. The tag has the following attributes;

| Attribute | Optional? | Description |
|---|---|---|
| TYPE | No | This defines the type of parameter. It can take two values; ADD – this means that the application is to be added to the registration database DELETE – this means that the application is to be removed to the registration database |
| ID | Yes | The ID of the application being returned (if any) |

7.7.3.2 The <INTERFACE> tag

The <INTERFACE>...</INTERFACE> pair delimit the interface definition. The tag has the no attributes, and contains an interface definition as laid out in section 3. Note that instead of the <DEVICES>...</DEVICES> tags in section 3.1.3.6, it will be replaced by <SCREENS>...<SCREENS> with the screen definitions for only the one device that the interface is being sent to (see section 3.4.3.2 for the definition of the <SCREENS> tag). This section will not be sent for APPREGCONFIRM messages of TYPE="DELETE".

7.7.4 Example

The following example shows the application confirmation with screen definitions for an application that allows a user to view their inbox and the mails in it.

```
(wrapper tags)
<APPREGCONFIRM TYPE="ADD" ID="12">
        <INTERFACE>
                <AXSCHDEF>
                                                <EVENTS>
                                                        <EVENT>
                                (action definitions)
                                                        </EVENT>
                                                </EVENTS>
                        <AXTDEFS>
                                (table definitions)
```

FIG. 21AX

APPENDIX "A": ARML Specification

```
            </AXTDEFS>
            <DPACKETS>
                    (data package definitions)
            </DPACKETS>

<SCREENS>
                    <SCREEN NAME="INBOX ">
                            (screen definition)
                    </SCREEN>
                    <SCREEN NAME="VIEWNEWMAIL">
                            (screen definition)
                    </SCREEN>
            </SCREENS>
        </AXSCHDEF>
    </INTERFACE>
</APPREGCONFIRM>
(wrapper tags)
```

APPENDIX "A": ARML Specification

7.8 Setting the active device package

7.8.1 Description
If a user wishes to set the current device as their active device, the AVM must send a 'set active device' package to the AIRIX server

7.8.2 Structure
A 'set active device' package has the following structure;

```
{wrapper tags}
<SA>
{data}
</SA>
{wrapper tags}
```

7.8.3 Tags

7.8.3.1 The <SA> tag
The 'set active device' package is shown by the <SA>...</SA> tags. The tag has no attributes; the tag pair contains the user's username

7.8.4 Example
This package would be sent by a user with the username of 'scotty';

```
{wrapper tags}
<SA>scotty</SA>
{wrapper tags}
```

7.9 Set active device response

7.9.1 Description
This packages is sent back from the AIRIX server to the client in response to a request to set the current device as the active one.

7.9.2 Structure
A 'set active device response' package has the following structure;

```
{wrapper tags}
<SACONFIRM>
        <VALUE> {data} </VALUE>
</SACONFIRM>
{wrapper tags}
```

7.9.3 Tags

7.9.3.1 The <SACONFIRM> tag
The <SACONFIRM>...</SACONFIRM> pair delimit the confirmation. The tag does not have any attributes.

7.9.3.2 The <VALUE> tag
The <VALUE>...</VALUE> pair contains the status of the registration request. The following text strings are allowable;

CONFIRM – this means that the registration request was successful

FIG. 21AZ

APPENDIX "A": ARML Specification

NOTREGISTERED – this means that the registration request failed because

7.9.4 Example
This package would be sent by the AIRIX server to confirm a set active request;

```
{wrapper tags}
<SACONFIRM>
      <VALUE>CONFIRM</VALUE>
</SACONFIRM>
{wrapper tags}
```

7.10 Invalid Application package
7.10.1 Description
This package is sent back from the AIRIX server to the AVM in response to a request to interact with an application that is no longer registered with AIRIX.

7.10.2 Structure
An 'invalid application' package has the following structure;

```
{wrapper tags}
<NOAPP>
      <VALUE> {data} </VALUE>
</NOAPP>
{wrapper tags}
```

7.10.3 Tags

7.10.3.1 The <NOAPP> tag
The <NOAPP>...</NOAPP> pair delimit the confirmation. The tag has no attributes.

7.10.3.2 The <VALUE> tag
The <VALUE>...</VALUE> pair delimit the return code. It can only be
NOAPPLICATION – Application not found.

7.10.4 Example
This package would be sent in response to a request if the application cannot be found;

```
{wrapper tags}
<NOAPP>
      <VALUE>NOAPPLICATION</VALUE>
</NOAPP>
{wrapper tags}
```

8 Application-Server System Interactions

The section that defines Application to server system interactions has been made obsolete by the document "AIRIX Polling XML Language Specification". It describes an XML-HTTP interface to AIRIX using POST and GET commands to a web-based ISAPI DLL.

FIG. 21BA

APPENDIX "A": ARML Specification

9 ARML future developments

The following enhancements to ARML are planned;

- Tokenisation
- Support for on-line help
- Compression techniques
- Enhanced editboxes
    o input masks
    o multi-value entry
- Multiple selection list boxes
- A per-application splash screen

EXECUTION OF TEXTUALLY-DEFINED INSTRUCTIONS AT A WIRELESS COMMUNICATION DEVICE

COPYRIGHT NOTICE

A portion of the disclosure of this patent document contains material which is subject to copyright protection. The copyright owner has no objection to the facsimile reproduction by any one of the patent document or patent disclosure, as it appears in a Patent Office patent file or records, but otherwise reserves all copyright rights whatsoever.

FIELD OF THE INVENTION

The present invention relates to wireless communication devices, and more particularly to the execution of textually-defined instructions at a wireless communication device.

BACKGROUND OF THE INVENTION

Wireless connectivity is a feature of the modem telecommunications environment. An increasing range of people are using wireless communication devices (also referred to as mobile devices) to access corporate data applications over wireless data networks. Many different types of wireless communication devices exist. These devices may have dissimilar operating system and display characteristics.

It would be desirable for such wireless communication devices to be capable of executing textually-defined instructions.

BRIEF DESCRIPTION OF THE DRAWINGS

In the figures which illustrate example embodiments of this invention:

FIGS. 21A-21BB collectively constitute Appendix A illustrating supported XML elements.

DETAILED DESCRIPTION

Figure 1:
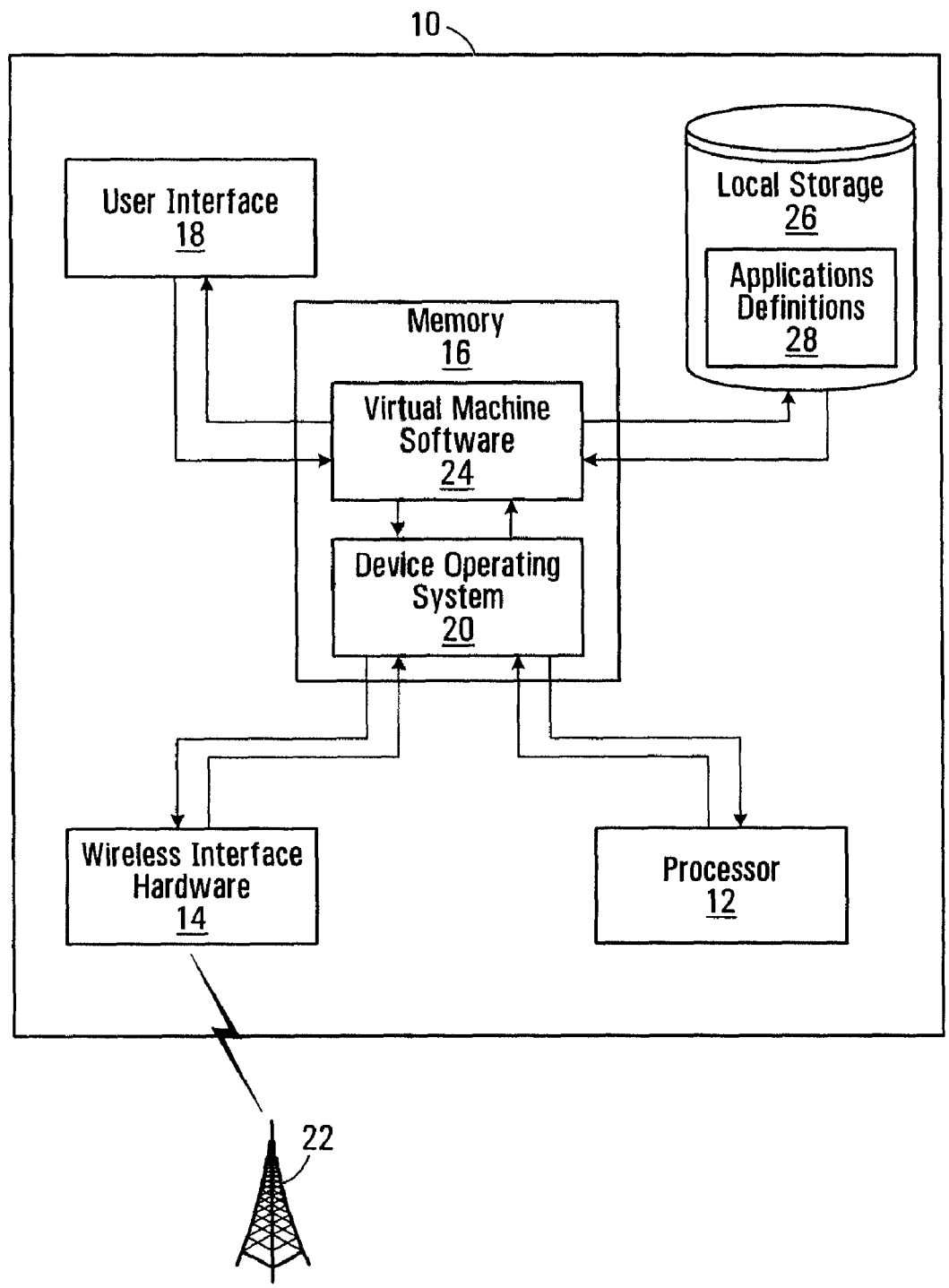
FIG. 1 schematically illustrates a wireless communication device, exemplary of an embodiment of the present invention, including virtual machine software, further exemplary of an embodiment of the present invention.

The exemplary embodiment described herein pertains to the execution of textually-defined instructions at a wireless communication device. The embodiment may be used in conjunction with a system that presents server-side applications at varied wireless communication devices as described in U.S. Patent Publication No. US 2003/0060896. The system described in that publication is referred hereinto as the "baseline system" for convenience. A description of a baseline system is initially provided below under the section heading "I. Baseline System Facilitating Execution of Server Side Applications At Wireless communication devices". Thereafter, a description of a rapid application development (RAD) tool which may be used to facilitate creation of the application definition files that are employed at wireless communication devices within the baseline system is provided under the section heading "II. Rapid Application Development Tool". These descriptions provide a context for the subsequent description in section III of software, devices and methods for executing textually-defined instructions at a wireless communication device, which is the focus of the present description.

In one aspect of the below-described embodiment, there is provided a wireless communication device, comprising: a processor; machine-readable memory in communication with the processor, storing machine-executable virtual machine software controlling operation of the device, the virtual machine software comprising: machine-executable code for receiving a textual representation of a for-loop specifying one or more actions to be performed upon each pass through the for-loop; machine-executable code for creating, based on the textual representation, an instance of an object-oriented class representative of the for-loop, the instance having a method including instructions defining a loop; and machine-executable code for creating, for each of the one or more actions to be performed, an instance of an object-oriented class representative of the action, each said instance having a method including instructions for performing the action, each said method being invoked once for each pass through the loop.

In another aspect of the below-described embodiment, there is provided a machine-readable medium including machine-executable code for execution at a wireless communication device, comprising: machine-executable code for receiving a textual representation of a for-loop specifying one or more actions to be performed upon each pass through the for-loop; machine-executable code for creating, based on the textual representation, an instance of an object-oriented class representative of the for-loop, the instance having a method including instructions defining a loop; and machine-executable code for creating, for each of the one or more actions to be performed, an instance of an object-oriented class representative of the action, each said instance having a method including instructions for performing the action, each said method being invoked once for each pass through the loop.

In still another aspect of the below-described embodiment, there is provided a computer-implemented method comprising: receiving a textual representation of a for-loop specifying one or more actions to be performed upon each pass through the for-loop; creating, based on the textual representation, an instance of an object-oriented class representative of the for-loop, the instance having a method including instructions defining a loop; and creating, for each of the one or more actions to be performed, an instance of an object-oriented class representative of the action, each said instance having a method including instructions for performing the action, each said method being invoked once for each pass through the loop.

In yet another aspect of the below-described embodiment, there is provided a wireless communication device comprising: a processor; machine readable memory in communication with the processor, storing machine-executable virtual machine software controlling operation of the device, the virtual machine software comprising: a parser for receiving a text file; a screen generation engine, for presenting at least one user interface screen at the device in accordance with the text file; at least one event handling routine for processing events arising in response either to interaction with the at least one user interface screen or to a message received over a wireless network in accordance with the text file; and at least one object class corresponding to an action to be performed by the device in response either to the interaction with the at least one screen or to the message received over the wireless network, the action being defined textually in the text file, the action further being selected from the group consisting of performing a mathematical operation upon specified numerical operands, performing one or more specified actions for each pass through a loop, performing one of two sets of actions based on a user selection of one of two user interface controls, and triggering a timer for delaying a subsequent action by a specified time interval.

I. Baseline System Facilitating Execution of Server-Side Applications at Wireless Communication Devices In overview, a system which facilitates execution of server-side applications at wireless communication devices (also referred to as "mobile devices" in the above-noted publication) utilizes a text-based application definition file to govern the manner in which an application is presented at a wireless communication device. The application definition file contains a description of how an application is to be presented at wireless communication device, the format of transactions over the wireless network, and a format of data related to the application to be stored at the wireless communication device. The application definition file may be written in Extensible Markup Language (XML) for example. A virtual machine software component at the wireless communication device interprets the definition file and presents an interface to the application in accordance with the definition file.

FIG. 1 illustrates a wireless communication device 10, exemplary of an embodiment of the present invention. Wireless communication device 10 may be any conventional wireless communication device, modified to function in the manner described below. As such, wireless communication device 10 includes a processor 12, in communication with a network interface 14, storage memory 16, and a user interface 18 typically including a keypad and/or touch-screen. Network interface 14 enables device 10 to transmit and receive data over a wireless network 22. Wireless communication device 10 may be, for example, be a RESEARCH IN MOTION™ (RIM™) two-way paging device, a WINCE™ based device, a PALMOS™ device, a WAP enabled mobile telephone, or the like. Memory 16 of device 10 stores a mobile operating system such as the PALMOS™, or WINCE™ operating system software 20. Operating system software 20 typically includes graphical user interface and network interface software having suitable application programmer interfaces ("API"s) for use by other applications executing at device 10.

Memory at device 10 further stores virtual machine software 24 which, when executed by wireless communication device 10, enables device 10 to present an interface for server-side applications provided by a transaction server, described below. Specifically, virtual machine software 24 interprets a text application definition file defining a definition of a user interface 18 controlling application functionality, and the display format (including display flow) at device 10 for a particular server-side application; the format of data to be exchanged over the wireless network for the application; and the format of data to be stored locally at device 10 for the application. Virtual machine software 24 uses operating system 20 and associated APIs to interact with device 10, in accordance with the received application definition file. In this way, device 10 may present interfaces for a variety of applications, stored at a server. From the perspective of operating system 20, virtual machine software 24 is viewed as another application resident at device 10. Moreover, multiple wireless devices each having a similar virtual machine software 24 may use a common server-side application in combination with an application definition file, to present a user interface and program flow specifically adapted for the device.

As such, and as will become apparent, the exemplary virtual machine software 24 is specifically adapted to work with the particular wireless communication device 10. Thus if device 10 is a RIM™ BLACKBERRY™ device, virtual machine software 24 is a RIM™ virtual machine. Similarly, if device 10 is a PALMOS™ or WINCE™ device, virtual machine software 24 would be a PALMOS™ or WINCE™ virtual machine. As further illustrated in FIG. 1, virtual machine software 24 is capable of accessing local storage 26 at device 10.

As detailed below, an exemplary application definition file may be formed using a mark-up language, such as the well-known Extensible Markup Language (XML). Defined XML entities are understood by the virtual machine software 24. Defined XML entities are detailed in Appendix "A" attached hereto. AIRIX™ Language (ARML) is an XML markup language used in the present embodiment. The defined XML entities are interpreted by the virtual machine software 24, and may be used as building blocks to present server-side applications at wireless communication device 10, as detailed herein.

Figure 2A:
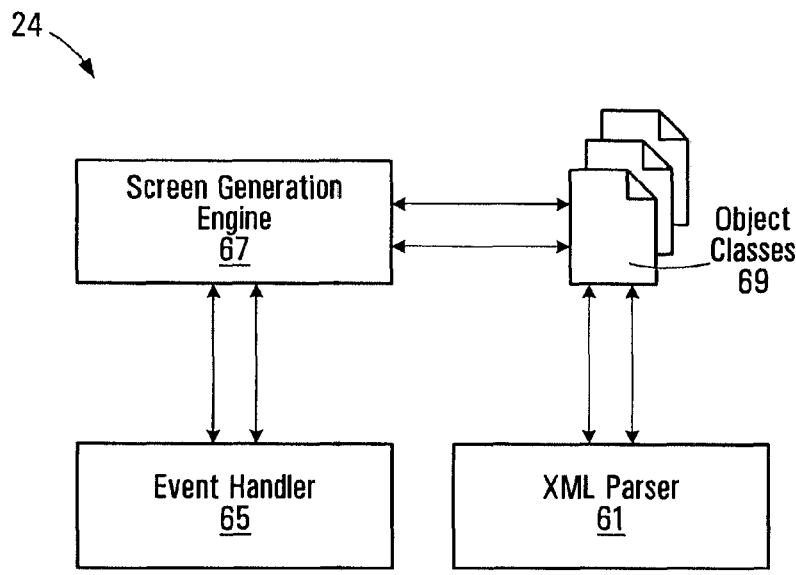
FIG. 2A illustrates the organization of exemplary virtual machine software at the wireless communication device of FIG. 1.

Specifically, as illustrated in FIG. 2A, virtual machine software 24 includes a conventional XML parser 61; an event handler 65; a screen generation engine 67; and object classes 69 corresponding to XML entities supported by the virtual machine software 24, and possibly contained within an application definition file 28. Supported XML entities are detailed in Appendix "A". A person of ordinary skill will readily appreciate that those XML entities identified in Appendix "A" are exemplary only, and may be extended, or shortened as desired.

XML parser 61 may be formed in accordance with the Document Object Model, or DOM, which is available at www.w3.org/DOM/ and is incorporated by reference hereinto. Parser 61 enables virtual machine software 24 to read an application definition file. Using the parser, the virtual machine software 24 may form a binary representation of the application definition file for storage at the wireless communication device, thereby eliminating the need to parse text each time an application is used. Parser 61 may convert each XML tag contained in the application definition file, and its associated data to tokens, for later processing. As will become apparent, this may avoid the need to repeatedly parse the text of an application definition file.

Screen generation engine 67 displays initial and subsequent screens at the wireless communication device, in accordance with an application definition 28, as detailed below.

Event handler 65, of virtual machine software 24 allows device 10 under control of virtual machine software 24 to react to certain external events. Example events include user interaction with presented screens or display elements, incoming messages received from a wireless network, or the like.

Object classes 69 also form part of virtual machine 24 and define objects that allow device 10 to process each of the supported XML entities at the wireless communication device. Each of object classes 69 includes attributes (e.g. fields or data members) used to store parameters defined by the XML file (XML element and/or attribute values), and allowing the XML entity to be processed at the wireless communication device, as detailed in Appendix "A", for each supported XML entity. So, as should be apparent, supported XML entities are extensible. Virtual machine software 24 may be expanded to support XML entities not detailed in Appendix "A". Corresponding object classes can be added to virtual machine software 24, for example as will be discussed in Section III of this document.

As detailed below, upon invocation of a particular application at wireless communication device 10, the virtual machine software 24 presents an initial screen based on the contents of the application definition 28 for the application. Screen elements are created by screen generation engine 67 by creating instances of corresponding object classes for defined elements, as contained within object classes 69. The object instances are "customized" using element and attribute values contained in the application definition file 28. Thereafter the event handler 65 of the virtual machine software 24 reacts to events for the application. The manner in which the event handler reacts to events is governed by the contents of the application definition file. Events may trigger processing defined within instances of associated "action" objects, which objects are instantiated from object classes 69 of virtual machine software 24.

Similarly, object classes 69 of virtual machine software 24 further include object classes corresponding to data tables and network transactions defined in the Table Definition and Package Definition sections of Appendix "A". At run time, instances of object classes corresponding to these classes are created and populated with parameters contained within application definition file, as required.

Figure 2B:
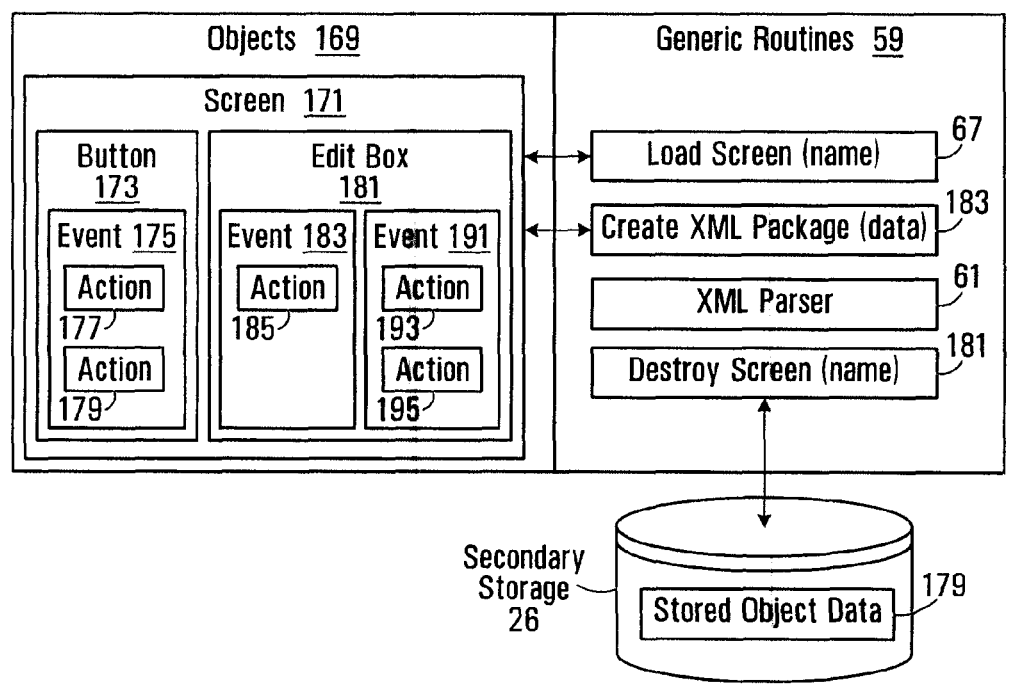
FIG. 2B further illustrates the organization of exemplary virtual machine software at the wireless communication device of FIG. 1.

FIG. 2B illustrates in greater detail the manner in which the virtual machine software 24 of FIG. 2A may be organized. For purposes of FIG. 2B it is assumed that the wireless communication device 10 is currently executing a wireless communication device application. As illustrated, the virtual machine software 24 has two categories of components, namely, objects 169 and general purpose routines 59.

Objects 169 are instantiations of object classes 69 (FIG. 2A) which are instantiated dynamically at run time when the application is executed at the wireless communication device 10. The types of objects 169 that are instantiated at any given moment (e.g. screens, buttons, events, actions, etc., as will be described) depend upon the mobile application currently being executed and its state, including which user interface screen is currently displayed at the wireless communication device. Each of objects 169 corresponds to a construct defined within the application definition file 28. The objects 169 are instantiated from binary representations 179 thereof which are maintained in secondary storage 26, which representations 179 are created when the application definition file 28 is initially parsed. Each object 169 contains methods which capture certain behaviours that are performed by all instances of the represented object, as well as data members which permit the characteristics or behavior of the object to be "customized" (e.g. each instance of a button object may include the same highlight( ) method which, if invoked, causes the button to become highlighted, and may further include X and Y coordinate data member values which define a unique location of the button on the encompassing UI screen). A more detailed description of the exemplary set of objects 169 of FIG. 2B is provided below in conjunction with the description of operation of the present embodiment.

General purpose routines 59, on the other hand, constitute a managing environment for the objects 169. The routines 59 encompass functionality which is useful for executing a wireless communication device application at the wireless communication device but is not necessarily tied to a particular type of object 169. For example, the routines 59 may include the XML parser 61, which initially parses the application definition file 28. Other routines may facilitate loading or closing of UI screens, or the sending of messages over the wireless network 22, as will be described. The routines 59 effectively consolidate certain functionality for convenient invocation from any of objects 169, as required.

Using this general description and the description which follows, persons of ordinary skill in the art will be able to form virtual machine software 24 for any particular device. Typically, virtual machine software 24 may be formed using conventional object-oriented programming techniques, and existing device libraries and APIs, as to function as detailed herein. As will be appreciated, the particular format of screen generation engine 67, object classes 69 will vary depending on the type of virtual machine software, its operating system and API available at the device. Once formed, a machine executable version of virtual machine software 24 may be loaded and stored at a wireless communication device, using conventional techniques. It can be embedded in ROM, loaded into RAM over a network, or from a computer readable medium.

Although, in the described embodiment the virtual machine software 24 and software forming object classes 69 are formed using object-oriented structures, persons of ordinary skill will readily appreciate that other approaches could be used to form suitable virtual machine software. For example, object classes 69 forming part of the virtual machine could be replaced by equivalent functions, data structures or subroutines formed using a conventional (i.e. non-object-oriented) programming environment. Operation of virtual machine software 24 under control of an application definition file containing various XML definitions exemplified in Appendix "A" is further detailed below.

Figure 3:
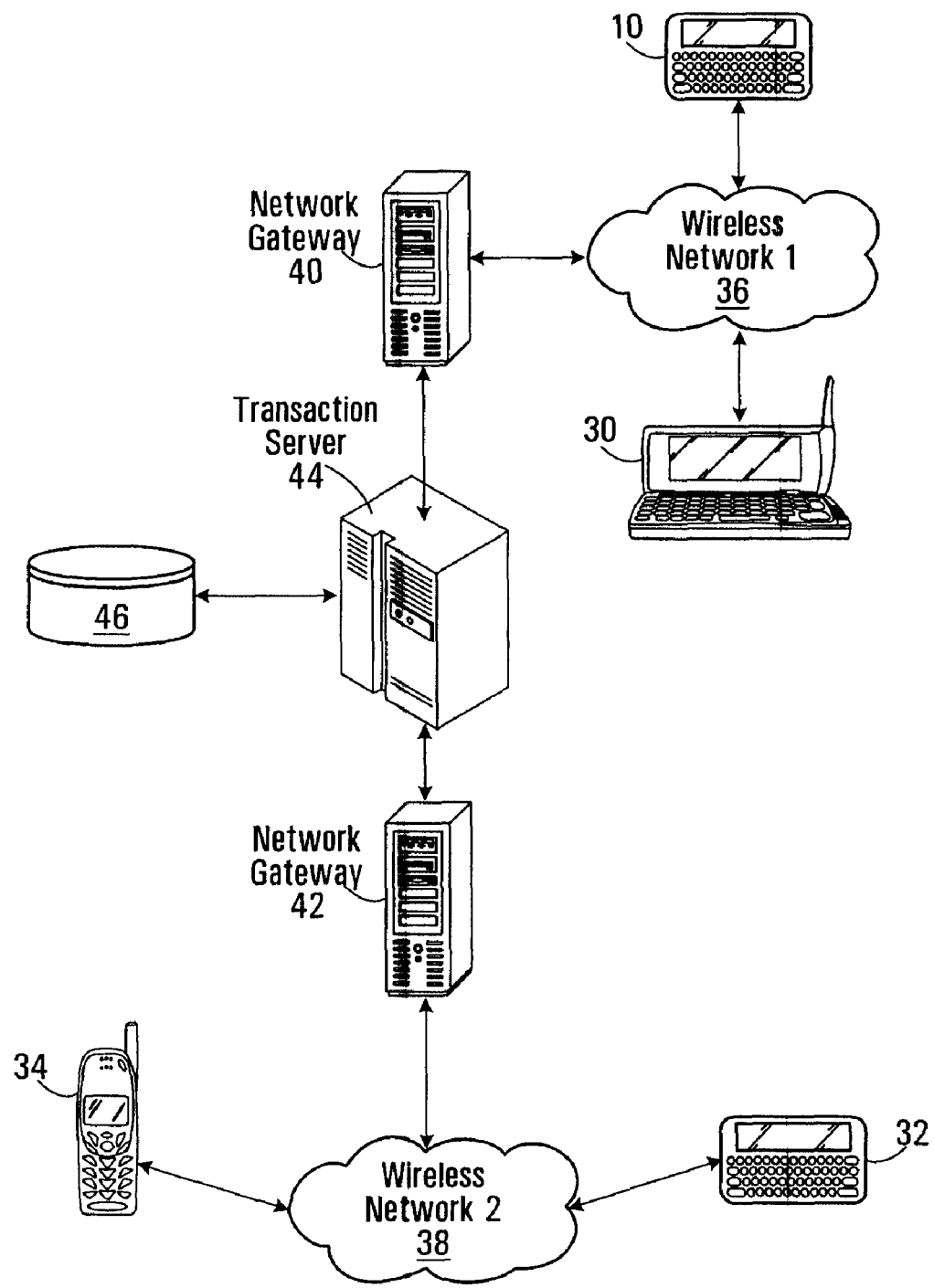
FIG. 3 illustrates an operating environment for the wireless communication device of FIG. 1.

FIG. 3 illustrates the operating environment for a wireless communication device 10. Further example wireless communication devices 30, 32 and 34 are also illustrated in FIG. 3. These wireless communication devices 30, 32 and 34 are similar to device 10 and also store and execute virtual machine software exemplary of an embodiment of the present invention.

Virtual machine software like that stored at device 10, executes on each wireless communication device 10, 30, 32, 34, and communicates with a transaction server 44 (referred to as a "middleware server 44" in U.S. Patent Publication No. US 2003/0060896, referenced above) by way of example wireless networks 36 and 38 and network gateways 40 and 42. Example gateways 40 and 42 are generally available as a service for those people wishing to have data access to wireless networks. Wireless networks 36 and 38 are further connected to one or more computer data networks, such as the Internet and/or private data networks by way of gateway 40 or 42. As will be appreciated, embodiments of the invention may work with many types of wireless networks. Transaction server 44 is in turn in communication with a data network, that is in communication with wireless network 36 and 38. The communication used for such communication is via Transmission Control Protocol/Internet Protocol (TCP/IP) over a HyperText Transfer Protocol (HTTP) transport. As could be appreciated, other network protocols such as X.25 or Systems Network Architecture (SNA) could equally be used for this purpose.

At least two categories of communication between transaction server 44 and wireless communication devices 10, 30, 32 and 34 exist. First, virtual machine software 24 at each device may query transaction server 44 for a list of applications that a user of an associated wireless communication device 10, 30, 32 or 34 can make use of. If a user decides to use a particular application, device 10, 30, 32 or 34 can download a text description, in the form of an application definition file, for the application from the transaction server 44 over its wireless interface. As noted, the text description may be an XML file. Second, virtual machine software 24 may send and receive (as well as present, and locally store) data to and from transaction server 44 which is related to the execution of applications, or its own internal operations. The format of exchanged data for each application is defined by an associated application definition file. Again, the exchanged data may be formatted using XML, in accordance with the application definition file.

Transaction server 44 stores text application definition files for those applications that have been enabled to work with the various devices 10, 30, 32, and 34 using virtual machine software 24 in a pre-defined format understood by virtual machine software 24. Software providing the functions of the transaction server 44, in the exemplary embodiment is written in C#, using SQL Server or MySQL database.

As noted, text files defining application definitions and data may be formatted in XML. For example XML version 1.0, detailed in the XML version 1.0 specification third edition and available at www.w3.org/TR/2004/REC-xml-20040404, may be used. However, as will be appreciated by those of ordinary skill in the art, the functionality of storing XML description files is not dependent on the use of any given programming language or database system.

In the exemplary embodiment, each application definition file is formatted according to defined rules and uses predetermined XML markup tags known by both virtual machine software 24, and complementary transaction server software 68. That is, each application definition file 28 is an XML data instance file which conforms to a predefined XML schema designed to support the execution of server-side applications at various types of wireless communication devices. Tags define XML entities used as building blocks to present an application at a wireless communication device. Knowledge of these rules, and an understanding of how each tag and section of text should be interpreted, allows virtual machine software 24 to process an XML application definition and thereafter execute an application, as described below. Virtual machine software 24 effectively acts as an interpreter for a given application definition file.

Figure 4:
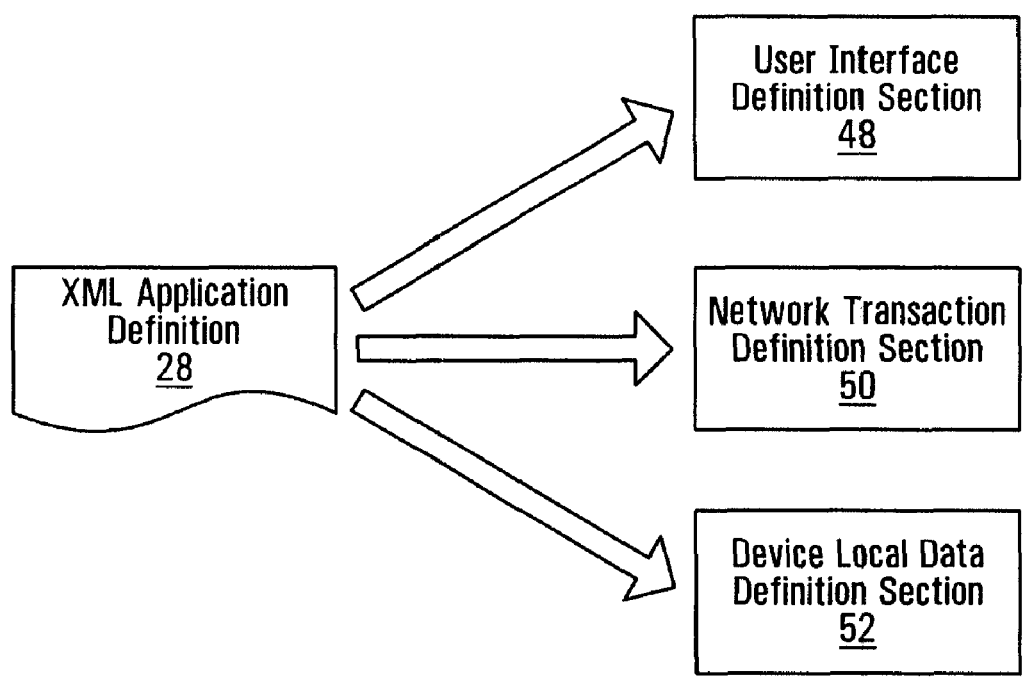
FIG. 4 illustrates the structure of example application definitions used by the device of FIG. 1.

FIG. 4 illustrates an example format for an XML application definition file 28. As illustrated, the example application definition file 28 for a given device and application includes three components: a user interface definition section 48, specific to the user interface for the device 10, which defines the format of screen or screens for the application and how the user interacts with them and contains application flow control events and actions; a network transactions definition section 50 defining the format of data to be exchanged with the application; and a local data definition section 52 defining the format of data to be stored locally on the wireless communication device by the application.

Defined XML markup tags are used to create an application definition file 28. The defined tags may broadly be classified into three categories, corresponding to the three sections 48, 50 and 52 of an application definition file 28.

Example XML tags and their corresponding significance are detailed in Appendix "A". As noted above, virtual machine software 24 at a wireless communication device includes object classes corresponding to each of the XML tags. At run time, instances of the objects are created as required.

Broadly, the following list includes example XML tags (i.e. XML elements) which may be used to define the user interface definition:

SCREEN—this defines a screen. A SCREEN tag pair contains the definitions of the user interface elements (buttons, radio buttons, and the like) and the events associated with the screen and its elements BTN—this tag defines a button and its associated attributes.

LB—this tag defines a list box that allows selection of an item from a list of items.

CHOICE—this tag defines a choice item, that allows selection of an item from a set of items.

MENU—the application developer will use this tag to define a menu for a given screen.

MENUITEM—defines a selectable item on a given menu.

EB—this tag defines an edit box for entering textual content.

TI—this tag describes a text label that is displayed.

CHK—this tag describes a checkbox.

GRID—this tag defines a grid made up of a configurable number of columns and rows defining cells for containing textual content.

EVENT—this defines an event to be processed by the virtual machine software. Events can be defined against the application as a whole, individual screens or individual items on a given screen. Sample events would be receipt of data over the wireless interface, or an edit of text in an edit box by a wireless communication device user.

ACTION—this describes a particular action should be performed upon the occurrence of a particular event. Sample actions would be navigating to a new window or displaying a message box.

The second category of example XML tags describes the network transaction section 50 of application definition 28. These may include the following example XML tags:

TUPDATE—using this tag, the application developer can define an update that is performed to a table in the device's local storage. Attributes allow the update to be performed against multiple rows in a given table at once.

PKGFIELD—this tag is used to define a field in a data package (message) that passes over the wireless interface.

The third category of XML tags used to describe an application are those used to define a logical database that may be stored at the wireless communication device. The tags available that may be used in this section are:

TDEF—this tag, and its attributes and subordinate field tags, define a table. Contained within a pair of TDEF tags are definitions of the fields contained in that table. The attributes of a table control such standard relational database functions as the primary key for the table.

FLD—this tag describes a field and its attributes. Attributes of a field are those found in a standard relational database system, such as the data type, whether the field relates to one in a different table, the need to index the field, and so on.

In addition to these XML tags, virtual machine software 24 may, from time to time, need to perform certain administrative functions on behalf of a user. In order to do this, one of object classes 69 has its own repertoire of tags to intercommunicate with the transaction server 44. Such tags differ from the previous three groupings in that they do not form part of an application definition file, but are solely used for administrative communications between the virtual machine software 24 and the transaction server 44. Data packages using these tags are composed and sent due to user interactions with the virtual machine's configuration screens. The tags used for this include:

REG—this allows the application to register and deregister a user for use with the transaction server.

FINDAPPS—by using this operation, users can interrogate the server for the list of applications that are available to them.

APPREG—using this operation, the end-user can register (or deregister) for an application and have the application interface downloaded automatically to their device (or remove the interface description from the device's local storage).

SA—If the user's preferred device is malfunctioning, or out of power or coverage, they will need a mechanism to tell the Server to attempt delivery to a different device. The Set Active (SA) command allows the user to set the device that they are currently using as their active one.

Figure 5:
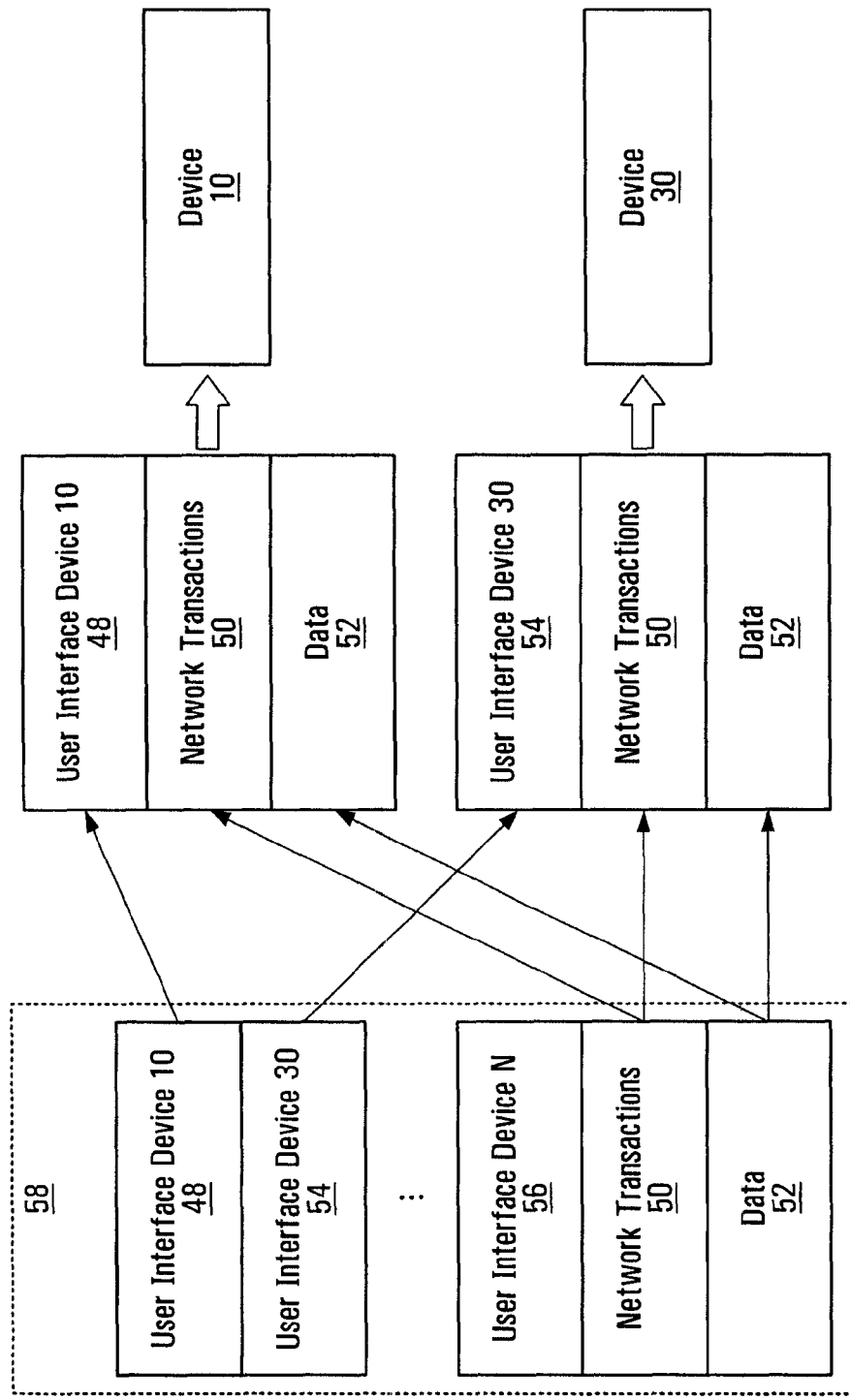
FIG. 5 schematically illustrates the formation of application definition files at a transaction server of FIG. 2 from a master definition file.

Referring again generally to the manner in which execution of server-based applications at wireless communication devices is facilitated, FIG. 5 illustrates the organization of application definitions at transaction server 44 and how transaction server 44 may form an application definition file 28 (FIG. 4) for a given device 10, 30, 32 or 34. In the illustration of FIG. 5, only two wireless communication devices 10 and 30 are considered. Typically, since network transactions and local data are the same across devices, the only piece of the application definition that varies for different devices is the user interface definition.

So, transaction server 44 stores a master definition file 58 (or simply "master definition" 58) for a given server-side application. This master definition 58 contains example user interface descriptions 48, 54, 56 for each possible type of wireless communication device 10, 30, 32; descriptions of the network transactions 50 that are possible and data descriptions 52 of the data to be stored locally on the wireless communication device. Preferably, the network transactions 50 and data descriptions 52 will be the same for all wireless communication devices 10, 30 and 32.

For device 10, transaction server 44 composes an application definition file 28 by querying the device type and adding an appropriate user interface description 48 for device 10 to the definitions for the network transactions 50 and the data 52. For device 30, transaction server 44 composes the application definition by adding the user interface description 54 for device 30 to the definitions for the network transactions 50 and data 52.

The master definition 58 for a given application is created away from the transaction server 44 and may be loaded onto the transaction server 44 by administrative staff charged with its operation. Master definition files may be created by a developer using a rapid application development tool such the one that is described below in Section II. Alternatively, a simple text editor could be used. It will be appreciated that the master definition file 58 is an XML data instance which conforms to a predefined XML schema, referenced above.

Figure 6:
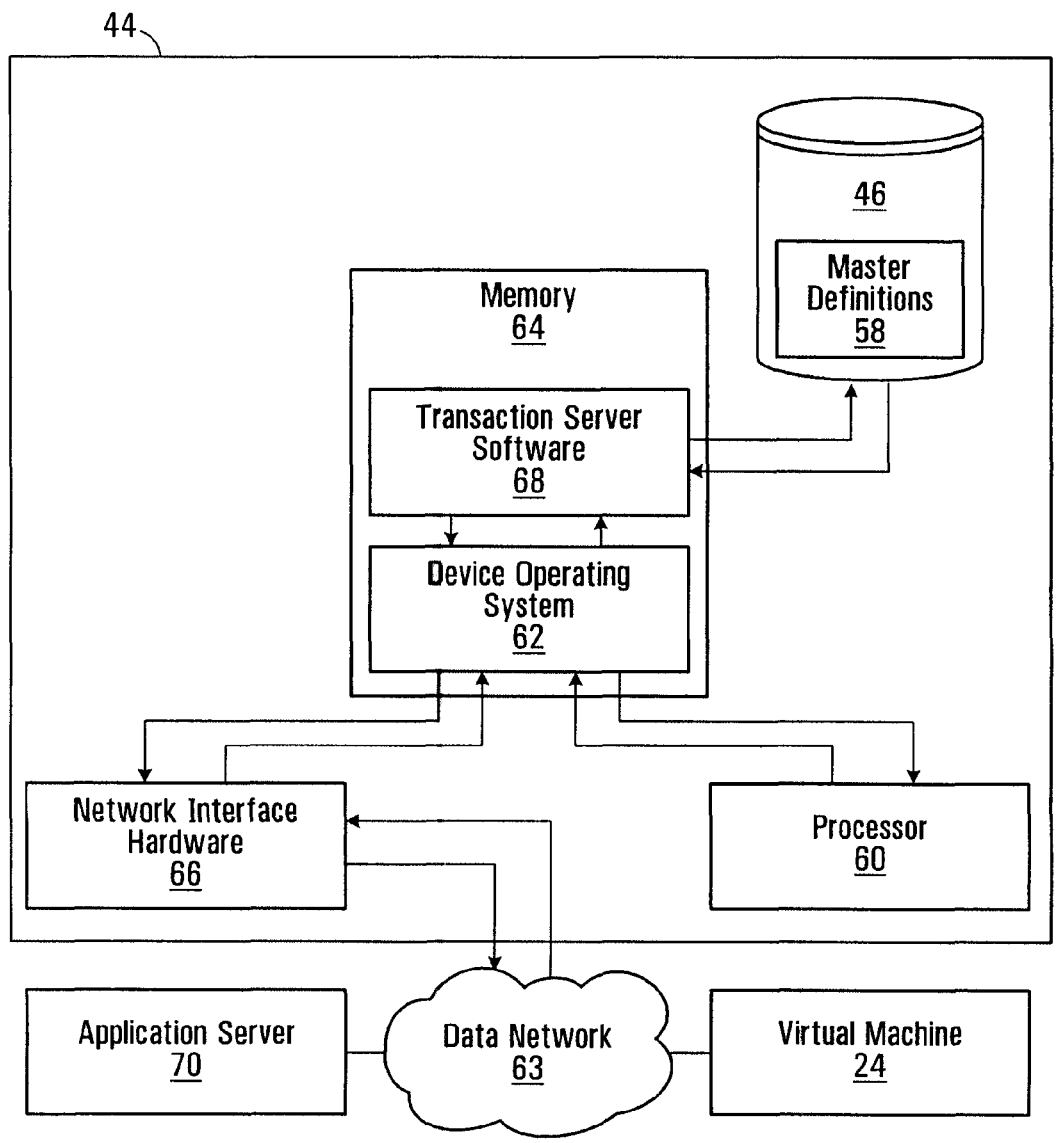
FIG. 6 schematically illustrates the transaction server of FIG. 3 including an application definitions database.

FIG. 6 illustrates the organization of transaction server 44 and associated master definitions. Transaction server 44 may be any conventional application server, modified to function in as described herein. As such, transaction server 44 includes a processor 60, in communication with a network interface 66 and storage memory 64. Transaction server 44 may be, for example, a server running Windows Server 2003, a Sun Solaris server, or the like. Memory of transaction server 44 stores an operating system such as Windows Server 2003, or Solaris operating system software 62.

Network interface 66 enables transaction server 44 to transmit and receive data over a data network 63. Transmissions are used to communicate with both the virtual machine software 24 (via the wireless networks 36, 38 and wireless gateways 40, 42) and one or more application servers, such as application server 70, that are the end recipients of data sent from the mobile client applications and the generators of data that is sent to the mobile client applications.

Memory at transaction server 44 further stores software 68 which, when executed by transaction server 44, enables the transaction server to understand and compose XML data packages that are sent and received by the transaction server 44. These packages may be exchanged between transaction server 44 and the virtual machine software 24, or between the transaction server 44 and the application server 70. Transaction server software 68 may be loaded from a machine-readable medium.

As described above, communication between the application server 70 and the transaction server 44 can, in an exemplary embodiment, use HTTP running on top of a standard TCP/IP stack; however this is not a requirement. An HTTP connection between a running application at the application server 70 and the transaction server 44 is established in response to the application at a wireless communication device presenting the application. The server-side application provides output to transaction server 44 over this connection. The server-side application data is formatted into appropriate XML data packages understood by the virtual machine software 24 at a wireless communication device by the server-side application.

That is, a server-side application (or an interface portion of the application) formats application output into XML in a manner consistent with the format defined by the application definition file for the application. Alternatively, an interface component separate from the application could easily be formed with an understanding of the format and output for a particular application. That is, with a knowledge of the format of data provided and expected by an application at application server 70, an interface component could be a produced using techniques readily understood by those of ordinary skill. The interface portion could translate application output to XML, as expected by transaction server 44. Similarly, the interface portion may translate XML input from a wireless communication device into a format understood by the server-side application.

The particular identity of the wireless communication device on which the application is to be presented may be identified by a suitable identifier, in the form of a header contained in the server-side application output. This header may be used by transaction server 44 to forward the data to the appropriate wireless communication device. Alternatively, the identity of the connection could be used to forward the data to the appropriate wireless communication device.

Figure 7:
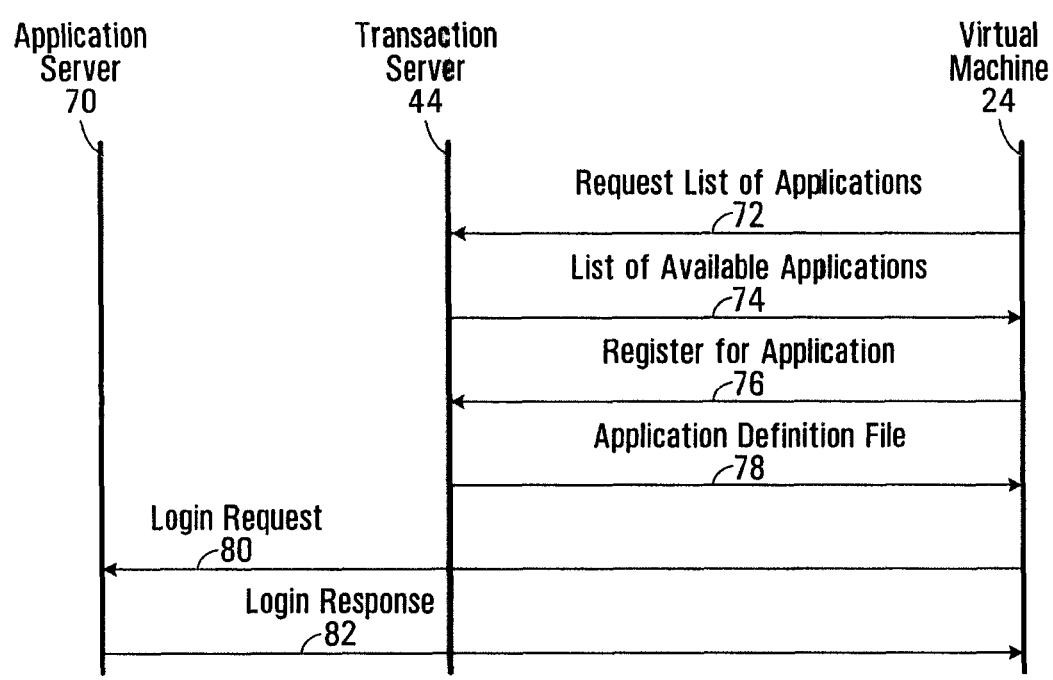
FIG. 7 is a flow diagram illustrating the exchange of sample messages passed between a wireless communication device, transaction server and application server of FIG. 3.

FIG. 7 illustrates a sequence diagram detailing data (application data or application definition files 28) flow between wireless communication device 10 and transaction server 44.

For data requested from transaction server 44, device 10, executing virtual machine software 24, makes a request to transaction server 44, which passes over the wireless network 36 through network gateway 40. Network gateway 40 passes the request to the transaction server 44. Transaction server 44 responds by executing a database query on its database 46 that finds which applications are available to the user and the user's wireless communication device. For data passed from transaction server 44 to device 10, data is routed through network gateway 40. Network gateway 40 forwards the information to the user's wireless communication device over the wireless network 36.

FIG. 7 when considered with FIG. 3 illustrates a sequence of communications between virtual machine software 24 (executing at device 10) and transaction server 44 that may occur when the user of a wireless communication device wishes to download an application definition file 28 for a server-side application.

Initially device 10 may interrogate server 44 to determine which applications are available for the particular wireless communication device being used. This may be accomplished by the user instructing the virtual machine software 24 at device 10 to interrogate the server 44. Responsive to these instructions the virtual machine software 24 sends an XML message to the server requesting the list of applications (data flow 72); the XML message may contain the <FIND-APPS> tag, signifying to the transaction server 44, its desire for a list available application. In response, transaction server 44 makes a query to database 46. Database 46, responsive to this query, returns a list of applications that are available to the user and the wireless communication device. The list is typically based, at least in part, on the type of wireless communication device making the request, and the applications known to transaction server 44. Transaction server 44 converts this list to an XML message and sends to the virtual machine (data flow 74). Again, a suitable XML tag identifies the message as containing the list of available applications.

In response, a user at device 10 may choose to register for an available server-side application. When a user chooses to register for an application, virtual machine software 24 at device 10 composes and sends an XML registration request for a selected application (data flow 76) to transaction server 44. As illustrated in FIG. 7, an XML message containing a <REG> tag is sent to transaction server 44. The name of the application is specified in the message. The transaction server 44, in response, queries its database for the user interface definition for the selected application for the user's wireless communication device. Thereafter, the transaction server creates the application definition file, as detailed with reference to FIG. 5. Then, transaction server 44 sends to the wireless communication device (data flow 78—FIG. 7) the created application definition file 28.

The user is then able to use the functionality defined by the interface description to send and receive data.

At this time, parser 61 of virtual machine software 24 may parse the XML text of the application definition file to form a tokenized version of the file. That is, each XML tag may be converted a defined token for compact storage, and to minimize repeated parsing of the XML text file. The tokenized version of the application definition file may be stored for immediate or later use by device 10. In this context, the term "tokenized" may refer to placement of the XML structure into binary objects which are run-time accessible, which is much like conversion of a script into byte code.

The application definition file may initially be converted to a DOM tree representation. The entire DOM tree may then be traversed. For each XML element that is encountered during the traversal, a corresponding object 169 (FIG. 2B) may be instantiated from one of object classes 69. Instantiation of each object 169 may be facilitated by a fromXML( ) "constructor" method within the corresponding class 69, which populates the object's data members based on XML element/attribute values. For example, the constructor method may receive the XML fragment which defines the XML element in the application definition file 28 and, based on element and attribute values within the fragment, automatically populate the newly-instantiated object's data members with like values. It is noted that the constructor method may or may not meet the strict definition the term "constructor" as it is understood in the context of certain object-oriented programming languages (e.g. the method may not have the same name as the class).

For purposes of illustrating the instantiation of a subset of the objects 169 of FIG. 2B, it is assumed that the following XML fragment is read from an application definition file 28:

```
<BTN NAME="BTN1" INDEX="1" CAPTION="OK">
    <EVENTS>
        <EVENT TYPE="ONCLICK" ...>
            <ACTION ...>
            <ACTION ...>
        </EVENT>
    </EVENTS>
```

The above XML fragment represents an "OK" button on a containing UI screen (not shown) which performs two actions when clicked. The details of the actions are omitted for brevity. When a DOM tree representation of the above is encountered, the result may be instantiation of the button object 173 (FIG. 2B) from the following one of classes 69:

```
Public class button
{
str name;
int index;
str caption;
event[ ] events;        // event array
fromXML(<XML>) { ... } //      "constructor"
writeToPersistantStorage( )    { ... }
readFromPersistantStorage( )   { ... }
onEvent( )    { ... }
  :
}
```

The data members "name", "index" and "caption" of object 173 correspond to attributes of the same name within the XML fragment. The constructor method fromXML( ) populates these data members with the values "BTN1", "1" and "OK", respectively, based on the relevant XML attribute values.

The constructor method also populates the event array of button object 173. The event array is an array of event objects, each representing a different type of event that is significant with regard to the containing UI construct (in this case, button object 173). In the above example, only one significant event is defined for the "OK" button, namely, an "ONCLICK" event which represents the clicking of the button. Accordingly, only one event object 175 is instantiated. The event object's data members includes an array of action objects 177 and 179 (one for each action element in the above XML fragment) representing actions to be taken when the event occurs. Each action object is also populated by a constructor method within the action object, in like fashion.

The result of instantiating the button object and subordinate objects is illustrated in FIG. 2B. The button object is shown at 173, within the context of objects 169. In FIG. 2B, illustration of an object within the border of another object connotes the latter object's containment of the former. In the present embodiment a contained object is a data member of the containing object.

The button object 173 is contained within a screen object 171 which also includes an edit box object 181. This hierarchy indicates a UI screen having both a button and an edit box. The sole significant event for the button object 173 is represented by event object 175, which is the sole member of the event array of button object 173. The event object 175 in turn contain action objects 177 and 179 which represent actions that are to be taken when the containing event occurs. The actions may be of various types, as will be described.

The remaining objects 169 of FIG. 2B are based on other portions of the application definition file 28 which are not expressly set forth above. Briefly, the edit box object 181 of FIG. 2B contains two events 183 and 191, each representing a significant event for the edit box (say, selection and text entry). These event objects in turn contain actions 185, 193 and 195, representing actions to be taken when the relevant event occurs.

The button class contains an onEvent( ) method. This method is invoked via a callback from the operating system 20 upon the detection of any event pertaining to the button UI construct for purposes of determining whether the detected event is significant and thus requires action to be taken. Other UI constructs, such as edit boxes, menu items, and the like also have a similar method. Cumulatively, these methods within instantiated objects 169 may comprise event handler 65 of FIG. 2A.

Each class also includes a writeToPersistentStorage( ) method which saves the object's state by storing data member values, e.g. to a file system. The values are typically stored in a binary representation. This method is invoked during initial DOM tree traversal for purposes of writing newly-instantiated objects which are not immediately needed to persistent storage. Once the data has been so stored, the objects may be deallocated, and as a result, it is not necessary to maintain a vast set of objects representative of the entire application definition file 28 within wireless communication device memory. Only objects 169 pertaining to the current wireless communication device application state are instantiated at any given time, and wireless communication device resources are thereby conserved. A corresponding readFromPersistentStorage( ) method permits a newly instantiated object to restore its previous state from persistent storage, e.g., when a screen is loaded due to user navigation to that screen. By initially storing the entire set of objects to persistent storage in this fashion, the need to maintain a DOM tree is avoided.

Thereafter, upon invocation of a particular application for which the device 10 has registered, the screen generation engine 67 of the virtual machine software 24 at the device causes the virtual device to locate the definition of an initial screen for that application. The initially loaded screen will be the one identified within the application definition file 28 for that application by way of the attribute <First screen="yes">.

Figure 8:
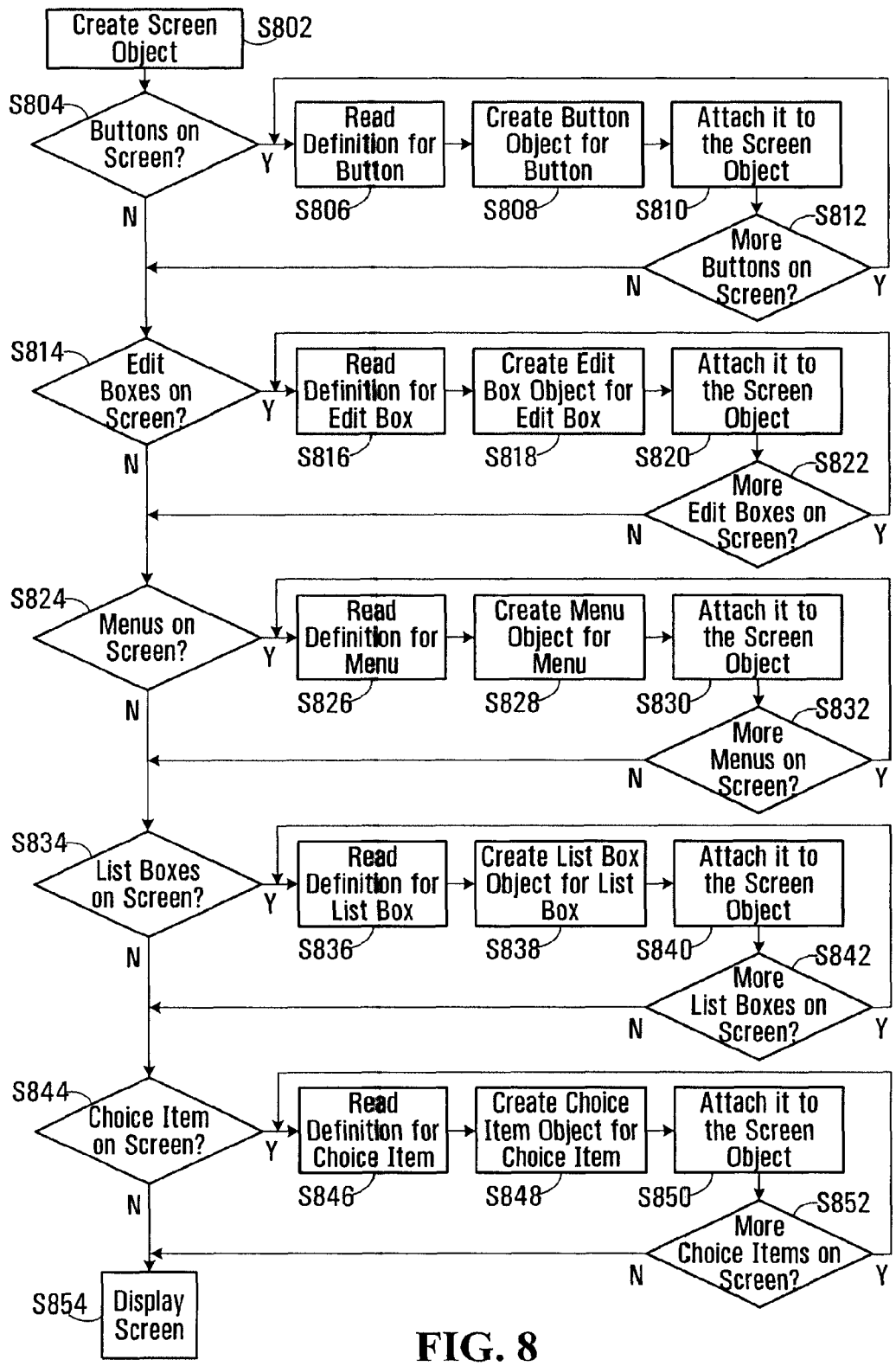
FIGS. 8-10 illustrate operation performed at a wireless communication device under control of virtual machine software of FIGS. 2A and 2B.

Operation for loading a first or subsequent screen is illustrated in FIG. 8. To load a screen, generation engine 67 may employ a loadScreen(X) routine, which may be one of the general purpose routines 59 within virtual machine software 24 (FIG. 2B). This routine may accept as a parameter a unique screen identifier X. Based on that identifier, the routine may find the appropriate representation of the named screen within local storage 26 (as previously stored by the writeToPersistentStorage( ) method of that screen when the DOM tree was initially traversed), instantiate a new screen object 169 (S802), and cause the new screen object to populate itself with the stored data, e.g. through invocation of the readFromPersistentStorage( ) method of the screen object. The latter method may in turn instantiate subordinate objects (such as buttons, edit boxes, menus, list boxes, choice items, images and checkboxes, as detailed in Appendix "A") and cause the readFromPersistentStorage( ) methods of these subordinate objects to be called, in an iterative fashion. In the result, a hierarchy of instances 169 of object classes 69 are created within the virtual machine software 24, as illustrated in FIG. 2B.

Figure 9:
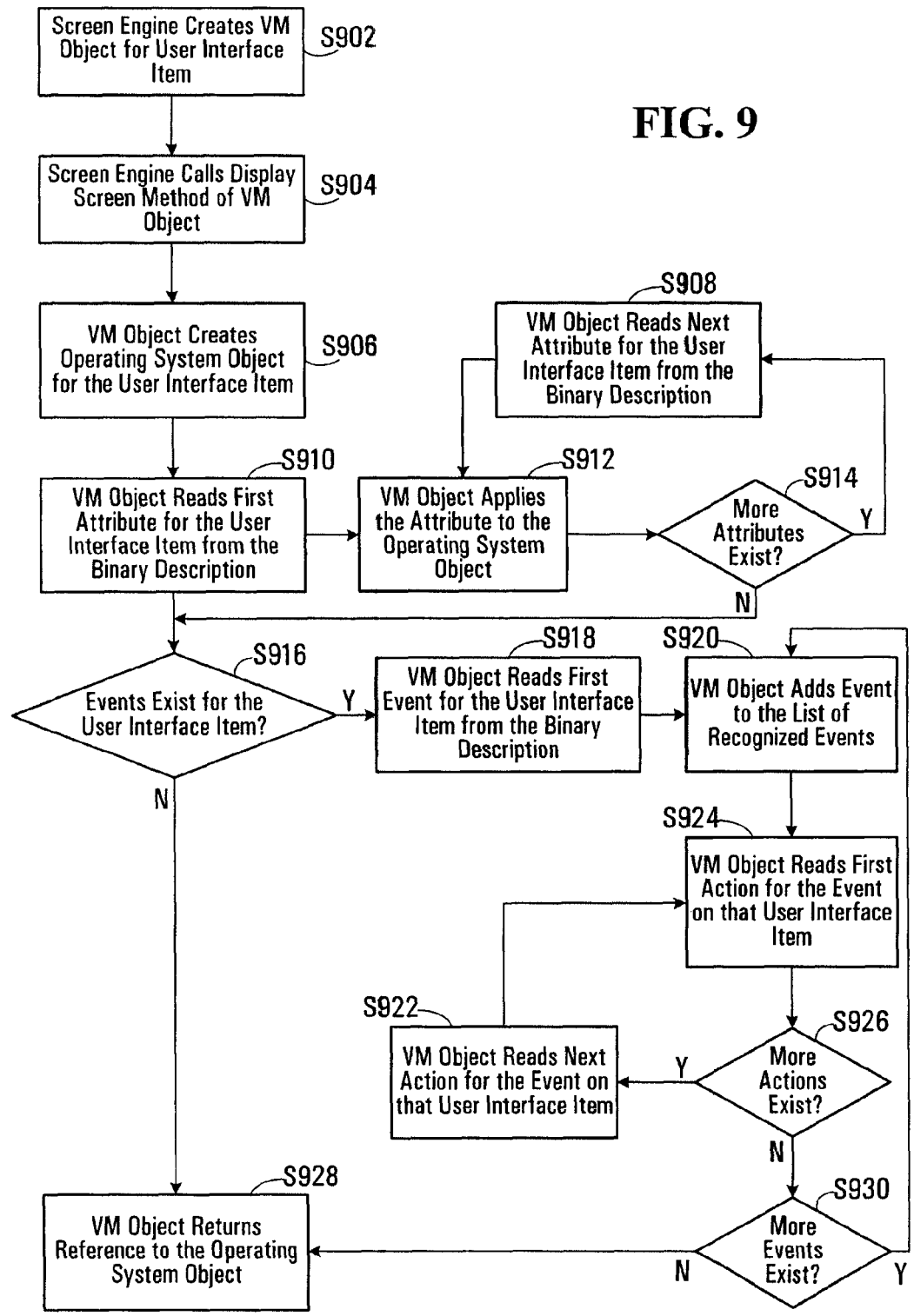

Each definition of a UI construct (also referred to as a "display element") causes virtual machine software 24 to use the operating system of the wireless communication device to create corresponding display element of a graphical user interface as more particularly illustrated in FIG. 8. Specifically, for each element (S804, S814, S824, S834 and S844), the associated XML definition is read in (S806, S816, S826, S836 and S846) and a corresponding instance of a screen object defined as part of the virtual machine software 24 is created by the virtual machine software 24 (at S808, S818, S828, S838 and S848), in accordance with S902 and onward illustrated in FIG. 9. Each interface object instance is created at S902. Each instance takes as attribute values defined by the XML text associated with the element. A method of the virtual machine object is further called (S904), and causes a corresponding device operating system object to be created (S906). Attributes originally defined in the XML text file, as stored within the virtual machine object instance, are applied to the corresponding instance of a display object created using the device operating system (S908-S914). This is repeated for all attributes of the virtual machine object instance. For any element allowing user interaction, giving rise to an operating system event, the event handler 65 of virtual machine software 24 is registered to process operating system events. This may for example entail registering, for each UI construct on the screen (e.g. buttons, menu items, etc.), a callback to an onEvent( ) method of the UI construct, which will be invoked upon the occurrence of any event in respect of that construct for purposes of determining whether the event is significant, such that the event's actions should be executed as a result. The onEvent( ) methods for all of the objects which are associated with the currently displayed screen may constitute the event handler 65 for that screen. That is, there may be no distinct instance of an event handler 65 per se other than the onEvent( ) methods of currently displayed or instantiated UI construct objects.

As described above and illustrated in FIG. 2B, for each event (as identified by an <EVENT> tag in the application definition file 28) and action (as identified by an <ACTION> tag), virtual machine software 24 creates an instance of a corresponding event and action object forming part of virtual machine software 24. Virtual machine software 24 maintains a list identifying each instance of each event and action object, which may take the form of arrays of event objects and subordinate arrays of action objects as described above (S916 to S928).

Operation at S902-S930 is repeated for each element of the screen at S808, S818, S828, S838 and S848 as illustrated in FIG. 8. All elements originally defined between the <SCREEN> definition tags of the application definition file are so processed. After the entire screen has been so created in memory, it is displayed (S854), using conventional techniques.

Figure 10:
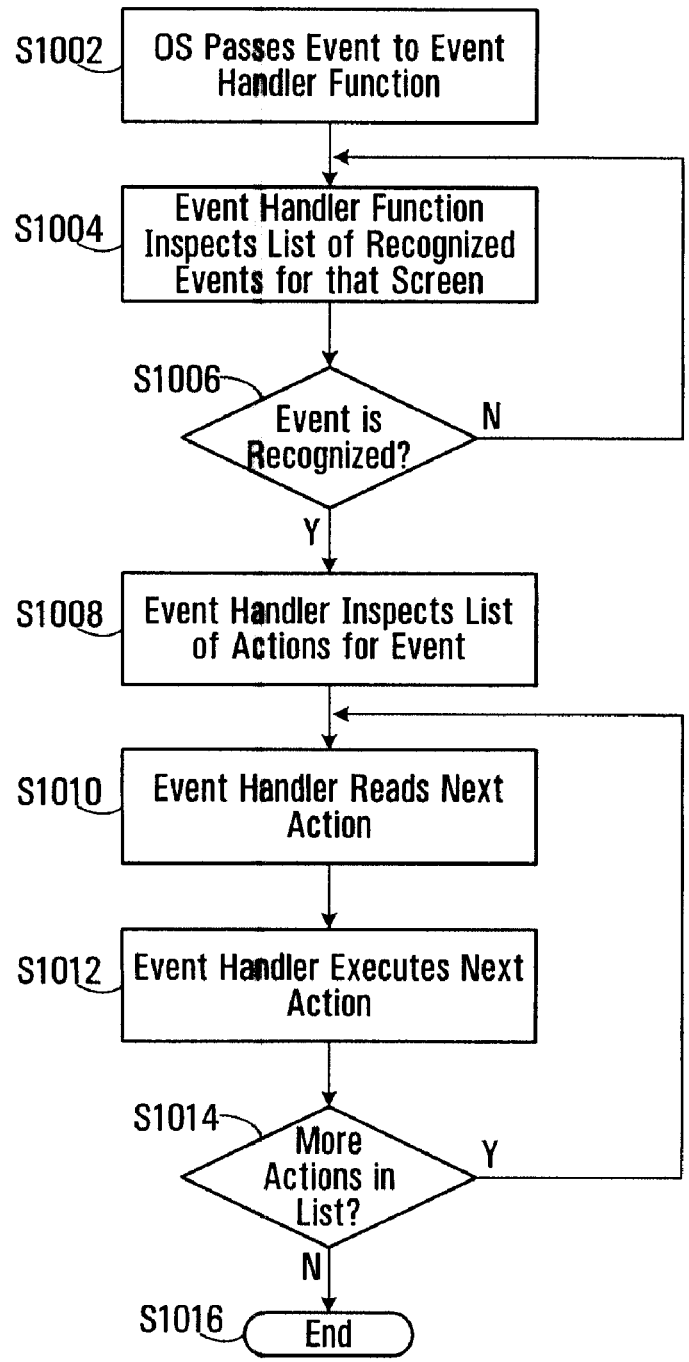

Events may be handled by virtual machine software 24 as illustrated in FIG. 10. Operation at S1002 and onward is performed in response to the operating system detecting an event.

Upon the occurrence of an event, such as the receipt of data from a wireless network 36 or 38 or user interaction with user interface controls at the wireless communication device, the operating system automatically invokes the onEvent( ) method for each object 169 in respect of which callback was earlier registered (S1002). The onEvent( ) method for these objects determines whether the event is significant for the object (S1004) and, if so (S1006), passes control to each of the action(s) in the array of action objects within the relevant event object, in succession (S1008-S1016), for purposes of effecting the desired behaviour. Control may for example be passed by invoking a doAction( ) method of each instance of an action object within the action object array that comprises the data members of the relevant event object, in order to effect desired processing as defined by the XML <ACTION> tag. The result of executing this method may be loading a named screen, closing the current screen, sending a message, storage data locally at the device, or other actions, as described below. Within the doAction( ) method of each action object, hard-coded instructions which cause these action to be performed. For actions having associated element or attribute values within the action object's data members which affect the action's characteristics or behavior, the result of executing the instructions may be influenced by these values, which effectively serve as parameters to the action.

In some cases, instructions within the doAction( ) method may invoke a general purpose routine. For example, if an action specifies that a screen should be closed, a "destroy screen X" routine 181, which is one of general purpose routines 59 (FIG. 2B) in the present embodiment, may be invoked from the action object's doAction( ) method. This routine may traverse screen objects within the instantiated objects 169 until the screen with the specified name X is found, at which point that screen object may be instructed to destroy itself. If the action indicates that a message (package) should be sent, a "createXMLPackage( )" general purpose routine 183 (FIG. 2B) may be invoked from the action object's doAction( ) method, to create and send a message over wireless network 22 containing specified data. According to that routine 183, methods within an XML builder object may assemble data into an XML package which is then passed to message server object. The message server object may use the device's network APIs to transmit the assembled XML package across the wireless network.

By executing actions which cause new screens to be loaded or closed, navigation through the screens of the application is accomplished according to the definition embodied in the application definition file 28.

If the event is the receipt of an XML package from the wireless network 22, then the relevant event objects will not be directly contained within a UI construct object within objects 169 (as shown in FIG. 2B). Rather, the relevant event objects will be defined at the application level or at the screen level, depending upon whether the data event is defined as an application-level event (i.e. significant regardless of the currently displayed screen) or a screen-level event (i.e. only significant when a particular screen is displayed), respectively. When an XML package is received, the event objects whose onEvent( ) methods are invoked will be at the same level as, or will be directly contained by, the screen object corresponding to the currently displayed screen (FIG. 2B).

So, for example, as illustrated in FIG. 7, a user could send a login request 80 by interacting with an initial login screen, defined in the application definition file for the application. This would be passed by the transaction server 44 to the backend application server 70. The backend application server according to the logic embedded within its application, would return a login response 82, which the transaction server 44 would pass to the virtual machine software 24. Other applications, running on the same or other application servers might involve different interactions, the nature of such interactions being based upon the functionality and logic embedded within the application server 70.

II. Rapid Application Development Tool

Figure 11:
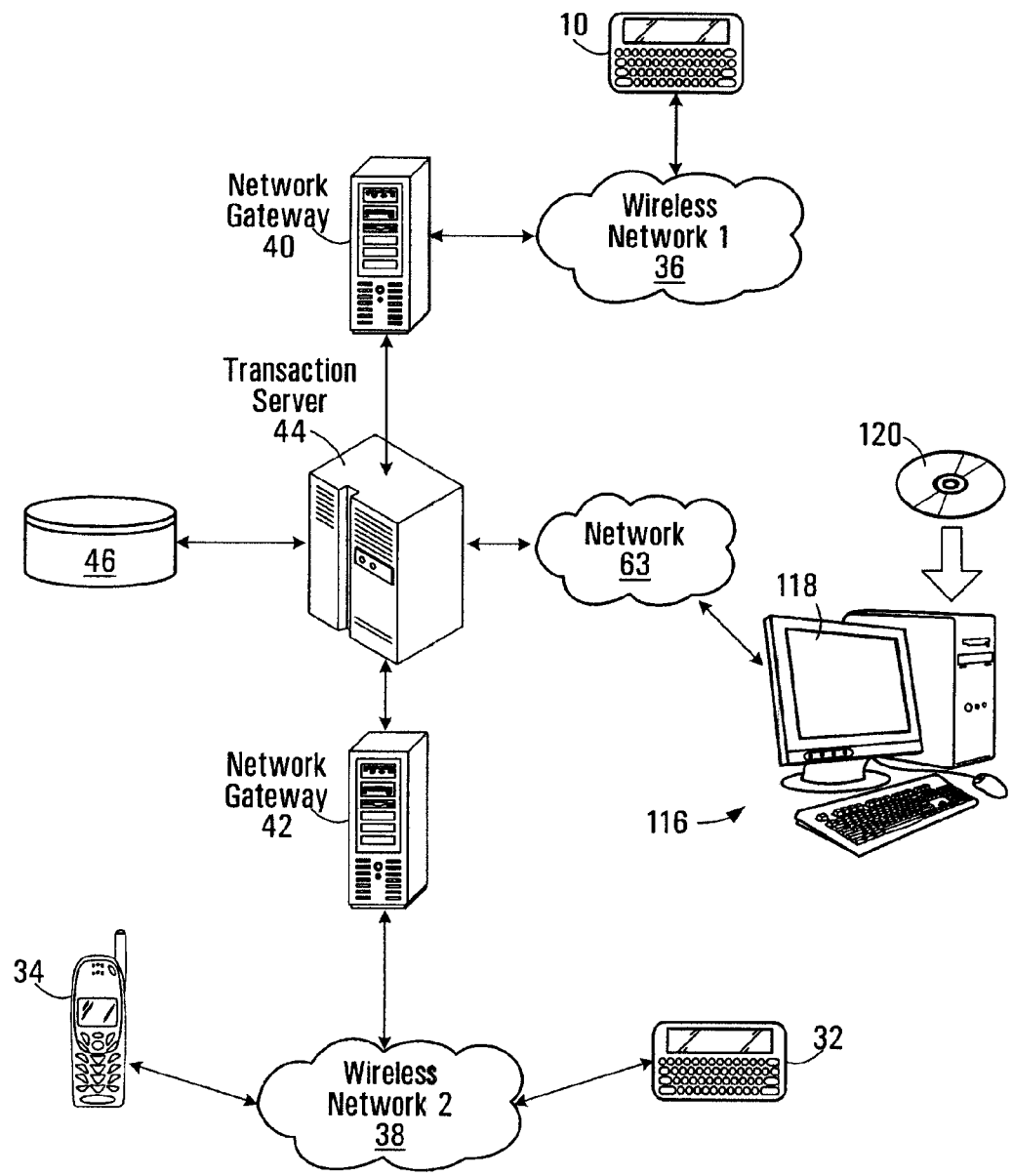
FIG. 11 schematically illustrates the wireless communication device operating environment of FIG. 3 with an exemplary Rapid Application Development (RAD) tool which may be used to develop master definition files.

In order to facilitate the development of a master definition file 58 (and, indirectly, application definition files 28) by a developer, a rapid application development tool may be used. An exemplary RAD tool 116 (or simply "tool 116") is illustrated in FIG. 11. FIG. 11 illustrates the tool 116 within the wireless communication device operating environment of FIG. 3. Wireless communication device 30 of FIG. 3 is omitted from FIG. 11 for clarity.

The RAD tool 116 of FIG. 11 is a computing device 118, such as an Intel®-Processor base personal computer (PC) for example, executing RAD software, which may be loaded from a machine-readable medium such as an optical disk 120. The tool 116 allows the developer to create a master application definition file 58 (as described above with reference to FIG. 5) from which a device-specific application definition file 28 may be generated. In turn, the device-specific application definition file 28, when downloaded, interpreted and executed at a wireless communication device 10, 32 or 34, permits the wireless communication device to emulate and intercommunicate with an application that is actually executing on an application server 70 (FIG. 6).

RAD tool 116 provides an intuitive graphical user interface (GUI) which facilitates "drag and drop" application development, so that even developers who lack depth of expertise in software development may "develop mobile applications"

(i.e. may generate master definition files 58). As a developer develops the mobile application, the tool 116 automatically generates the corresponding XML which will ultimately be "published" in the form of a master definition file 58. Completed master application definition files 58 are uploaded from the PC 118 (a particular form of computing device 118) to transaction server 44, via network 63, for downloading to wireless communication devices 10, 32 and 34. Network 63 may be an Ethernet local area network for example. The tool 116 further allows developers to simulate wireless communication device execution of developed applications locally on PC 118 prior to uploading to the transaction server 44, for purposes of testing and debugging applications before deployment onto wireless communication devices in the field, as will be described.

In an exemplary embodiment, the RAD tool 116 may be implemented as a set of plug-ins to a generic integrated design environment (IDE) framework such as the Eclipse framework. The term "plug-in" refers to business logic code that can be added to an IDE framework to interact with the IDE as though it was built into the IDE itself. These plug-ins allow for graphical user interface additions to the existing IDE to provide new added functionality for building custom types of software. As is known in the art, the Eclipse platform is designed for building integrated development environments that can be used to create various applications such as web sites, embedded Java™ programs, C++programs, and Enterprise JavaBeans™ for example. The platform exposes mechanisms to use and rules to follow to tool providers via well-defined APIs, classes and methods.

Figure 12:
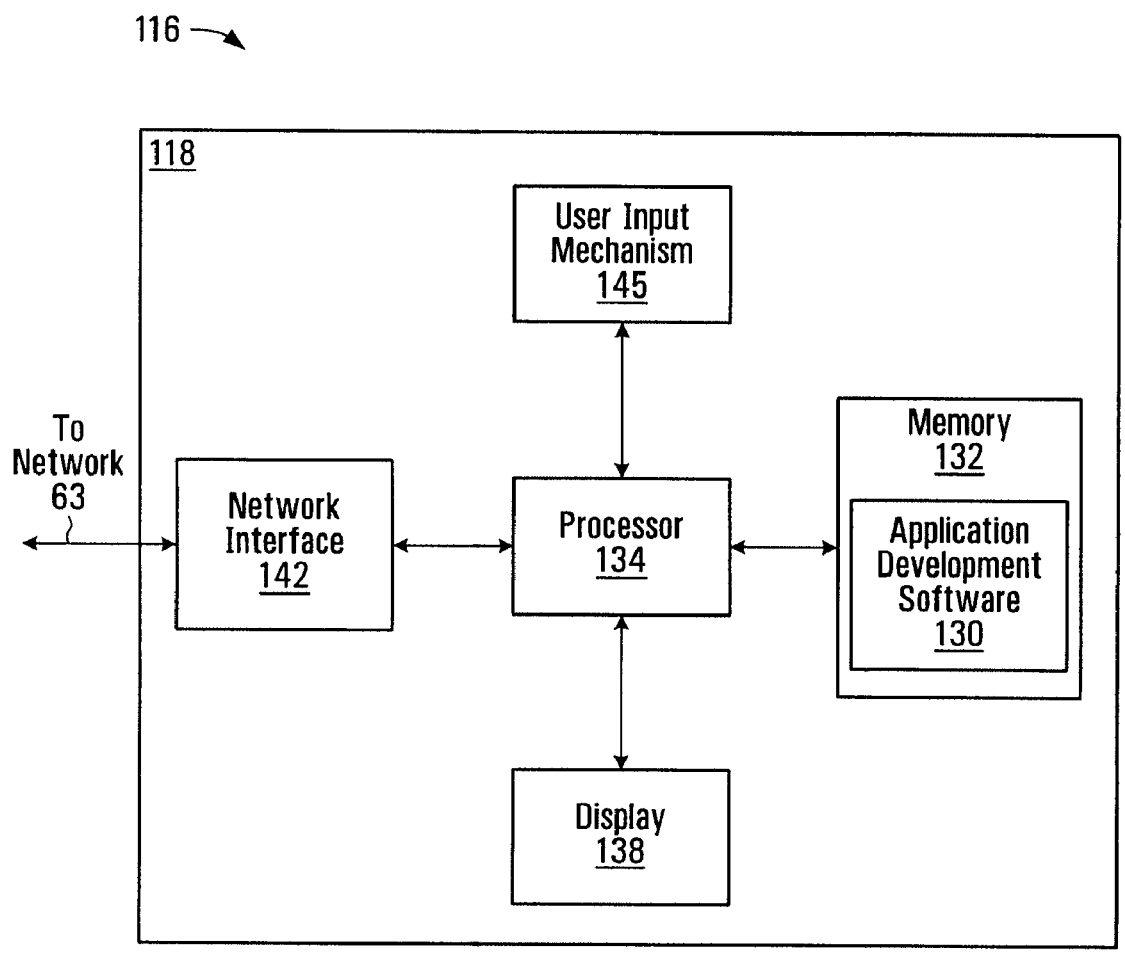
FIG. 12 schematically illustrates the RAD tool of FIG. 11 in greater detail.

FIG. 12 illustrates RAD tool 116 in greater detail. In the present embodiment the tool 116 is a PC 118 executing application development software 130. The PC 118 includes a processor 134 in communication with memory 132 which stores the software 130. The software 130, which may be referred to by the proprietary name "AIRIX Design Studio" or simply "Design Studio", may be based on the Eclipse framework, as described above. The PC 118 further includes a display 138 and a user input mechanism (UIM) 140. The display 138 may be a Cathode Ray Tube (CRT) monitor or flat-screen display for example which is capable of displaying a GUI to a developer. The user input mechanism 140 is a mechanism such as a keyboard and/or mouse for example that is capable of generating user input representative of developer commands for developing an application, e.g. in the manner described below. The UIM 140 could be a touch screen, in which case the display 138 and UIM 140 may be merged. The display 138 and UIM 140 are interconnected with the processor 134 by conventional interconnections, which may be indirect or may employ components which have been omitted from FIG. 12 for clarity (e.g. a video card or other components). The PC 118 further includes a network interface card 142 (e.g. an Ethernet interface) which facilitates communication by the tool 116 over network 63 (FIG. 11), e.g. for purposes of uploading a completed master definition file 58 to the transaction server 44.

Figure 13:
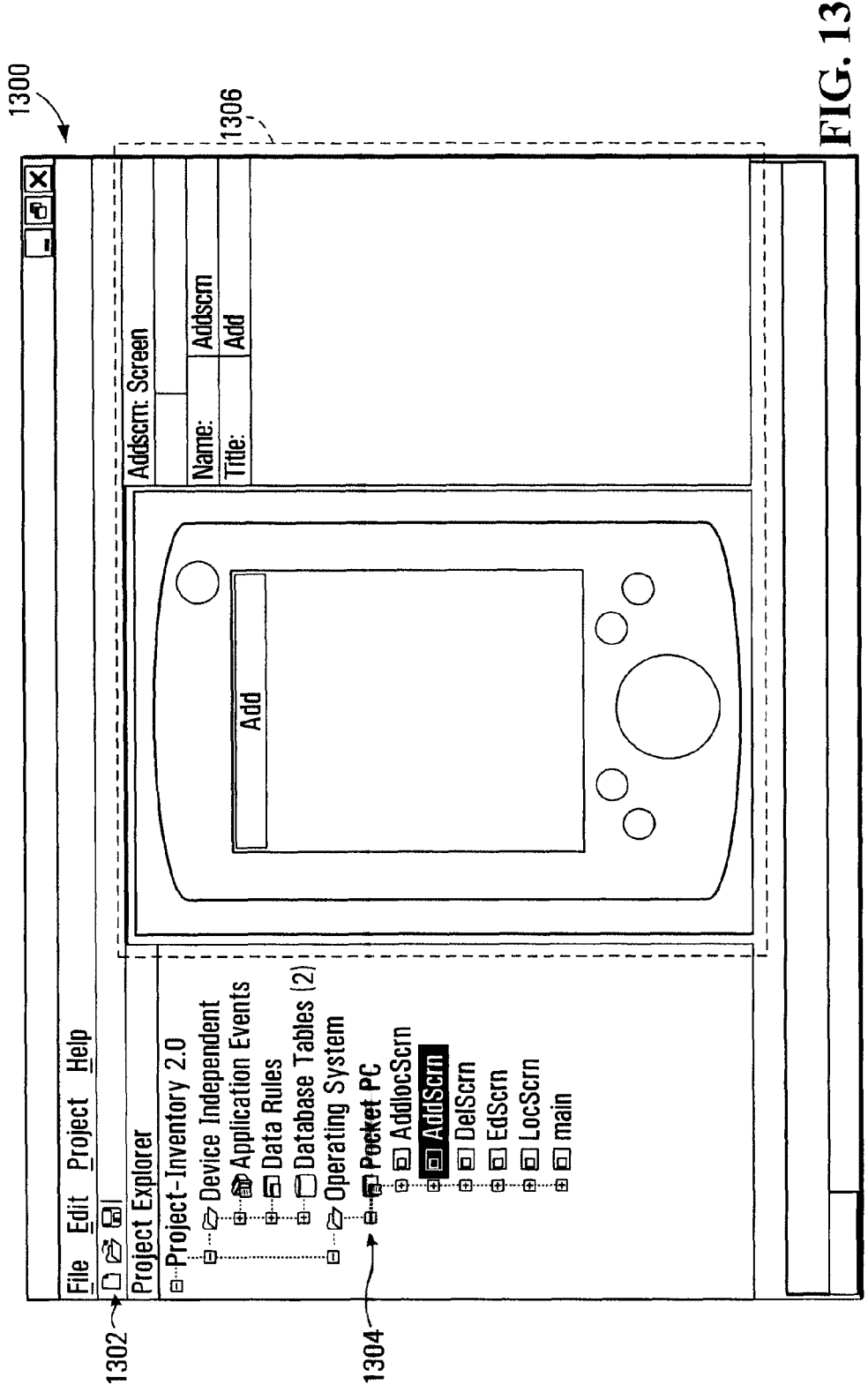
FIG. 13 illustrates an exemplary graphical user interface (GUI) of the RAD tool of FIG. 12.

FIG. 13 illustrates an exemplary GUI 1300 of the RAD tool 116 when the application development software 130 is executed. The GUI 1300 includes various components, including a toolbar 1302, a project explorer 1304, and a main design area 1306.

Toolbar 1302 includes a menu list and icons for performing various development activities during application development. Activities which may be performed include opening a new project, compiling a current mobile application, and publishing a current mobile application. The term "project" refers to an application under development. Compiling refers to the checking of various aspects of an application for errors or deviations from good programming practices. Compilation may cause hints, warnings or errors to be displayed, e.g.:

Hint—screen "AddScrn" for device "RIM" has an IF action and has no actions for its ELSE LIST.

Warning—Value "[SP.screenname. savename]" is used in the action "gotomm" on screen "AddScrn" for device "RIM". It should be noted that if this scratchpad or query value results to null, the OPEN command will not open a screen.

Error—The action "NewAction" on MenuItem "addloc" on screen "AddScrn" for device "RIM" cannot have a blank screen.

Publishing refers to the creation of a master definition file 58 from the current visual application design. Publishing may cause hints, warnings or errors to be displayed, as during compilation.

The project explorer 1304 is a tree representation of a current project in which application components (e.g. screens, database tables, events, etc.) are represented as selectable icons within a hierarchy. A more detailed view of the project explorer 1304 is provided in FIG. 14, which is described below.

Main design area 1306 of FIG. 13 displays the currently-selected application component of project explorer 1304. When an icon is selected in project explorer 1304, a graphical representation of the relevant component (e.g. a screen or database table) and its properties appears in main design area 1306. The component may then be designed or updated with "drag and drop" tools and properties of the component may be set or viewed.

Figures 14, 15:
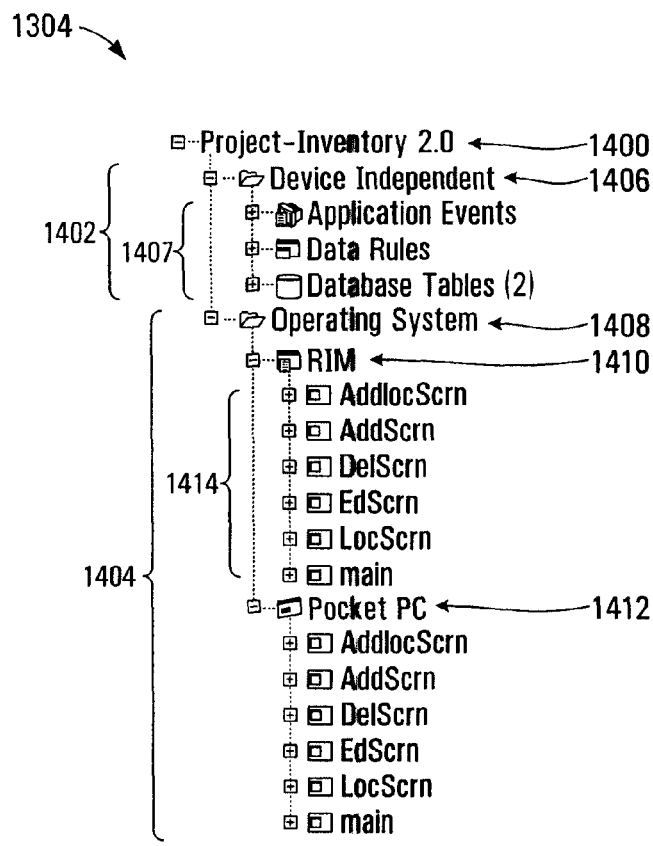
FIG. 14 illustrates a project explorer portion of the RAD tool GUI of FIG. 13.
FIG. 15 illustrates a dialog box GUI component which may be displayed by the RAD tool of FIG. 11 to facilitate definition of an IF . . . THEN . . . ELSE programming language construct within a wireless communication device application.

FIG. 14 illustrates project explorer 1304 in greater detail. In FIG. 14, project explorer 1304 displays information about a project entitled "Project—Inventory 2.0", which is represented as root level icon 1400. The project tree includes wireless communication device-independent components 1402 and wireless communication device-specific components 1404. This will be the case for most, if not all, projects. Wireless communication device-independent components 1402 are application components which are employed regardless of the wireless communication device platform on which an application is executed. Such components may include application events, database tables and data rules (described below). In FIG. 14 wireless communication device-independent components 1402 comprise icon 1406 and all icons at least one level below it within the tree (i.e. the components indicated at 1407). Wireless communication device-specific components 1404, on the other hand, are application components which may differ between wireless communication device platforms. Primarily, it is the screens of a wireless communication device application which will differ between platforms, due to differences in the capabilities of the devices (e.g. screen size). Wireless communication device-specific components 1404, are represented in FIG. 14 by icon 1408 and all icons at least one level below it within the tree. In FIG. 14, each platform for which screens have been developed has an associated icon below icon 1408 within the tree. For example, icon 1410 represents the RIM™ platform while icon 1412 represents the POCKETPC™ platform. Below the platform-specific icons, various platform-specific application components are defined. These too are represented iconically. For example, under icon 1410, the set of icons 1414 represents individual screens defined for the RIM™ platform. Each platform will typically have the same (or similar) set of screens defined therefor, with some modifications between platforms to account for platform-specific capabilities or limitations.

As indicated above, three wireless communication device-independent components which may be defined for an application are events, tables and rules. These are described below in turn.

Events

Events are real-world occurrences which trigger processing within an application. By defining events within the project explorer 1404, a developer specifies the real-world occurrences that are significant to the application. In the present embodiment, events fall into two categories. The first category is the receipt of XML packages (i.e. messages) by the wireless communication device. The second is user manipulation of a GUI control (e.g. a button press) at the wireless communication device. Events may be defined by a developer to occur at one of three levels: application-level, screen-level, or control-level. Application-level events are events which may occur at any time during the application's operation (i.e. are generally recognized by the application regardless of the application's status). In the present embodiment, only the receipt of an XML package at wireless communication device can be defined as an application-level event. When an application-level event is defined, the relevant XML package (also referred to as an XML transaction) which triggers the event is identified. Screen-level events are similar to application-level events in that they are also triggered by receipt of an XML package at a wireless communication device. However, screen-level events are recognized only when the relevant XML package is received when a particular screen is displayed. Control-level events, on the other hand, are associated with user manipulation of GUI controls at wireless communication devices. The latter type of event is defined in conjunction with individual GUI controls. Screen-level events and control-level events are normally defined once for each wireless communication device platform upon which an application is to be executable.

It is possible that a real-world occurrence such as receipt of an XML package may trigger more than one event (e.g. an application-level event and a screen-level event). In this case, the events are deemed to occur in a particular order. In particular, screen-level events are deemed to execute prior to application-level events in the present embodiment. Control-level events are not ordered in relation to the other two event types because they are triggered only when a GUI control is selected (vs. upon receipt/transmission of an XML package).

Whenever an event is defined, an action is normally defined in conjunction with it. An action defines the processing that will occur upon the detection of the associated event. In the present embodiment, at least twelve different actions may be performed:

1. MESSAGE BOX action—MESSAGE BOX actions prompt the display of a message box containing textual content upon the display of the relevant wireless communication device.

2. XML TRANSACTION action—this action creates an XML package (message) containing data for transmission to the enterprise application or for updating local database tables. When this action is defined in the present embodiment, the developer is responsible for defining in XML the data that comprises the XML package.

3. CLOSE APPLICATION action—the CLOSE APPLICATION action is typically used at least once in every project to terminate the application on the wireless communication device.

4. CLOSE SCREEN action—this action closes the specified device application screen. When this action is performed, application control reverts to the previous interface screen. If no previous screen is available, the application is exited, as upon a CLOSE APPLICATION action.

5. IF . . . THEN . . . ELSE action—this action evaluates an expression to true or false and executes actions conditionally based on the result. Different actions are typically executed when the expression evaluates to true versus when it evaluates to false.

FIG. 15 illustrates an exemplary IF . . . THEN . . . ELSE GUI dialog box 1500 which may be used by a developer to define an expression to be evaluated. The dialog box 1500 includes two edit boxes 1502 and 1504 and a drop-down list 1506. The first edit box 1502 is for textual definition of a first operand while the second edit box 1504 is for textual definition of a second operand. Operands may be queries of local database tables, "scratchpad" values (defined below) or hard-coded values. The drop-down list 1506 presents various operators which may be used within the expression. In the present embodiment, the following types of operators may be used:

a. Equals—(may be used for strings or integers) String values are considered equal if they are identical and have the same number of characters. String comparisons may or may not be case sensitive. Integers are considered equal if they are mathematically equal.

b. Less Than—(may be used for strings or integers) For strings, the expression evaluates to true if String A alphabetically precedes String B. For integers, the expression evaluates to true if Integer A is less than Integer B, mathematically.

c. Greater Than—(may be used for strings or integers) opposite of "less than" above.

d. Is Numeric—(may be used for strings or integers) returns true if value is an integer, else returns false.

e. Is Alpha—(may be used for strings or integers) returns true if value is an alphabetic character, else returns false.

f. Is Email—(for strings) returns true if string has the format username@sourcename, else returns false.

g. Is Format—(for strings) determines if a given string is in the date and time format identified in edit box 1504 (for example, dd-mmm-yyyy hh:nn:ss).

h. Max Chars—(for strings) evaluates to true if the number of characters in an input string is less than or equal to a specified maximum number of characters.

i. Min Chars—(for strings) evaluates to true if the number of characters in an input string is greater than or equal to a specified maximum number of characters.

As indicated above, the values specified in the operand edit boxes 1502 and 1504 of FIG. 15 may be hard-coded, or may constitute scratchpad values or query results. The scratchpad is a buffer on the wireless communication device that is used for temporary storage of data. The scratchpad is conceptually similar to a clipboard of a word processor application except that it can store multiple named variables on a screen-specific basis. In the present embodiment the scratchpad is capable of storing multiple values along with identifiers for same. In the present embodiment, the values that may be stored may be global or screen-specific. Global Scratchpad Values are scratchpad values within applications that are not associated with a specific GUI screen. When a Global Scratchpad Value is saved, a "savename" is specified within the SAVE VALUE TO SCRATCHPAD action (described below). The savename is essentially a variable name that may be used to recall the saved value from the scratchpad at a later time. Screen-specific scratchpad values are, as their name suggests, screen-specific. When a screen-specific scratchpad value is saved, in addition to the specification of a savename specified, a screen name of the relevant application screen from which the value is taken is also saved. Both of the screen name and savename should be specified when the value is recalled at a later time.

A query, on the other hand, is a query of a local wireless communication device database which returns records matching specified search criteria. Queries are similar to SQL "select * where <x>") statements, where <x> represents the search criteria. A binary representation of a query's results may be saved to the device when an application's screens are created or refreshed. In the present embodiment, queries are defined and linked to the interface screens in which they are performed. Queries are executed in the sequence in which they are ordered by the developer in the present embodiment. Thus if Query B references the results of Query A in its where-clause, Query A should be ordered ahead of Query B by the developer to ensure proper operation. Upon execution of a query, query results are saved to the device using a combination of the query name and name of the database table field from which the data is drawn. Query values can be referenced from conditions, "query where" parameters, text items, message boxes and XML TRANSACTION action text. Queries may be used to populate XML packages with data retrieved from wireless communication device tables.

As further illustrated in FIG. 15, the IF . . . THEN . . . ELSE dialog box 1500 includes a Negate check box 1508. When marked, the evaluated outcome of the expression is negated (i.e. true becomes false and vice-versa).

6. DEVICE BEEP action—the DEVICE BEEP action causes the wireless communication device to make its default notification sound (this action is not supported on wireless communication device lacking sound capabilities).

7. OPEN SCREEN action—this action instructs the application to display a specified user interface screen.

8. PURGE SCRATCHPAD action—this action clears the contents of the device's scratchpad. Removing scratchpad entries may be beneficial as it may conserve memory and may prevent scratchpad values from being inadvertently recalled within the application.

9. REFRESH SCREEN action—similar to the refresh feature of a Web browser, a REFRESH SCREEN action causes the specified screen to be refreshed. This action may be used to update controls and/or data displayed on a screen.

10. SAVE ALL SCREEN VALUES action—used in conjunction with the Save property of a user interface control, the SAVE ALL SCREEN VALUES action saves user selections and data to the device scratchpad. The name assigned to values saved to the scratchpad is formed by combining the screen name and the associated control's Save Name parameter.

11. SAVE VALUE TO SCRATCHPAD action—used in conjunction with the Save property of a user interface control, SAVE VALUE TO SCRATCHPAD actions are used to save or update values specified by item name to the scratchpad.

12. INTEGRATION action—This action is used only in respect of the PocketPC platform. It allows a developer to create a custom COM object for PocketPC for invocation from the application. The COM object has a ProgID in the format of Class.CoClass. When defining this action, the name of the result when stored (if storing to scratchpad) and the input value to the COM method call may all be specified. As well, a simulator debugging switch (checkbox) may be toggled to specify either a default result to be returned when the action is run in the simulator (described below) or to cause the simulator to prompt for entry of a return value when the action is executed during simulation.

It is noted that scratchpad values and query results are two examples of variable tags which may be specified using RAD tool 116. Variable tags may generally be used in place of hard-coded values in many places within a mobile application, including user interface controls, parts of "query where" clauses, text items, and as portions of XML packages generated using an XML TRANSACTION Action. Other examples of variable tags include system variables, system functions, and single field lookup functions. System variables are variables which cause application-specific and wireless communication device-specific information to be retrieved by an application at run time. Examples of application-specific and wireless communication device-specific variables include a wireless communication device's Mobile ID, the name or version of an executing application, and the current date. System functions are variables which enable date and time date to be manipulated. For example, a unit of time such as a day can be added to or subtracted from the current date, or the current date may be converted to a string value (e.g. in dd mmm yyyy hh:nn:ss format). The single field lookup functions allow a single database field to be retrieved from a wireless communication device database table when the lookup variable is encountered within an application. When this function is specified, the name of the table from which the tag will retrieve the value, the field within the table containing the value, and the where-clause for the search are all specified.

Tables

Tables may be defined by a developer for purposes of storing data at run time for use by the application executing at the wireless communication device. The tables of the present embodiment are database tables (although it is possible for alternative embodiments to employ a data store which does not meet the traditional definition of a "database"). Each table is defined once per application, regardless of the number of platforms upon which the application is to be executable. This is due to the fact that applications operating on different wireless device types will utilize the same XML-defined table structure (i.e. tables definitions are platform-independent). When a table is defined, it is defined to have one or more fields. In the present embodiment, the fields may have various types, such as integer, string, auto-incrementing (i.e. automatically assigned values which are designed to be unique for each table record), and date/time. The tool 116 also permits the primary key (i.e. the field containing a unique value which may be used to differentiate between records) of a table to be specified.

Rules

Rules dictate how XML transactions received from enterprise applications affect data stored in database tables associated with an application. Rules also dictate how to apply changes to database tables from XML created in an outgoing XML transaction in the context of an ARML action. A rule typically defines which field(s) of a table will be impacted by incoming data and the nature of the impact. Because rules make reference to database tables, logically they are defined after the tables have been defined. Like tables, rules are platform independent.

As with events and tables, rules are added to an application within project explorer 1304 (FIG. 13). When a rule is created, the XML package(s) impacted by the rule are specified. A rule may be configured to cause an XML package originating from an XML TRANSACTION action of the application to be sent to the enterprise application. When this is done, the XML package is forwarded to the enterprise application following the processing of any associated table updates. When a rule is created, table updates may be defined in conjunction with the rule to specify what modifications should be made to the database table when the rule is processed. Within each table update, the specific table fields to be modified are identified. As incoming XML packages may affect more than one table, more than one table update can be added to a single rule. Each table update can perform one of three actions with the XML package data: add, update or delete table records. The developer may specify which portion of the package contains data based upon which the database table(s) should be updated. If the database table is to be updated or deleted, the developer may specify a "where" field which, in conjunction with a "where" parameter, limits the relevant action to matching records within the table. The where parameter specifies the value which must be present in a record of the table for it to be considered a match. The where parameter may be a hard-coded value, a scratchpad value, or an XML package variable (i.e. a value found in the XML transaction). For example, if it is desired for a table update to delete specific records from a table, the Where Parameter can be specified to refer to an XML package variable "RecordNum" of a specified XML package. If the following package were to be received and the table update associated with this package were performed, the "RecordNum" value would be replaced with "25" and, as a result, only records having a record number "25" would be deleted from the specified table:

```
<PKG TYPE="DELREC">
  <AREC RecordNum="25"></AREC>
</PKG>
```

When a table update is created, fields may be added in order to create associations between data in XML packages and the fields in the database tables which are to be updated by the rule. Just as data tables can contain a number of fields, table updates in rules can affect a number of different fields within a single table. When adding a field, the desired table field (i.e. the field that will be modified by the XML data when the rule is processed according to the instructions defined in the table update) is specified. As a general rule, the field identified as the primary key of a table should not be updated or deleted by any rule. Although special circumstances may occasionally require this, the practice is generally avoided because altering the primary key can affect its uniqueness within the table.

It is also possible to specify whether the location within the associated XML package containing update data (in the event of a field update versus a deletion) is an XML attribute or an XML element value. When the location is an attribute, the attribute name is specified. For example, consider the following XML Package:

```
<PKG TYPE="PACKAGE1">
  <AREC DATA="123456"></AREC>
</PKG>
```

In this case, the update data ("123456") is in the attribute "DATA". In this example, the attribute name "DATA" would be specified to indicate that the attribute in the XML package which contains the table update data is the "DATA" attribute (given that the transaction could have multiple attributes).

In contrast, if the updated data is the value of an XML element (e.g. the value "123456" in the below exemplary XML package), the location would be specified as an element parameter type:

```
<PKG TYPE="PACKAGE2">
  <AREC>123456</AREC>
</PKG>
```

If more than one database table field is specified within a table update, only a single field should be set as an ELEMENT parameter type. The remaining fields in the update should have ATTRIBUTE parameter types.

Referring back to FIG. 14, when it is desired to develop screens for a particular platform such as the RIM™ platform, the developer initially specifies that the RIM™ platform is to be supported, so as to result in the creation of icon 1410 representative of the RIM™ platform. Thereafter, creation of individual RIM™ screens (represented as icons 1414 in FIG. 14) may be performed. When an individual screen is being designed, an "interface designer" GUI that is specific to the relevant platform will appear in the main design area 1306. An exemplary interface designer GUI 1600 for the RIM™ platform is illustrated in FIG. 16.

Figure 16:
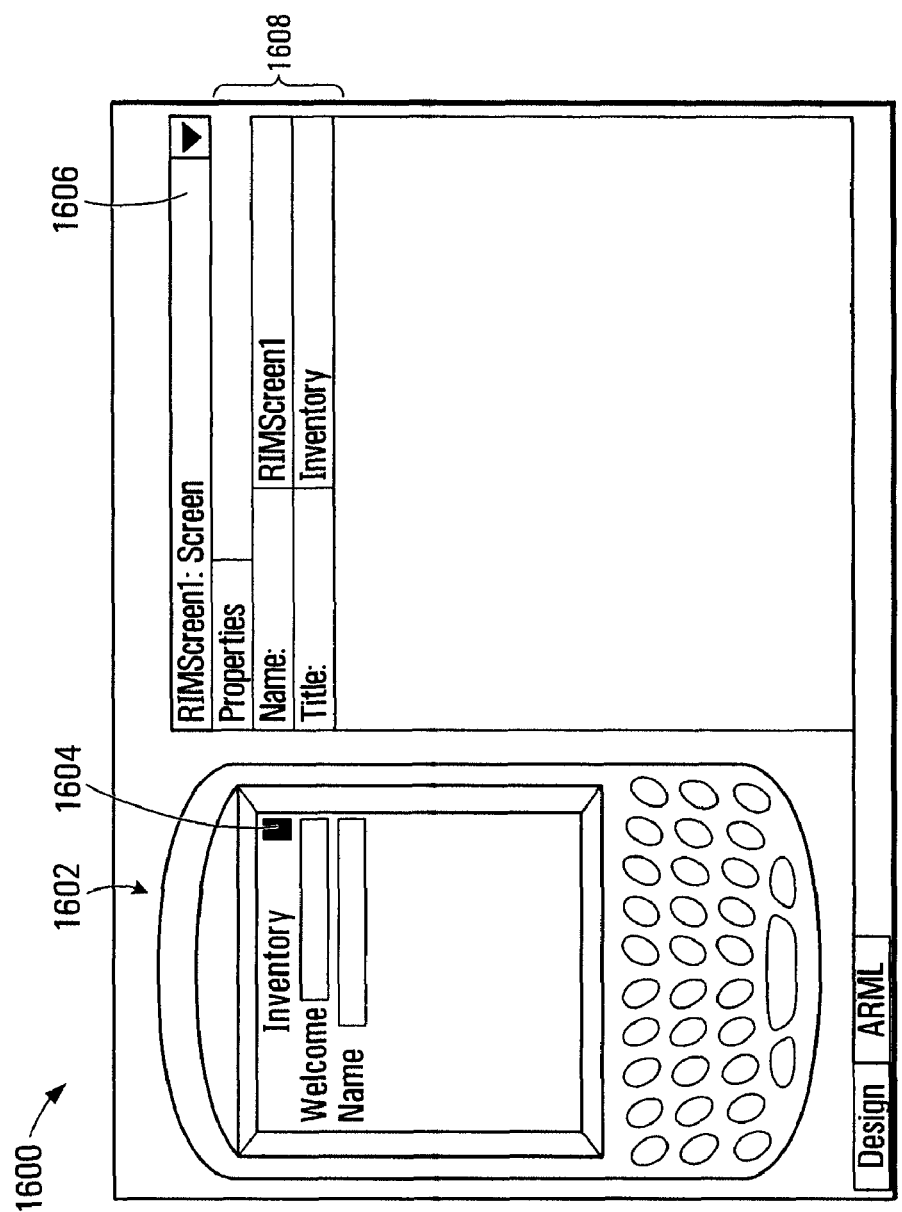
FIG. 16 illustrates an interface designer GUI component which may be displayed by the RAD tool of FIG. 11 to facilitate definition of a GUI screen of a wireless communication device application.

As shown in FIG. 16, RIM interface designer GUI 1600 includes a number of GUI areas, namely, a (RIM™) screen designer 1602, an interface component drop-down list 1606 and a properties tab 1608.

The screen designer 1602 is a "screen painter" window which displays a graphical representation of the relevant wireless communication device type (referred to herein as a "virtual device") for which screens are to be created. The designer 1602 permits a developer to design screens by dragging and dropping interface components (buttons, edit boxes, etc.) to the virtual device screen in the window, offering a "what you see is what you get" (WYSIWYG) view of the interface screen under development.

For the RIM™ platform, the virtual device screen includes a menu icon 1604. Selection of this icon permits a developer to define the menu items that are displayed when the trackwheel is clicked by the wireless communication device user. It should be appreciated that the virtual device displayed in the designer 1602 reflects the capabilities and limitations of the corresponding physical wireless communication device. For example, RIM™ BLACKBERRY™ wireless communication devices employ a trackwheel for navigation which permits a user to scroll between items. Clicking a RIM™ device's trackwheel will cause screen-specific menus to be displayed. These menus are the primary means of navigation for a RIM™ BLACKBERRY™ device. These characteristics are reflected in the designer 1600. The capabilities or limitations of other platforms reflected by designer 1600 may be different.

Referring again to FIG. 16, the interface component drop-down list 1606 facilitates definition and selection of individual GUI components which make up the screen as displayed within the interface designer window 1602. For the RIM platform, the following UI component types may be defined:

Text Label—non-selectable textual label
Edit Box—a field into which a user may enter text.
List Box—a list of options which may be selected by a user. Multiple options may be displayed simultaneously.
Choice Box—similar to a list box, except only one option is displayed at a time. Choice boxes generally occupy less screen real estate than list boxes.
Yes/No Control—similar to a check box, yes/no controls allow users to choose from one of two options, either "yes" or "no".

Grid—a structure for displaying data in table form. Grid controls allow for the organized display of a quantity of information.

The properties tab 1608 displays the properties of the interface component that is currently selected in the drop-down list 1606. Properties that are generally applicable to the overall screen may also be displayed.

Simulator

The RAD tool 116 is also equipped with a simulator. The simulator permits the run-time environment of the wireless communication device platform upon which an application is to be executed to be simulated. The simulator provides a convenient mechanism for testing an application under development (specifically, an application definition file 28) without use of an actual wireless communication device. It may also be used for debugging purposes.

The simulator incorporates executable code which is similar to the processing normally performed at the transaction server 44 (FIG. 3). In particular, the simulator code permits the HTTP connection which, in the present embodiment, is ordinarily created at run time between the transaction server 44 and application server 70 (as described above), to instead be created between the RAD tool 116 and application server 70. In this manner simulation can be performed without involving transaction server 44. XML transactions are sent from the application under simulation to the simulator and then from the simulator directly to the transaction server 70 via the HTTP connection; conversely, application data is sent back along the same path in the opposite direction. Microsoft® Internet Information Service could be used to support this capability. Different simulator code may be executed depending upon the platforms that is being simulated.

Figure 17:
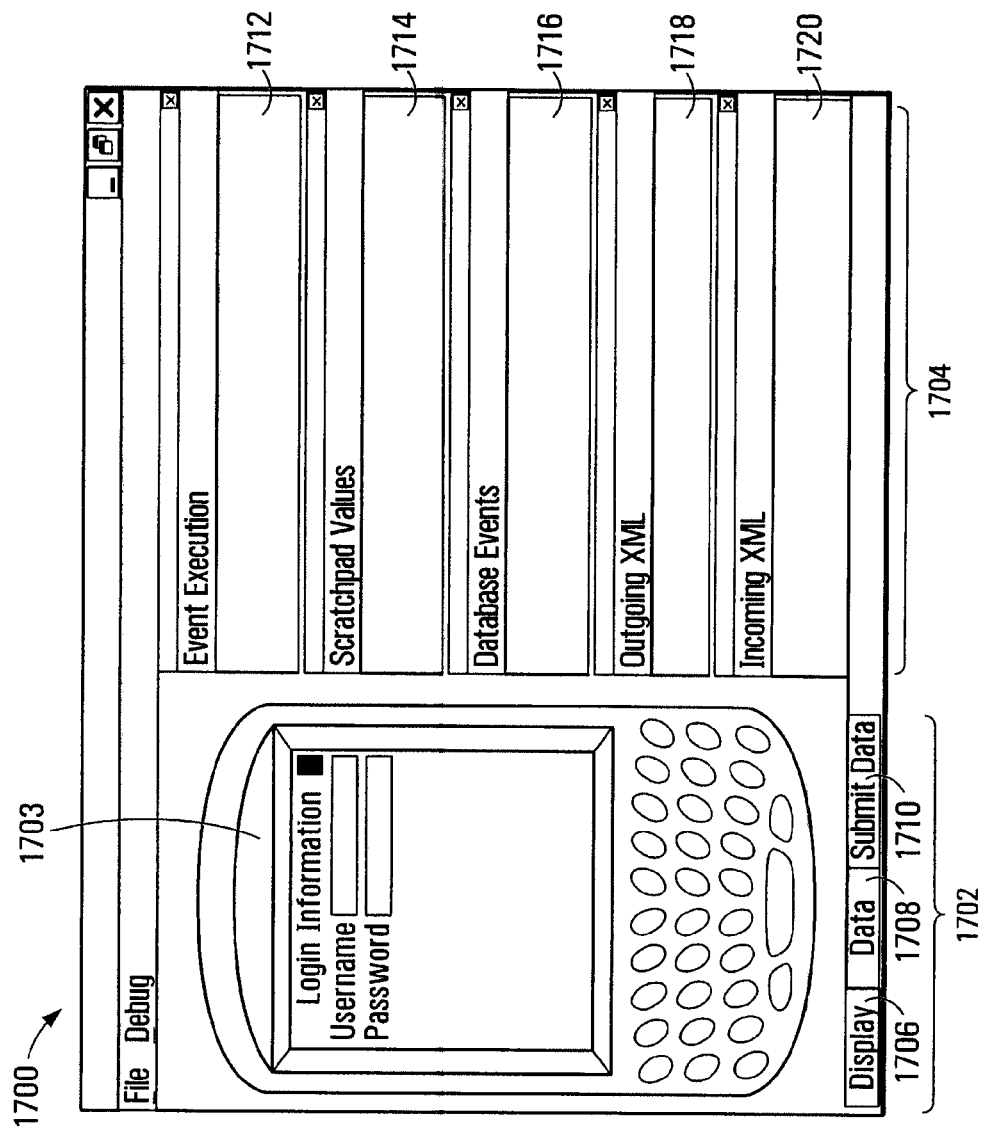
FIG. 17 illustrates a GUI of a simulator component of the RAD tool of FIG. 11 which may be used to simulate operation of a wireless communication device application.

FIG. 17 illustrates a GUI 1700 which is displayed when the simulator of RAD tool 116 is executed. In the illustrated example, a RIM application is being simulated. As illustrated in FIG. 17, the GUI 1700 has two primary areas, namely a device screen simulator area 1702 and a set of debugging windows 1704.

Device screen simulator area 1702 displays a graphical representation of the relevant wireless communication device (here, a RIM device) as it would appear to a user executing the application under simulation. The device controls within area 1702 may be manipulated by a developer in a similar manner to that in which the controls of an actual physical device would be manipulated by a user. In the case of the RIM platform, the following are examples of the manner in which these manipulations may be performed:

Selecting the trackwheel—place mouse cursor over the simulated trackwheel and press the right mouse button.

Scrolling trackwheel items—place mouse cursor over the simulated trackwheel and hold down the left mouse button.

Entering text—place mouse cursor in the desired field and enter the text using RAD tool keyboard.

Scrolling choice field items—select the choice field using the mouse and press RAD tool keyboard Ctrl key, then use the device scroll wheel to scroll through the options.

As the virtual device is manipulated, its display area 1703 changes dynamically to display screens/data in accordance with the simulated application and the developer's control manipulations.

The above description assumes that the "Display" tab 1706 of FIG. 17 has been selected. If the "Data" tab 1708 is selected, the area 1702 instead displays the data that is currently stored in the virtual device's local database tables, in a graphical database form. The Data view is updated dynamically as the simulator executes the application. Alternatively, if the "Submit Data" tab 1710 is selected, an input area is displayed. XML may be entered or pasted into this area and then submitted to the application under simulation as though it came from the application server 70.

The debugging windows are independently displayable windows which display various aspects of an ongoing simulation. In the present embodiment, any combination of the five following windows may be displayed:

Event Execution Window 1712—lists the events and actions that are executed during application execution.

Scratchpad Values Window 1714—displays the current status of the device scratchpad, identifying any values currently retained by the application and their saved names.

Database events 1716—displays any queries (e.g. in the form of SQL queries) which have been executed upon the application's database tables.

Outgoing XML 1718—displays the XML Transactions that are constructed and sent by application under simulation; and Incoming XML 1720—displays the XML Transactions received by the application under simulation.

Selection of an item displayed in any of the debugging windows 1704 may result in the display of additional information about the item in the present embodiment.

III. Facilitating Execution of Server-Side Applications at Wireless Communication Devices In sections I and II above, descriptions are provided of a baseline system which facilitates execution of server-side applications at wireless communication devices as well as of a rapid application development tool for developing a master definition file (respectively). In this section, the execution of certain textually-defined instructions at a wireless communication device will be described.

As should be apparent from the description in sections I and II, the behavior of a wireless communication device of the baseline system, in terms of its interaction with a server-side application and its presentation of a graphical user interface, is governed by the program logic (events, actions, interface screen controls, etc.) designed by a developer using the RAD tool 116. In other words, when it is desired for a wireless communication device to behave in certain ways, a developer interacting with RAD tool 116 may cause certain textually-defined instructions (here, XML elements and attributes, as described in Appendix "A" for example) to be included within the master definition file 58 (FIG. 5). The textually-defined instructions are included within an application definition file 28 which is generated from the master definition file 58, and when the application definition file is deployed, interpreted and executed at a wireless communication device, the desired behaviors are achieved.

Four examples of additional instructions which a developer may wish to effect are: (1) simple math functions; (2) for-each loops; (3) decision dialogs; and (4) timers. A manner of effecting these instructions in an enhanced version of the baseline system will now be described. In order to effect each instruction, each of the XML schema which forms the basis of the specification of Appendix "A", the virtual machine software 24, and the RAD tool 116 may be modified, as described below.

(1) Simple Math Functions

A developer may wish to implement simple math functions (i.e. mathematical operations such as addition, subtraction, multiplication and division) for numerical (integer or floating-point) values. On some wireless communication device platforms, such as the RIM and Palm platforms, this may be difficult due to lack of native floating-point operation support. That is, floating-point values may not be implemented in an API because of the lack of a math co-processor on the device. To address this shortcoming, floating-point numbers can be "created from scratch" for such platforms. Specifically, string manipulation and simple integer operations may be used to effect floating-point numbers. This may permit textually-defined simple mathematical operations to be effected at the wireless communication device for floating-point numbers in addition to integers.

For example, the following pseudo-code illustrates addition of two floating-point numbers, 1.8+2.8=4.6, using string conversion and integer addition (the "//" delimiter below indicates a comment):

```
// Get values after decimal and add them
String a = valueAfterDecimal("1.8"); // 8
String b = valueAfterDecimal("2.8"); // 8
Integer decimalvalue = a.tointeger( ) + b.tointeger( ); // 16
// Get values before decimal and add them
String start1 = valueBeforeDecimal("1.8") // 1
String start2 = valueBeforeDecimal("2.8") // 2
Integer integervalue = start1.tointeger( ) + start2.tointeger( ); // 3
// See if the decimal value is greater than or equal to10
If (decimalvalue >=10)
Begin
    Integer newdecimalvalue = LastDigit(decimalvalue.tostring( )); // 6
    Integer newintegervalue = NextToLastDigit(decimalvalue.tostring( ));
    // Add the new value to our integer value
    integervalue = integervalue + newintegervalue; //4
    decimalvalue = newdecimalvalue; // 6
End
Return integervalue.tostring( )+"."+decimalvalue.tostring( ); // 4.6
```

Long division may also be achieved on platforms not supporting true floating-point values. A division result may be represented as a string whose length is determined by the desired number of significant digits (or, more specifically, the number of decimal places to be displayed after the decimal point) and whose final digit is rounded as appropriate. Thus, if it is desired to compute an operation such as 2÷3 with five significant digits (e.g. to be able to represent this value on a RIM or Palm wireless communication device display), an interim result of "0.666666" may initially be stored. Then, based on the value of the last digit, it may be determined whether the fifth digit to the right of the decimal point should stay as is (i.e. 6) or should be rounded up (to 7). That is, if a dropped significant digit is greater than or equal to five, then the preceding significant digit may be rounded up. This would result in a value of "0.66667" in this case.

To effect such simple math functions, the XML schema which forms the basis of Appendix A is modified to support a new "MATH" action. That is, a new possible value for the "TYPE" attribute (i.e. "MATH") is added, and various further attributes associated with the action (left operand "L", operator "O", right operand "R" etc.) are defined, in accordance with known XML schema development techniques. As well, the object classes 69 which are instantiated and executed at the wireless communication device are modified to support the new action. In particular, a new Math class will be defined having attributes (e.g. data members) for storing the left value and right value of a mathematical operation (i.e. the operands) and for storing the mathematical operation to be performed upon the values (add, subtract, multiply or divide). The operand variables may be string variables and may take their value from corresponding XML attributes (such as "L" and "R" in the below example) or from a scratchpad value. The Math class will also have data members for storing the desired number of significant digits and a rounding value for the desired number of significant digits, as well as a savename for the result to be saved to the scratchpad.

In the case that the wireless communication device does not have floating-point capability, the operation may be performed upon the left and right values using string manipulation and integer math, as described above. Where the operating system supports floating-point values, the OS equivalent to a "StringToFloat( )" method will be called to convert the string value to a proper floating-point value. When the mathematical operation has completed in both cases, rounding may be applied for the desired number of significant digits. More specifically, for a wireless communication device that supports floating-point values, a "round" function can be used; in the case of a non-floating-point capable wireless communication device, string manipulation can be used to round the value.

In addition, the application development software 130 which governs the operation of the RAD tool 116 (FIG. 12) is modified to provide a convenient mechanism in tool 116 for defining simple math functions. In particular, a mechanism is provided within the tool 116 for defining a new type of action, namely a "math" action. The mechanism may be similar to the mechanisms used for defining other types of actions, such as an IF . . . THEN . . . ELSE action. Accordingly the mechanism may be such that a developer is required to select an event within the project explorer 1304 (FIG. 13) with which the action is associated, which will serve as the trigger for the execution of the math function.

The modifications that are made to the application development software 130 to support simple math function definition are perhaps best appreciated by considering the operation of a RAD tool 116 executing the modified software 130.

Figure 18:
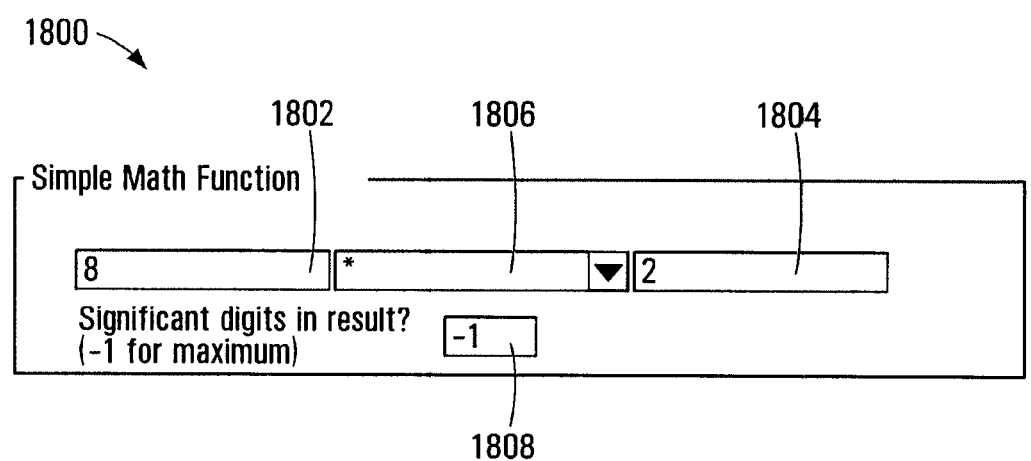
FIG. 18 illustrates a dialog box GUI component which may be displayed by the RAD tool of FIG. 11 to facilitate definition of a simple math function within a wireless communication device application.

When a developer interacting with the RAD tool 116 whose software has been appropriately modified to support simple math functions specifies that definition of a simple math function is desired, a simple math function dialog box 1800 as illustrated in FIG. 18 may be displayed within the main design area 1306 (FIG. 13). As will be appreciated from FIG. 18, the exemplary dialog box 1800 has a similar structure to the dialog box 1500 (FIG. 15) that is used to define a expression which evaluates to true or false in the context of an IF . . . THEN . . . ELSE action. Specifically, the exemplary dialog box 1800 includes two edit boxes 1802 and 1804 and a drop-down list 1806. The first edit box 1802 is for textual definition of a first operand while the second edit box 1804 is for textual definition of a second operand. A maximum number of permitted input characters may be specified for each edit box 1802 and 1804. Operands may be textually specified to be queries of local database tables, scratchpad values or hard-coded values. Operands should evaluate to numeric expressions (integers or floating-point). The drop-down list 1806 presents various operators which may be used within the expression. In the present embodiment, the following types of operators may be used: +(plus), −(minus), *(multiply) and /(divide).

A further edit box 1808 of the dialog box 1800 of FIG. 18 permits the developer to specify the number of significant digits to be returned in the math function's result. In the event that no number of significant digits has been specified, a predetermined default maximum number of significant digits (e.g. 10) may be returned. Return of the default maximum number of significant digits may be expressly requested through specification of a predetermined value (e.g. −1).

In the present embodiment, the return value may be either an integer value or a float value. The floating-point result may not have any digits after the decimal point, or may be returned with a default number of significant digits if the number of significant digits is not specified by the user. If the evaluation of the action calculates a floating-point result having digits after the decimal point, the action may return a result with the number of significant digits specified by the user or the maximum number of significant digits if the user has not specified a desired number of significant digits. When a value to be returned has more significant digits than the requested number, the floating-point value may be rounded.

When a developer has specified a simple math function using dialog box 1800, the corresponding XML that is generated within the master definition file 58 upon its publication may be as follows:

```
<ACTION DBGNAME="DoMath" TYPE="MATH"
    L="8" O="*" R="2"
    SAVENAME="MYRESULT" SIG="-1"/>
```

In the above exemplary XML excerpt, the "DBGNAME" attribute is a variable name used for debugging purposes is the simulator of RAD tool 116, the "TYPE" attribute specifies that the action is a math function, the "L" attribute specifies the left operand (as specified in edit box 1802 of FIG. 18), the "O" attribute specifies the operator (as specified in drop-down list 1806), the "R" attribute specifies the right operand (as specified in edit box 1804), the "SAVENAME" attribute specifies the name of the result which is saved to the scratchpad, and the "SIG" attribute specifies the desired number of significant digits in the result (as specified in edit box 1808.

At run time, when a math action is encountered during loading of a screen, a corresponding math action object is instantiated within objects 169 at the wireless communication device 10. The math action object may include data members which store the values of the various attributes described above. The doAction( ) method of the math action object may include a case statement having different logic branches which are based on the value of the operator (plus, minus, multiply or divide).

Certain operand values may trigger return of a result (e.g. "E") which indicates an exception or error condition. This may for example occur in the following situations:
  the operator is a division operator and the right hand side operand (i.e. the operand in edit box 1804) evaluates to zero;
  either one or both of the operands have not been specified (i.e. either or both of edit boxes 1802 and 1804 have been left blank);
  either one or both of the operands does not evaluate to an integer or a floating-point value;
  the number of input characters in one or both of the edit boxes 1804 and 1802 exceeds a specified maximum; or overflow or underflow conditions.

(2) For-Each Loops

In certain situations, it may be desirable for a wireless communication device to be capable of processing a list of select data records retrieved from its locally-maintained database tables. For example, it may be desirable to perform a certain mathematical function for each record matching specified search parameters (e.g. to count records or to tally numeric data stored in records). Alternatively it may be desired to concatenate string information from matching records into a single string. The for-each loop instruction facilitates such processing.

In the present embodiment, the for-each loop instruction is defined textually as an XML action element having an associated query. Like other types of actions, the for-each loop action is associated with an event which serves as the trigger for execution of the action. As described below, the event is a screen-level event in the present embodiment. The associated query defines the search parameter(s) to be applied to the database table of interest to retrieve matching records. The processing to be performed for each matching record is specified in the form of one or more actions which are defined by a developer.

To effect the for-each loop construct, the XML schema which forms the basis of Appendix A is modified to support the new "for-each" action. In other words, a new potential value for the "TYPE" attribute (e.g. "FOR") is added to the definition of the action XML element. As well, the QRY attribute (used to specify the send parameter(s) for the "for-each" action) is defined. Also, a LOOP element that is subordinate to the "for-each" action is defined for purposes of containing one or more action elements representing actions to be performed for each matching record. As well, the object classes 69 which are instantiated and executed at the wireless communication device are modified to support the new action.

Figure 19:
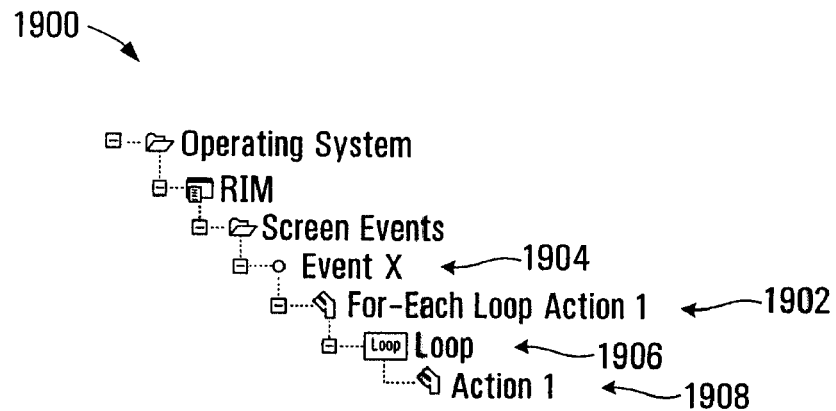
FIG. 19 illustrates a portion of the project explorer of FIG. 14 which may be displayed to facilitate definition of a for-each loop programming language construct within a wireless communication device application.

The application development software 130 which governs the operation of the RAD tool 116 (FIG. 12) is also modified to provide a convenient mechanism in tool 116 for defining for-each loops. In particular, as shown in FIG. 19, which illustrates a RIM platform-specific portion 1900 of the project explorer 1304 of FIG. 13, a for-each loop action 1902 is defined in association with a screen-level event 1904. The reason that for-each loop actions are defined in association with screen-level events in the present embodiment is that the queries that are used to specify search parameters for retrieving records of interest are screen-level queries. By associating the for-each loop action with a screen-level event (which occurs only when a screen is "open", i.e. displayed), a developer can ensure that the query will be accessible, given that a query is only accessible in the present embodiment when the screen in conjunction with which it is defined is displayed. For-each loop actions are not defined below application-level events because there may be no way to ensure that a screen whose query is to be used as a search parameter would be displayed such that the query would be accessible. A for-each loop could be associated with a control-level event. Of course, in alternative embodiments it may be possible to associate for-each loop actions with application-level events if queries defining search parameters are accessible even when the relevant screen are not displayed.

When the for-each loop action 1902 of FIG. 19 is created, a dialog box (not illustrated) is displayed in the main design area 1306 of tool 116 which permits the developer to set for-each loop properties. The dialog box includes a drop-down list (also not illustrated) which lists all of the queries defined for the relevant interface screen. To set the search parameters for the for-each loop, one of the queries is selected.

When the for-each loop action 1902 is created, a "loop" element 1906 subordinate to element 1902 is automatically created within the project explorer 1304. Actions are added below the loop element 1906 to define the processing to be performed for each matching record. In the example of FIG. 19, only a single action 1908 is defined, thus only that action is performed for each matching record.

When a developer using tool 116 has created a for-each loop action as shown in FIG. 19, the corresponding XML that is generated within the master definition file 58 upon its publication may be as follows:

```
<ACTION DBGNAME="DoMyLoop" TYPE="FOR"
QRY=" QRYLOOKUP" >
    <LOOP>
        <ACTION DBGNAME="DoMath" TYPE="MATH"
        L="[SP.*.MYCOUNT]" O="+" R="1"
        SAVENAME="MYCOUNT" />
    </LOOP>
</ACTION>
```

In the above exemplary XML excerpt, the "DBGNAME" attribute is a variable name used for debugging purposes, the "TYPE" attribute specifies that the action is a for-each loop, and the "QRY" attribute specifies a defined query for the relevant screen. In the example, the action that is performed for each matching record is a simple math function which tallies the number of matching records and stores the value in the scratchpad under the name "MYCOUNT".

Thus, as will be appreciated, a for-loop is represented by the outermost markup language element, ACTION, having TYPE="FOR", while the action to be performed each time through the loop is represented by the subordinate markup language element, ACTION, having TYPE=MATH.

At run time, when a for-each loop action definition is encountered during loading of a screen, a corresponding for-each loop action object is instantiated within objects 169 at the wireless communication device 10. The for-each loop action object may include data members which store the values of the various for-each loop attributes described above. Like an event object, a for-each object may have an array of action objects among its data members, in this case representing the actions to be taken for each pass through the loop. The doAction( ) method of the for-each loop action object will include a loop which causes each of the actions in the array to be executed once for each matching record in the specified query. The loop may invoke a doAction( ) method of each of the subordinate action objects' in turn. The matching records will take the form of a query object which constitutes one of the relevant screen object's data members (each query is associated with a screen in the present embodiment; this is not necessarily true of all embodiments). The query object will have been instantiated and populated upon loading of the screen. The matching records with which the query object is populated will have been taken from the specified database maintained at the wireless communication device 10 based on the query's specified search criteria.

It is possible for a for-each loop to be nested within another for-each loop. Nesting may be precluded if the same query is referenced at two (or more) levels of nesting however.

(3) Decision Dialogs

A decision dialog is similar to an IF . . . THEN . . . ELSE construct except that, in the case of a decision dialog, the two alternative code branches are tied to two mutually exclusive dialog box options which may be selected at run time by a wireless communication device user (rather than to an expression which evaluates to true or false). The option selected by the wireless communication device user will dictate which branch of code branch is executed.

To effect a textually-defined decision dialog instruction at a wireless communication device, the XML schema which forms the basis of Appendix A is first modified to support a new "dialog" action in accordance with the XML excerpt provided below. As well, the object classes 69 which are instantiated and executed at the wireless communication device are modified to support the new action.

Figure 20:
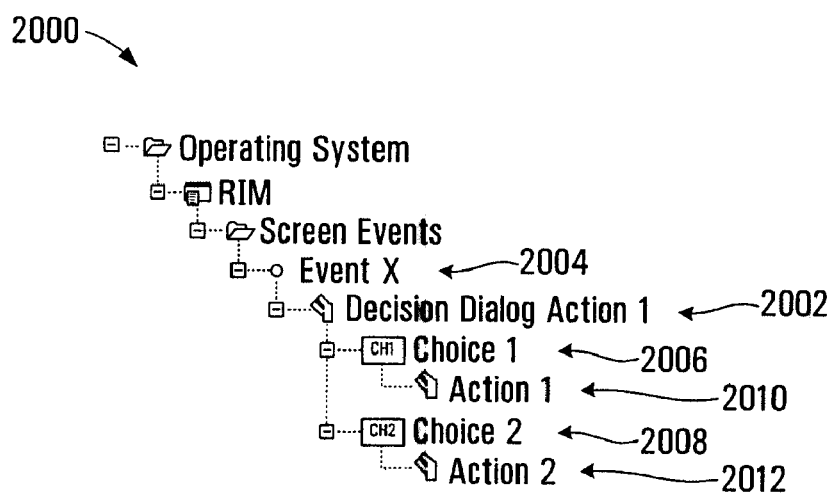
FIG. 20 illustrates a portion of the project explorer of FIG. 14 which may be displayed to facilitate definition of a decision dialog programming language construct within a wireless communication device application.

Further, the application development software 130 is modified to provide a convenient mechanism in tool 116 for defining decision dialog actions that will result in textual definition of the actions in the master definition file. In particular, as shown in FIG. 20, which illustrates a RIM platform-specific portion 2000 of the project explorer 1304, when a decision dialog action 2002 is defined, it is associated with an event (as is the case for other types of actions). In the example shown in FIG. 20, the action 2002 is associated with a screen-level event 2004. It should be appreciated that the action 2002 could alternatively be associated with an application-level event or control-level event.

When decision dialog action 2002 is defined, a CHOICE1 element 2006 and CHOICE2 element 2008 are automatically created within the project explorer 1304 at one level below the new action 2002 within the project explorer tree. These elements represent alternative branches of program logic that are tied to the two mutually exclusive dialog box options "CH1" and "CH2" that will be displayed to the wireless communication device user at run time. In projects explorer 1304, one or more actions may be added below each of CHOICE1 element 2006 and CHOICE2 element 2008. In the example shown in FIG. 20, only one action is defined for each choice—specifically, a first action 2010 for CHOICE1 and a second action 2012 for CHOICE2.

When a developer using tool 116 has created a decision action as shown in FIG. 20, the corresponding XML that is generated within the master definition file 58 upon its publication may be as follows:

```
<ACTION DBGNAME="DoMyDialog" TYPE="DIALOG" CH1=" Yes"
    CH2=" No" CAPTION=" No" TEXT="Do you want to add the value
    ([SP.*.MYCOUNT]) now" >
    <CH1>
        <ACTION DBGNAME="DoMath" TYPE="MATH"
        L="[SP.*.MYCOUNT]" O="+" R="1"
        SAVENAME="MYCOUNT" />
    </CH1>
    <CH2>
        <ACTION DBGNAME="DoMath" TYPE="MATH" L="0"
        O="+" R="1" SAVENAME="MYCOUNT" />
    </CH2>
</ACTION>
```

In the above exemplary XML excerpt, the "DBGNAME" attribute is a variable name used for debugging purposes, the "TYPE" attribute value of "DIALOG" specifies that the action is a decision dialog, the "CH1" attribute represents text to be displayed in association with a first dialog box option, the "CH2" attribute represents text to be displayed in association with a second dialog box option that is mutually exclusive to the first dialog box option, the "CAPTION" attribute represents text for a dialog title (e.g. "Confirmation"), the "TEXT" attribute represents textual content to be displayed to a wireless communication device user (typically to provide classification as to the processing that will ensue when each of the two dialog box options is selected), the subordinate "CH1" element represents a first branch of program logic (i.e. a set of actions) associated with the first dialog box option, and the subordinate "CH2" element represents a second branch of program logic (i.e. another set of actions) associated with the second dialog box option. In the above example, the action associated with the second dialog box option does not achieve a meaningful result because it merely adds zero; it is included simply to illustrate an alternative action in the second branch.

At run time, when a decision dialog action definition is encountered during loading of a screen, a corresponding decision dialog action object is instantiated within objects 169 at the wireless communication device 10. The decision dialog object may include data members which store the values of the various attributes described above. The data members may include two arrays of action objects, namely, "if-then" action objects and "if-else" action objects. Should the first dialog box choice be chosen at run time, the doAction( ) method of the decision dialog object will execute each of the "if-then" actions (i.e. it will invoke the doAction( ) methods of each of the subordinate actions in turn). Alternatively, if the second dialog box is chosen, each of the "if-else" actions will be executed.

(4) Timers

Timers may be useful for purposes of allowing a developer to cause an action to be performed (e.g., popping up an alert or reminder) after the passage of a specified amount of time.

To effect a textually-defined timer instruction at a wireless communication device, the XML schema which forms the basis of Appendix A is first modified to support a new "timer" action in first accordance with the XML excerpt provided below. As well, the object classes 69 which are instantiated and executed at the wireless communication device are modified to support the new action, by defining a new timer class.

Further, the application development software 130 is modified to provide a convenient mechanism in tool 116 for defining a timer that will result in textual definition of a timer instruction in the master definition file. According to that mechanism, a timer construct may be added using the project explorer either in conjunction with a platform-specific screen or in the device independent area (not associated with any screen or specific platform). The procedure for adding a timer may be similar to the procedure for adding a screen-level or application-level event and may entail user interaction with similar GUI components as are provided for defining such events in RAD tool 116. Like an event construct, a timer construct should specify one or more subordinate actions. These are executed after the expiry of the interval specified by the RAD tool user. If a timer is created for a particular screen, its wait interval will commence as soon as the screen is created (initially displayed). If a timer is created at the device-independent level, it will be initiated as soon as the application is launched.

An exemplary textually-defined timer instruction (in the form of an XML snippet from a master definition file) is provided below. The instruction illustrates a timer instruction specifying a 30 second delay and having two subordinate actions: (1) calling a PocketPC COM object for GPS information, and (2) sending that information back to the application server in the form of an XML message via an ARML action. The INTERVALSEC attribute represents the number of seconds to delay before performing these actions.

```
<TIMER DBGNAME="GatherGPSIno" INTERVALSEC="30">
    <ACTION DBGNAME="CallGPSClass" TYPE="COM"
    CLSID="GPSClass.GPS" SAVENAME="GPSINFO"
    SAVE="TRUE"/>
    <ACTION DBGNAME="SendGPSInfo" TYPE="ARML">
        <ARMLTEXT>
            <PKG TYPE="GPSInfo">
                <INFO>[SP.*.GPSINFO]</INFO>
            </PKG>
        </ARMLTEXT>
    </ACTION>
</TIMER>
```

As will be appreciated by those skilled in the art, modifications to the above-described embodiment can be made without departing from the essence of the invention. For example, it is not necessary to employ a RAD tool 116 to encode the various constructs described above into XML. A simple text editor could be used for this purpose (although the latter would place greater responsibility on the developer for knowing the details of the associated XML schema).

In another alternative, the constructs described above need not be encoded using XML. An alternative manner of encoding the constructs (e.g. using Standard Generalized Markup Language or other textual encoding techniques) could be employed. The encoding technique could for example be a binary encoding technique, which could reduce the application definition file size but may be less forgiving to change than a comparable version in a markup language such as XML.

Regardless of the manner in which the above-described programming language constructs are encoded, the constructs are not necessarily deployed to wireless communication devices using the system described above. Deployment could be achieved using alternative schemes.

Finally, for clarity it is understood that the term "virtual machine software" includes various forms of executable machine-executable code, including firmware.

Other modifications will be apparent to those skilled in the art and, therefore, the invention is defined in the claims.

What is claimed is:

1. A wireless communication device, comprising:
   a processor;
   machine-readable memory in communication with said processor, storing machine-executable virtual machine software controlling operation of said device, said virtual machine software, upon execution by said processor, causing said device to:
      receive a single markup language element defining a mathematical operation to be performed upon specified numerical operands; and
      create, based on said single markup language element, an instance of an object-oriented class representative of the mathematical operation, said object-oriented class containing instructions for performing said mathematical operation,
   wherein said single markup language element comprises, for each of said operands of said mathematical operation, a separate attribute identifying said operand,
   wherein said numerical operands are floating point operands and wherein said single markup language element comprises an attribute indicating a desired number of decimal places to be displayed to the right of a decimal point of a floating point result of said mathematical operation, and
   wherein said performing said mathematical operation comprises rounding a least significant digit of said floating point result that is to be displayed in accordance with said desired number of decimal places based on a value of a most significant digit of said floating point result that is not to be displayed in accordance with said desired number of decimal places.

2. A non-transitory machine-readable medium including machine-executable code that, when executed by a wireless communication device, causes said device to:
   receive a single markup language element defining a mathematical operation to be performed upon specified numerical operands; and create, based on said single markup language element, an instance of an object-oriented class representative of the mathematical operation, said object-oriented class containing instructions for performing said mathematical operation, wherein said single markup language element comprises, for each of said operands of said mathematical operation, a separate attribute identifying said operand, wherein said numerical operands are floating point operands and wherein said single markup language element comprises an attribute indicating a desired number of decimal places to be displayed to the right of a decimal point of a floating point result of said mathematical operation, and wherein said performing said mathematical operation comprises rounding a least significant digit of said floating point result that is to be displayed in accordance with said desired number of decimal places based on a value of a most significant digit of said floating point result that is not to be displayed in accordance with said desired number of decimal places.

3. A method comprising, at a wireless communication device having a processor in communication with machine-readable memory storing machine-executable virtual machine software, executing said software to cause said device to:

receive a single markup language element defining a mathematical operation to be performed upon specified numerical operands; and create, based on said single markup language element, an instance of an object-oriented class representative of the mathematical operation, said object-oriented class containing instructions for performing said mathematical operation, wherein said single markup language element comprises, for each of said operands of said mathematical operation, a separate attribute identifying said operand, wherein said numerical operands are floating point operands and wherein said single markup language element comprises an attribute indicating a desired number of decimal places to be displayed to the right of a decimal point of a floating point result of said mathematical operation, and wherein said performing said mathematical operation comprises rounding a least significant digit of said floating point result that is to be displayed in accordance with said desired number of decimal places based on a value of a most significant digit of said floating point result that is not to be displayed in accordance with said desired number of decimal places.

4. A wireless communication device comprising:

a processor;

machine readable memory in communication with said processor, storing machine-executable virtual machine software controlling operation of said device, said virtual machine software comprising:

a parser for receiving a markup language document comprising a single markup language element defining a mathematical operation to be performed upon specified numerical operands;

a screen generation engine, for presenting at least one user interface screen at said device in accordance with said markup language document;

at least one event handling routine for processing events arising in response either to interaction with said at least one user interface screen or to a message received over a wireless network in accordance with said text file; and at least one object-oriented class corresponding to an action to be performed by said device in response either to said interaction with said at least one screen or to said message received over said wireless network, said action comprising performing said mathematical operation upon said specified numerical operands, wherein said numerical operands are floating point operands and wherein said single markup language element comprises an attribute indicating a desired number of decimal places to be displayed to the right of a decimal point of a floating point result of said mathematical operation, and wherein said performing said mathematical operation comprises rounding a least significant digit of said floating point result that is to be displayed in accordance with said desired number of decimal places based on a value of a most significant digit of said floating point result that is not to be displayed in accordance with said desired number of decimal places.

5. The wireless communication device of claim 4 wherein said markup language is Extensible Markup Language (XML).

6. The wireless communication device of claim 1 wherein said single markup language element comprises an attribute identifying a variable for storing a result of said mathematical operation.

7. The wireless communication device of claim 1 wherein said performing said mathematical operation comprises:

applying string manipulation and string conversion operations to string representations of said floating point operands to obtain integers associated with said floating point operands;

performing integer operations upon said integers to obtain interim integer results;

converting said interim integer results into corresponding interim string results; and applying string manipulation to said interim string results to obtain a string representation of a floating point result of said mathematical operation.

8. The non-transitory machine-readable medium of claim 2 wherein said single markup language element comprises an attribute identifying a variable for storing a result of said mathematical operation.

9. The non-transitory machine-readable medium of claim 2 wherein said performing said mathematical operation comprises:

applying string manipulation and string conversion operations to string representations of said floating point operands to obtain integers associated with said floating point operands;

performing integer operations upon said integers to obtain interim integer results;

converting said interim integer results into corresponding interim string results; and applying string manipulation to said interim string results to obtain a string representation of a floating point result of said mathematical operation.

10. The method of claim 3 wherein said single markup language element comprises an attribute identifying a variable for storing a result of said mathematical operation.

11. The method of claim 3 wherein said performing said mathematical operation comprises:

applying string manipulation and string conversion operations to string representations of said floating point operands to obtain integers associated with said floating point operands;

performing integer operations upon said integers to obtain interim integer results;

converting said interim integer results into corresponding interim string results; and applying string manipulation to said interim string results to obtain a string representation of a floating point result of said mathematical operation.

12. The wireless communication device of claim 4 wherein said single markup language element comprises, for each of said operands of said mathematical operation, a separate attribute identifying said operand.

* * * * *